US011891260B2

(12) United States Patent
Yamada et al.

(10) Patent No.: US 11,891,260 B2
(45) Date of Patent: Feb. 6, 2024

(54) SHEET POST-PROCESSING APPARATUS AND IMAGE FORMING SYSTEM HAVING THE SAME

(71) Applicants: Hiroyuki Yamada, Yamanashi (JP); Yasumichi Okahisa, Yamanashi (JP)

(72) Inventors: Hiroyuki Yamada, Yamanashi (JP); Yasumichi Okahisa, Yamanashi (JP)

(73) Assignee: Canon Finetech Nisca Inc., Misato Saitama (JP)

(*) Notice: Subject to any disclaimer, the term of this patent is extended or adjusted under 35 U.S.C. 154(b) by 0 days.

(21) Appl. No.: 17/876,970

(22) Filed: Jul. 29, 2022

(65) Prior Publication Data

US 2023/0030790 A1 Feb. 2, 2023

(30) Foreign Application Priority Data

Jul. 30, 2021 (JP) ................................ 2021-125238

(51) Int. Cl.

| | |
|---|---|
| ***B65H 37/04*** | (2006.01) |
| ***B65H 31/10*** | (2006.01) |
| ***G03G 15/00*** | (2006.01) |

(52) U.S. Cl.

CPC ............ *B65H 37/04* (2013.01); *B65H 31/10* (2013.01); *G03G 15/6541* (2013.01); *G03G 15/6552* (2013.01); *B65H 2402/441* (2013.01); *B65H 2801/09* (2013.01); *G03G 2215/00793* (2013.01)

(58) Field of Classification Search

CPC ..... G03G 2215/00793; G03G 15/6541; G03G 15/6552; B65H 31/10; B65H 2801/09; B65H 37/04; B65H 29/58

See application file for complete search history.

(56) References Cited

U.S. PATENT DOCUMENTS

| | | | | |
|---|---|---|---|---|
| 10,414,620 B2 * | 9/2019 | Obuchi | .................. | B65H 31/38 |
| 2006/0210337 A1 * | 9/2006 | Nagata | ............... | G03G 15/6538 399/407 |

FOREIGN PATENT DOCUMENTS

| | | | |
|---|---|---|---|
| JP | 2006-240760 A | | 9/2006 |
| JP | 2010085431 A | * | 4/2010 |
| JP | 2013-145855 A | | 7/2013 |

* cited by examiner

*Primary Examiner* — Jennifer Bahls

(74) *Attorney, Agent, or Firm* — Manabu Kanesaka

(57) ABSTRACT

A sheet post-processing apparatus includes a first regulating device regulating a position of a sheet bundle, by contacting to an end part of the sheet bundle conveyed in a conveying direction by a conveying device and stacked on a stacking device in a direction intersecting with the conveying direction; a second regulating device regulating a position of the sheet bundle in the conveying direction, by contacting to an end part of the sheet bundle stacked on the stacking device in the conveying direction; a first binding device configured to move from one side to another side of the sheet post-processing apparatus and from the other side to the one side by moving in the intersecting direction, and configured to bind a corner part of the sheet bundle using a staple, and a second binding device configured to bind a corner part of the sheet bundle without a staple.

6 Claims, 28 Drawing Sheets

FIG. 12A Multi-binding
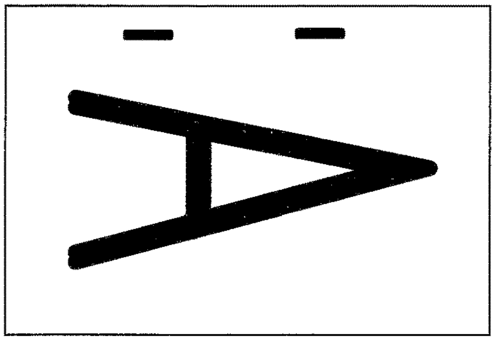
FIG. 12B Right corner binding
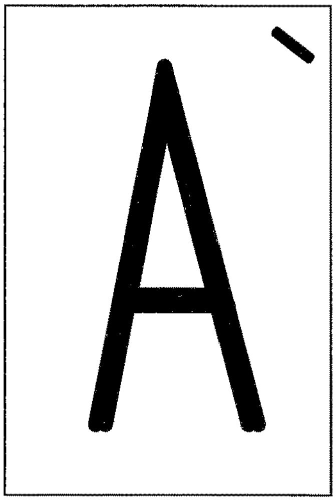
FIG. 12C
Left corner binding
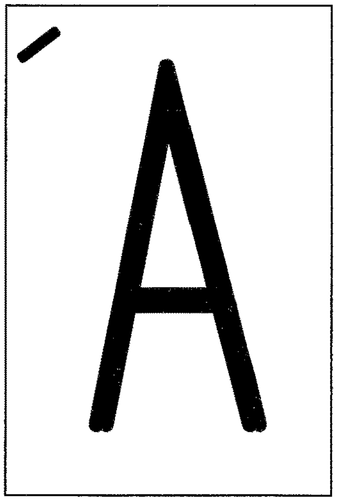
FIG. 12D Manual binding
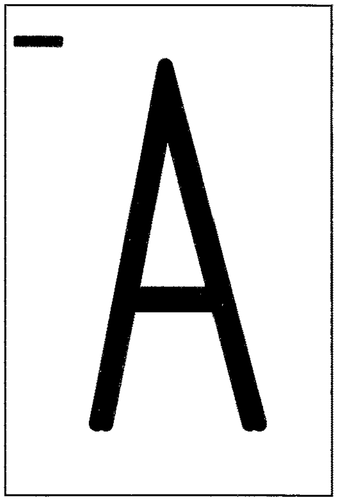
FIG. 12E
Eco-binding
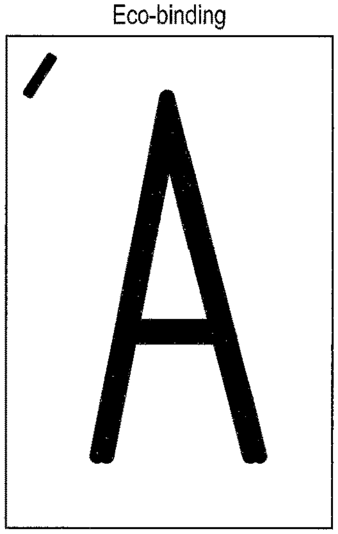
FIG. 12F
Enlarged eco-binding part
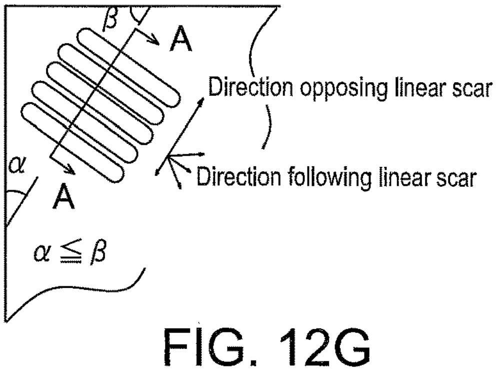
FIG. 12G
Enlarged section at A-A

Back-swing position
Eco-binding position Ep
Eco-binding alignment position Ap2

27
27b
27c
46R
Sheet bundle 46R
27
Overrun amount 46R
27

Linear scar
sheet
46R
z
w
27
46R 27b
27c

27
Sheet discharging
46R

SHEET POST-PROCESSING APPARATUS AND IMAGE FORMING SYSTEM HAVING THE SAME

RELATED APPLICATIONS

The present application is based on, and claims priority from, Japanese Application No. JP 2021-125238 filed Jul. 30, 2021, the disclosure of which is hereby incorporated by reference herein in its entirety.

TECHNICAL FIELD

The present invention relates to a sheet post-processing apparatus for processing a sheet fed from an image forming unit which forms an image on the sheet, and an image forming system including the sheet processing apparatus, and relates to improvement in user operability.

BACKGROUND ART

Conventionally, there has been known a so-called inner finisher (in-body finisher) provided in a space between a reading unit and an image forming unit of an image forming apparatus.

Patent Document 1 discloses an in-body processing apparatus installed using a space of an apparatus main body including a document reading unit, a printing unit, and a sheet feeding unit. This document discloses a configuration in which, when a sheet jam occurs, a hook that couples an image forming apparatus and a processing apparatus is released by lever operation, and the processing apparatus is pulled out from the space along slide rails to remove the sheet causing the jam.

Such a jam releasing structure is widely employed in an inner finisher.

Patent Document 2 discloses a configuration in which a manually setting unit for setting a sheet bundle from the outside is provided at an in-body finisher, and a binding process is performed on the sheet bundle manually set on the manually setting unit.

The manually setting unit includes a setting surface (table) on which a sheet bundle is set and a stapler unit that performs the binding process on the sheet bundle. That is, in an apparatus having a bookbinding function of collating and stacking sheets fed from a sheet discharging path and performing the binding process, a sheet bundle is set in an exterior casing from the outside to perform the binding process.

In the apparatus disclosed in the above-mentioned document, there is disclosed a structure in which a slit-shaped setting portion in a vertical direction and a common stapler unit for stacking and binding sheets fed from the slit-shaped setting portion and the sheet discharging path are incorporated in the exterior casing.

PRIOR ART DOCUMENT

Patent Document

Patent Document 1: Japanese Patent Application Laid-Open No. 2006-240760

Patent Document 2: Japanese Patent Application Laid-Open No. 2013-145855

DISCLOSURE OF INVENTION

Problems to be Solved by the Invention

Various types of post-processing apparatuses to be installed in the in-body space of the image forming apparatus as described above are known, and a further compact in-body finisher is required with the downsizing of an image forming apparatus main body and the upsizing of an operation panel due to the use of a touch panel.

In the apparatus of Patent Document 1, a jam release lever is provided on the upstream side of the image forming apparatus in the sheet discharging direction and on an operator side. Here, when the jam release lever is installed in the image forming apparatus provided with a large operation panel, the position of the operation panel and the position of the jam release lever interfere with each other, making it difficult to perform the operation.

However, when the jam release lever is set away from the operation panel and provided on the operator side on the downstream side of the image forming apparatus in the sheet discharging direction, in a case that the manually setting unit for manual binding as in Patent Document 2 is provided, there is a possibility that the jam release lever and the manually setting unit interfere with each other.

Accordingly, it is an object of the present invention to provide an apparatus which is excellent in operability of the jam release lever and is small and compact even with a manual setting unit provided.

Means for Solving the Problem

To solve the abovementioned problems, a sheet post-processing apparatus of the present invention is provided in an in-body space between a reading unit that reads an image of a document and an image forming unit configured to form the image read by the reading unit on a sheet and comprises: a conveying device configured to convey the sheet; a processing tray on which the sheet conveyed in the conveying direction by the conveying device is placed; a manual inserting unit capable of manually inserting a sheet from the outside of the sheet post-processing apparatus; a binding processing device configured to perform a binding process on the sheet placed on the processing tray or the sheet inserted into the manual inserting unit; a slide mechanism capable of pulling out the sheet post-processing apparatus from the in-body space; a fixing unit configured to fix the slide mechanism into the in-body space and to fix the slide mechanism to a conveying position where the sheet is conveyed to the conveying device; and a release lever provided at a position overlapping with a placing range of the sheet set on the manual inserting unit and configured to release the fixing unit.

Effect of the Invention

According to the present invention, the apparatus can be configured to be compact without impairing the operability of the user.

BRIEF DESCRIPTION OF DRAWINGS

FIGS. 4A and 4B are explanatory views of a sheet introducing mechanism of the apparatus of FIG. 2, while FIG. 4A illustrates a state that a paddle rotor is at a waiting position and FIG. 4B illustrates a state that the paddle rotor is at an engaging position;

FIGS. 10A to 10C illustrate states of the stapling unit at binding positions, while FIG. 10A illustrates a state at a right corner binding position, FIG. 10B illustrates a state at a staple loading position, and FIG. 10C illustrates a state at a manual binding position;

FIGS. 11A to 11D are explanatory views of a sheet bundle discharging mechanism in the apparatus of FIG. 2, while FIG. 11A illustrates a waiting state, FIG. 11B illustrates a transitional conveying state, FIG. 11C illustrates a structure of a second conveying member, and FIG. 11D illustrates a state of discharging to a stack tray;

FIGS. 12A to 12G illustrate a binding processing method of a sheet bundle;

MODE FOR CARRYING OUT THE INVENTION

Figure 1:
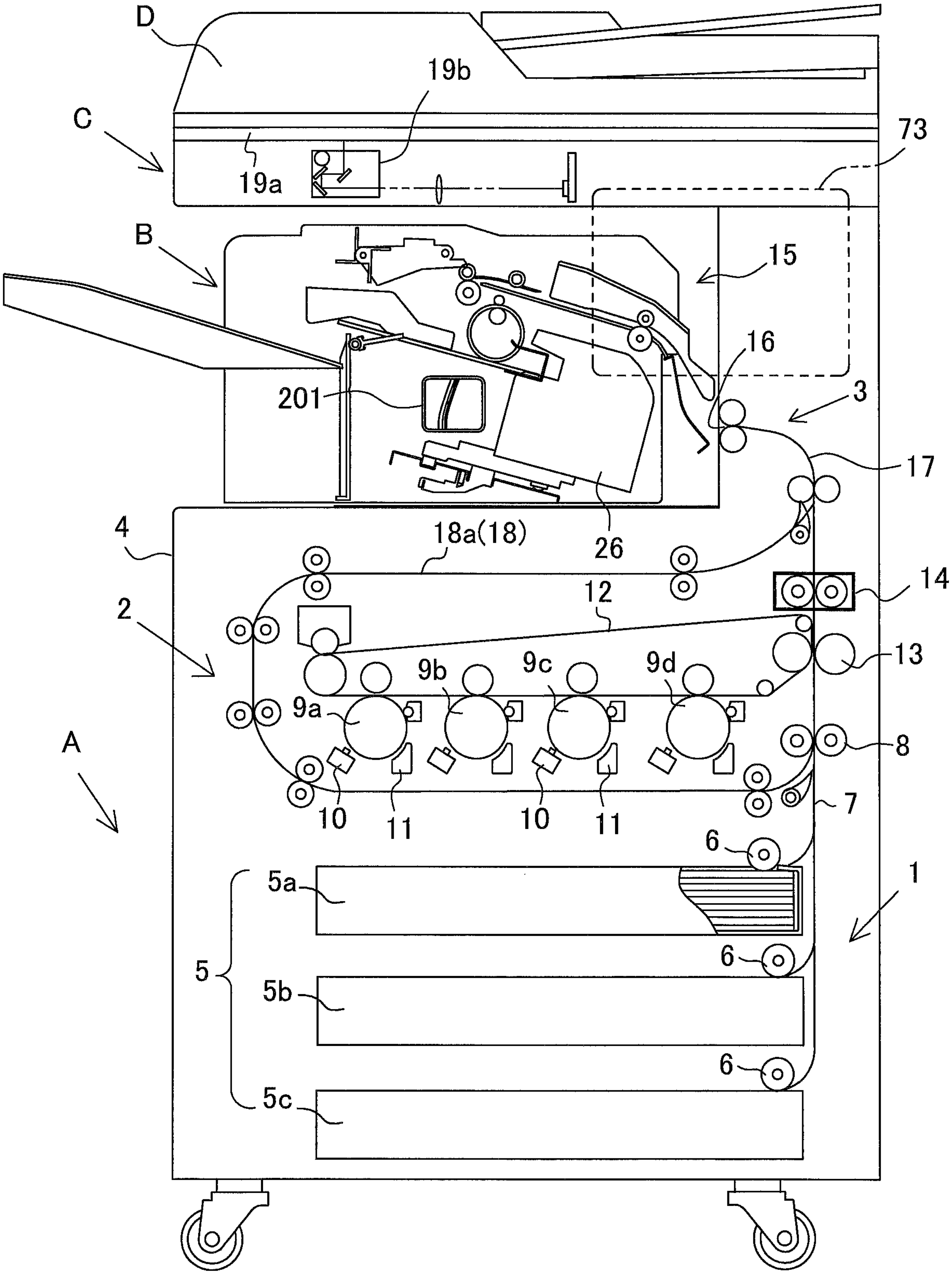
FIG. 1 is an explanatory view of a whole configuration of an image forming system according to the present invention.

In the following, the present invention will be described in detail based on preferred embodiments illustrated in the drawings. The present invention relates to a sheet bundle binding processing mechanism which performs a binding process on a collated and stacked sheet bundle with images formed thereon in a later-mentioned image forming system. The image forming system illustrated in FIG. 1 includes an image forming unit A, an image reading unit C, and a post-processing unit B. A document image is read by the image reading unit C. Based on the image data, the image forming unit A forms an image on a sheet. Then, the post-processing unit B (i.e., sheet bundle binding processing apparatus, as the case may be) performs a binding process with the image-formed sheets collated and stacked and stores the sheets on a stack tray 25 at the downstream side.

The post-processing unit B which will be described later is built in as a unit at a sheet discharge space (stack tray space) 15 which is formed in a housing of the image forming unit A. The post-processing unit B has an inner finisher structure having a post-processing mechanism which performs a binding process after the image-formed sheets conveyed to a sheet discharging port 16 are collated and stacked on a processing tray and subsequently stores the sheets on the stack tray 25. Not limited to the above, the present invention may have a stand-alone structure that the image forming unit A, the image reading unit C, and the post-processing unit B are independently arranged and the respective units are connected by network cables to be systematized.

[Sheet-Bundle Binding Processing Apparatus (Post-Processing Unit)]

Figure 2:
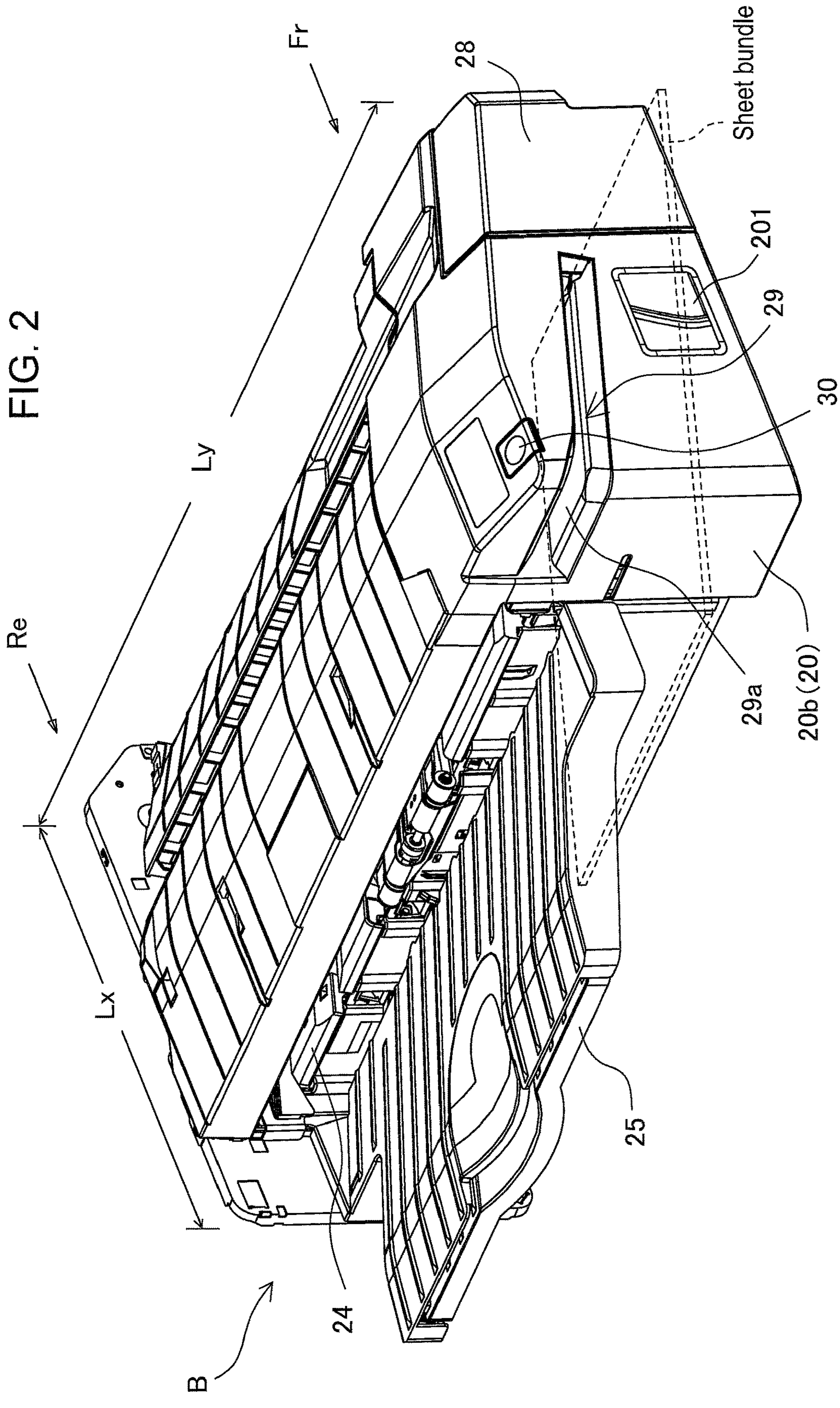
FIG. 2 is an explanatory perspective view illustrating a whole configuration of a post-processing apparatus in the image forming system of FIG. 1 in a state that a sheet bundle is set at a manual feeding portion.
Figure 3:
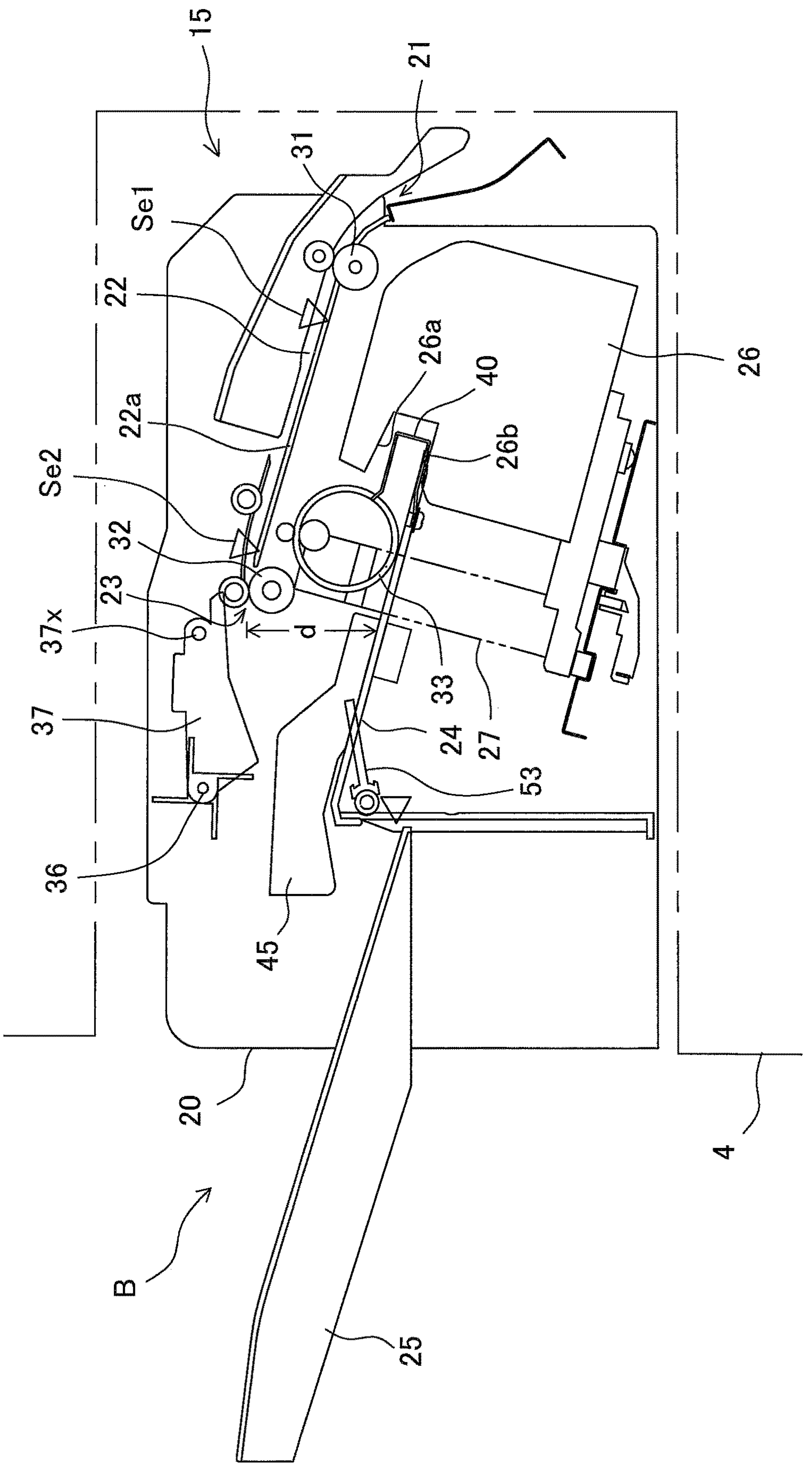
FIG. 3 is a side sectional view (at an apparatus front side) of the apparatus of FIG. 2.

As illustrated in FIGS. 2 and 3 being a perspective view and a sectional view of the post-processing unit B, the post-processing unit B includes an apparatus housing 20, a sheet introducing path 22 which is arranged in the apparatus housing 20, a processing tray 24 which is arranged at the downstream side of a path sheet discharging port 23, and a stack tray 25 which is arranged at the downstream side further therefrom.

[Apparatus Housing]

The apparatus housing 20 includes an apparatus frame 20a and an external casing 20b. The apparatus frame 20a has a frame structure to support later-mentioned mechanisms (a path mechanism, a tray mechanism, a conveying mechanism, and the like). In the drawings, a binding mechanism, the conveying mechanism, a tray mechanism, and a driving mechanism are arranged at a right-left pair of side frames (not illustrated) which are mutually opposed to form a monocoque structure as being integrated with the external casing 20b. The external casing 20b has the monocoque structure obtained by integrating, with mold processing using resin or the like, right-left side frames 20c, 20d and a stay frame (later-mentioned bottom frame 20e) which connects the side frames 20c, 20d. Here, a part (at the apparatus front side) thereof is exposed to be operable from the outside.

That is, the frames are stored in the sheet discharge space 15 of the later-mentioned image forming unit A with an outer circumference thereof covered by the external casing 20b. In the above state, a front side of the external casing 20b is exposed to be operable from the outside. A later-mentioned cartridge mount opening 28 for staples, a manual setting portion and a manual operation button 30 (in the drawing, a switch having a built-in lamp) are arranged at the front side of the external casing 20*b*. The external casing 20*b* has a length Lx in a sheet discharging direction and a length Ly in a direction perpendicular to the sheet discharging direction which are set based on the maximum sheet size as being smaller than the sheet discharge space 15 of the later-mentioned image forming unit A.

[Sheet Introducing Path (Sheet Discharging Path)]

As illustrated in FIG. 3, the sheet introducing path 22 (hereinafter, called a sheet discharging path) having an introducing port 21 and a discharging port 23 is arranged at the above-mentioned apparatus housing 20. In FIG. 3, the sheet discharging path 22 is structured as receiving a sheet in the horizontal direction and discharging the sheet from the discharging port 23 after conveying approximately in the horizontal direction. The sheet discharging path 22 includes an appropriate paper guide (plate) 22*a* and incorporates a feeder mechanism which conveys a sheet. The feeder mechanism is structured with pairs of conveying rollers arranged at predetermined intervals in accordance with a path length. In FIG. 3, a pair of introducing rollers 31 is arranged in the vicinity of the introducing port 21 and a pair of discharging rollers 32 is arranged in the vicinity of the discharging port 23. A sheet sensor Se1 to detect a sheet leading end and/or a sheet tailing end is arranged at the sheet discharging path 22.

The sheet discharging path 22 includes a linear path arranged approximately in the horizontal direction as traversing the apparatus housing 20. Here, a sheet is prevented from receiving stress which is caused by a curved path. Accordingly, the sheet discharging path 22 is formed as having linearity which is allowed by apparatus layout. The pair of introducing rollers 31 and the pair of discharging rollers 32 are connected to the same driving motor M1 (hereinafter, called a conveying motor) and convey a sheet at the same circumferential speed.

[Processing Tray]

As illustrated in FIG. 3, the processing tray 24 is arranged at the downstream side of the sheet discharging port 23 of the sheet discharging path 22 as forming a step d therefrom. For upward stacking of sheets fed from the sheet discharging port 23 into a bundle shape, the processing tray 24 includes a sheet placement face 24*a* which supports at least a part of the sheets. FIG. 3 illustrates a structure (bridge-support structure) in which a sheet leading end side is supported by the later-mentioned stack tray 25 and a sheet tailing end side is supported by the processing tray 24. Thus, the processing tray 24 is downsized.

At the processing tray 24, there are arranged a stapling unit 26 to staple-bind a sheet bundle, a press binding unit 27 to perform a binding process by pressing a sheet bundle whose section becomes into a concave-convex state without using a staple, a sheet introducing device 35 to introduce sheets, a sheet end regulating device 40 to stack introduced sheets into a bundle shape, an aligning device 45, and a sheet bundle discharging mechanism 60. According to the above, on the processing tray 24, sheets fed from the discharging port 23 are stacked into a bundle shape, and a binding process is performed by a binding device being either the stapling unit 26 or the press binding unit 27 after the sheets are aligned into a predetermined posture. Subsequently, the processed sheet bundle is discharged to the stack tray 25 at the downstream side. Since the press binding unit 27 operates without using a staple as being advantageous in resource saving, the binding process with the press binding unit 27 is hereinafter called eco-binding.

[Sheet Introducing Mechanism (Sheet Introducing Device)]

Since the processing tray 24 is arranged as forming the step d from the sheet discharging port 23, it is required to arrange the sheet introducing device 35 which smoothly conveys a sheet onto the processing tray 24 with a correct posture. In the drawings, the sheet introducing device 35 (friction rotor) is structured with a lifting-lowering paddle rotor 36. When a sheet tailing end is discharged from the sheet discharging port 23 onto the processing tray 24, the paddle rotor 36 conveys the sheet in a direction (rightward in FIG. 3) opposite to the sheet discharging direction, so that the sheet is abutted to later-mentioned sheet end regulating device 40 to be aligned (positioned).

A lifting-lowering arm 37 which is axially-supported swingably by a support shaft 37*x* at the apparatus frame 20*a* is arranged at the discharging port 23. The paddle rotor 36 is axially-supported rotatably at a top end part of the lifting-lowering arm 37. A pulley (not illustrated) is arranged at the support shaft 37*x* and the above-mentioned conveying motor M1 is connected to the pulley.

In addition, a lifting-lowering motor (hereinafter, called a paddle lifting-lowering motor) M3 is connected to the lifting-lowering arm 37 via a spring clutch (torque limiter) and is structured so that the lifting-lowering arm 37 is lifted and lowered with rotation of the lifting-lowering motor M3 between a waiting position Wp at the upper side and an operating position (sheet engaging position) Ap at the lower side. That is, the spring clutch lifts the lifting-lowering arm 37 from the operation position Ap to the waiting position Wp with rotation of the paddle lifting-lowering motor M3 in one direction and keeps the lifting-lowering arm 37 waiting at the waiting position Wp after abutting to a stopper (not illustrated). On the contrary, the spring clutch is released with rotating of the paddle lifting-lowering motor M3 in the opposite direction, so that the lifting-lowering arm 37 is lowered under own weight thereof from the waiting position Wp to the operating position Ap at the lower side to be engaged with the upmost sheet.

Figure 5:
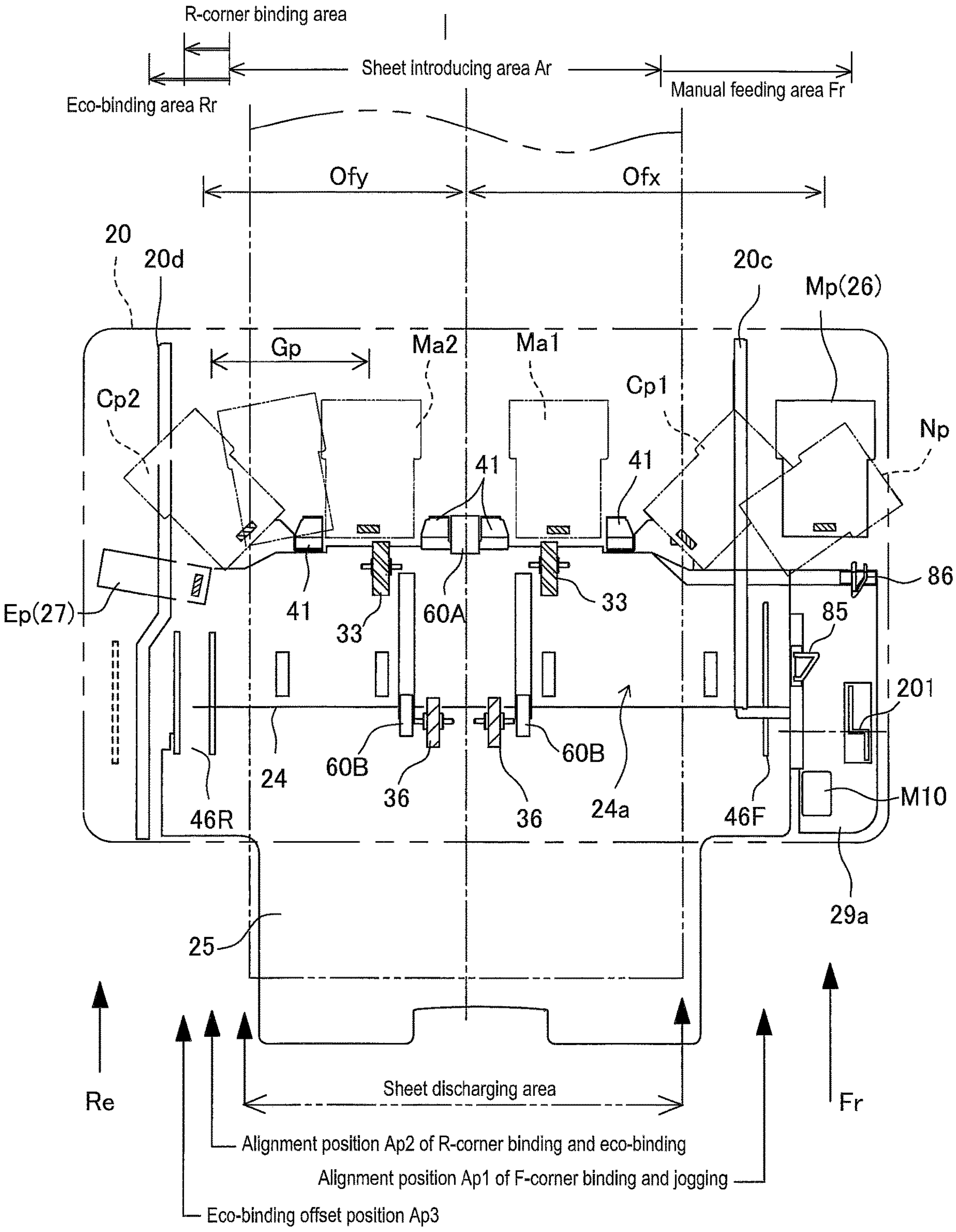
FIG. 5 is an explanatory view illustrating an arrangement relation among respective areas and alignment positions in the apparatus of FIG. 2.

In the illustrated apparatus, a pair of the paddle rotors 36 are arranged in a bilaterally symmetric manner with respect to a sheet center Sx (center reference) as being apart by a predetermined distance, as illustrated in FIG. 5. Alternatively, three paddle rotors in total may be arranged at the sheet center and both sides thereof, or one paddle rotor may be arranged at the sheet center.

The paddle rotor 36 is structured with a flexible rotor formed of a rubber-made plate-shaped member, plastic-made blade member, or the like. Instead of the paddle rotor 36, it is possible that the sheet introducing device 35 is structured with a friction rotating member such as a roller body and a belt body. In the above description, the illustrated apparatus includes the mechanism with which the paddle rotor 36 is lowered from the waiting position Wp at the upper side to the operating position Ap at the lower side after a sheet tailing end is discharged from the discharging port 23. However, instead of the above, it is possible to adopt a lifting-lowering mechanism described below.

With a lifting-lowering mechanism being different from the illustrated mechanism, for example, when a sheet leading end is discharged from the discharging port 23, a friction rotor is lowered from a waiting position to an operating position and rotated concurrently in the sheet discharging direction. Then, at the timing when a sheet tailing end is discharged from the discharging port 23, the friction rotor is reversely rotated in a direction opposite to the sheet discharging direction. According to the above, it is possible that the sheet discharging from the discharging port 23 is conveyed to a predetermined position of the processing tray 24 at high speed without being skewed.

[Raking Rotor]

Figure 4A:
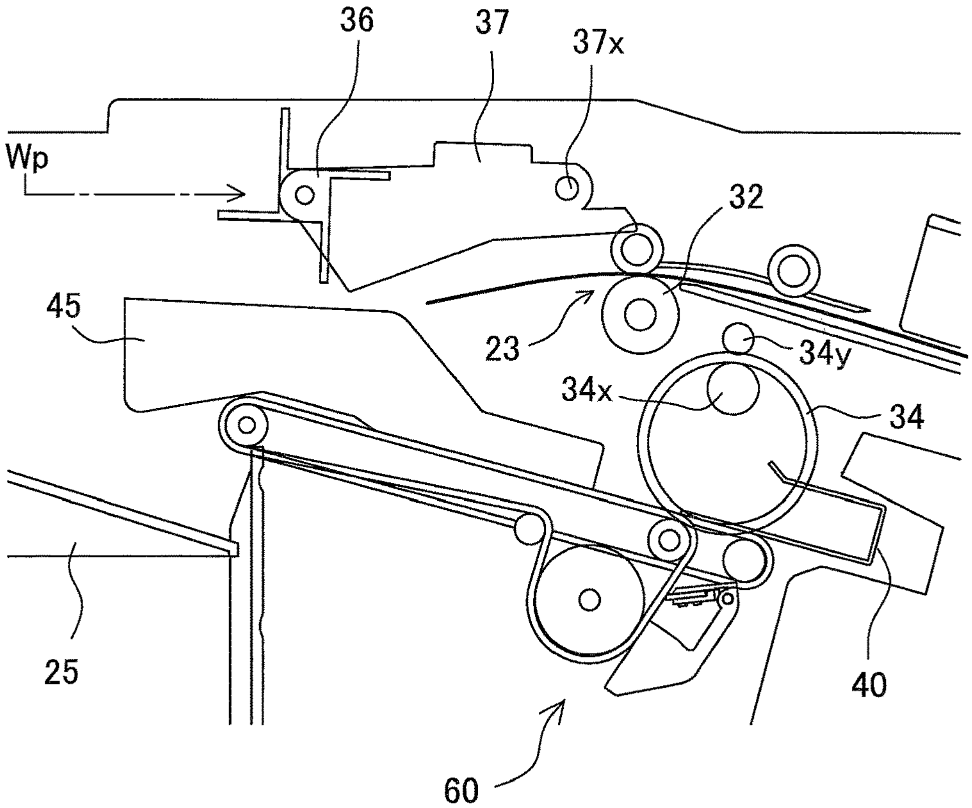
Figure 4B:
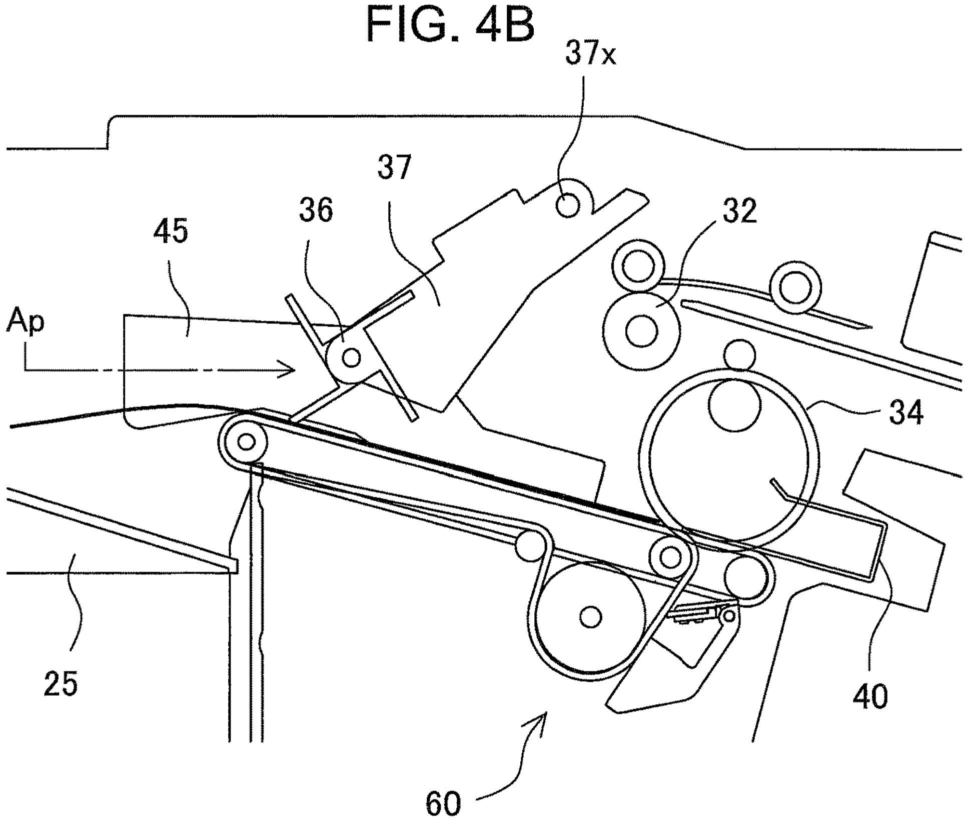

A raking rotor 33 is arranged so that a sheet tailing end (a leading end in the sheet discharging direction) of a curled sheet or a skewed sheet is reliably guided to a regulating device at the downstream side when a sheet is conveyed to a predetermined position of the processing tray 24 by the puddle rotor 36. The raking rotor 33 is arranged below the pair of sheet discharging rollers 32 and guides a sheet fed by the paddle rotor 36 to the regulating device 40. The raking rotor 33 is structured with a ring-shaped belt member 34 (FIGS. 4A and 4B) and conveys the upmost sheet on the processing tray 24 to the regulating device 40 as being abutted thereto.

The illustrated apparatus includes a raking rotor (raking-conveying device) 33 which applies a conveying force, to a regulating member side, on the upmost sheet of the sheets stacked at the upstream side of the later-mentioned sheet end regulating stopper 40 below the pair of sheet discharging rollers 32. In the drawings, a ring-shaped belt member (hereinafter, called a raking belt) 34 is arranged above the top end part of the processing tray 24. The raking belt 34 is engaged with the upmost sheet on the sheet placement face 24*a* and rotated in a direction to convey the sheet toward the regulating member side.

The raking belt 34 is structured with a belt member (roulette belt, or the like) having a high frictional force made of soft material such as rubber material. The raking belt 34 is nipped and supported between an idle shaft 34*y* and a rotating shaft 34*x* which is connected to a drive motor (in the drawing, the conveying motor M1 is commonly used). A rotational force in the counterclockwise direction in FIG. 3 is applied to the raking belt 34 from the rotating shaft 34*x*. Along with the above, the raking belt 34 presses a sheet introduced along the upmost sheet stacked on the processing tray 24 and causes a leading end of the sheet to be abutted to the regulating stopper 40 at the downstream side.

The raking belt 34 is configured to be moved upward and downward above the upmost sheet on the processing tray 24 by a belt shifting motor (hereinafter, called a roulette lifting-lowering motor) M5. Here, a lifting-lowering mechanism therefor is skipped. At the timing when a sheet leading end enters between a belt face and the upmost sheet, the raking belt 34 is lowered and engaged with the introduced sheet. When a sheet bundle is conveyed from the processing tray 24 to the stack tray 25 at the downstream side by a sheet bundle conveying device 60 as described later, the roulette motor M5 is controlled so that the raking belt 34 is separated from the upmost sheet and kept waiting at the upper side.

[Sheet Aligning Mechanism]

A sheet aligning mechanism 45 which performs positioning of an introduced sheet at a predetermined position (processing position) is arranged at the processing tray 24. The sheet aligning mechanism 45 in the drawings includes the sheet end regulating device 40 which positionally regulates an end face (a leading end face or a tailing end face) in the sheet discharging direction of the sheet fed from the discharging port 23 and a side aligning device 45 which performs biasing and aligning in a direction (sheet side direction) perpendicular to the sheet discharging direction. In the following, description will be performed in the order thereof.

[Sheet End Regulating Device]

The illustrated sheet end regulating device 40 includes a tailing end regulating member 41 which performs regulation with abutting against a sheet tailing end in the sheet discharging direction. The tailing end regulating member 41 includes a regulating face 41*a* which performs regulation with abutting the tailing end in the sheet discharging direction of the sheet introduced along the sheet placement face 24*a* of the processing tray 24. The tailing end regulating member 41 causes the tailing end of the sheet fed by the abovementioned raking rotor 33 to be abutted and stopped.

When multi-binding is performed with the later-mentioned stapling unit 26, the stapling unit 26 is moved along a sheet tailing end (in a direction perpendicular to the sheet discharging direction). To prevent obstruction against movement of the stapling unit 26, the tailing end regulating member 41 is configured to adopt any one of the structures of:

(1) adopting a mechanism with which the tailing end regulating member proceeds to and retracts from a movement path (motion trajectory) of the binding unit, (2) adopting a mechanism with which the tailing end regulating member is moved integrally with the binding unit, and (3) forming the tailing end regulating member, for example, as a channel-shaped folded piece arranged at the inside of a binding space which is formed by a head and an anvil of the binding unit.

The illustrated tailing end regulating member 41 includes a plate-shaped folded member whose section has a U-shape (channel shape) arranged in the binding space of the stapling unit 26. Here, a first member 41A is arranged at the sheet center based on the minimum sheet size, and second and third members 41B, 41C are arranged bilaterally as being mutually distanced (see FIG. 5). According to the above, the stapling unit 26 is allowed to be moved in a sheet width direction.

Figure 7:
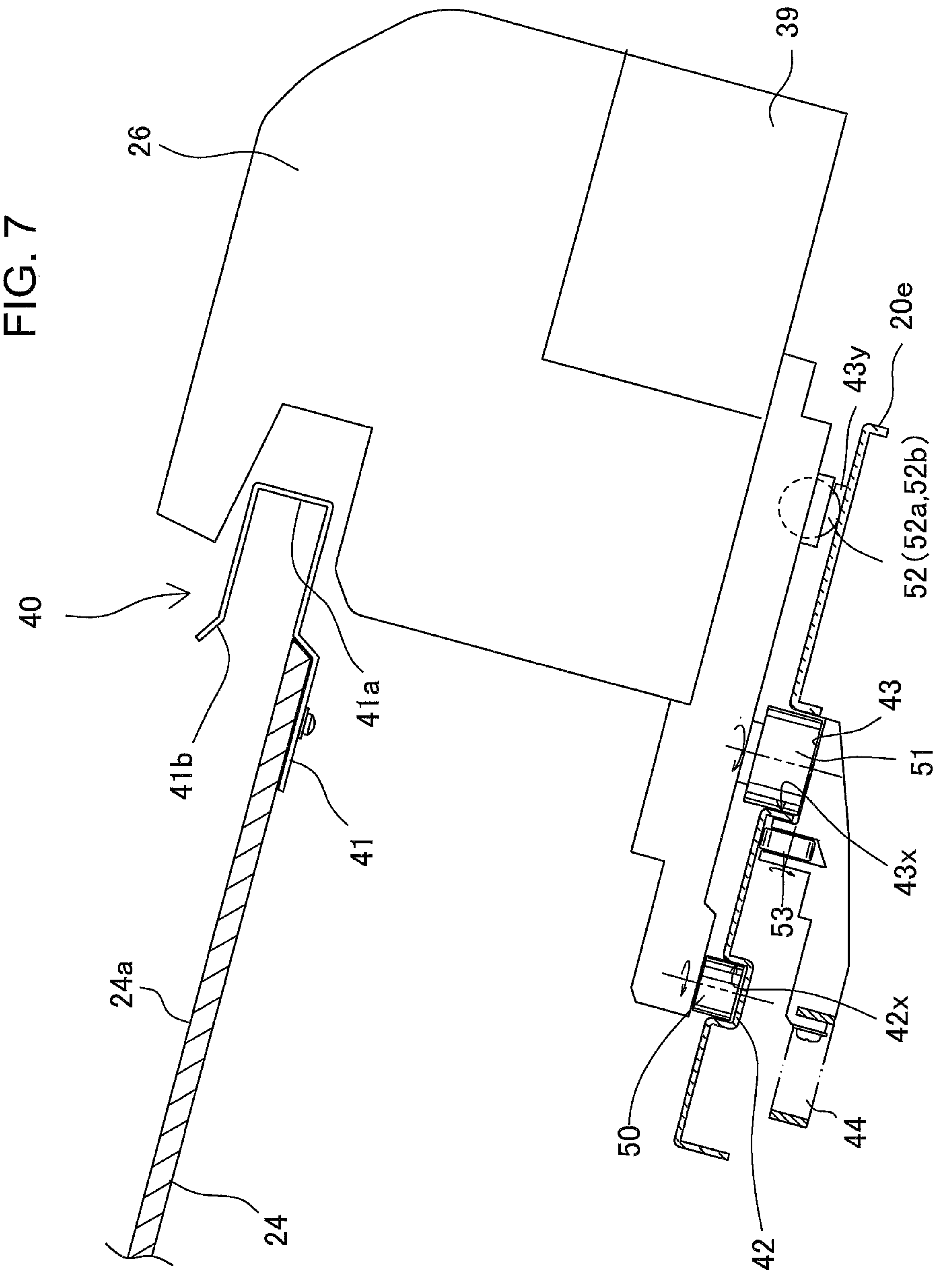
FIG. 7 is an explanatory view of a moving mechanism of a stapling unit.

As illustrated in FIGS. 5 and 7, a plurality of the tailing end regulating members 41 formed of channel-shaped folded pieces is fixed to the processing tray 24 as top end parts thereof being fixed to a back face wall of the processing tray 24 with screws. The regulating face 41*a* is formed at each of the tailing end regulating member 41 and an inclined face 41*b* which guides a sheet end to the regulating face 41*a* is continuously formed at a top end part of the folding thereof.

[Side Aligning Device]

The processing tray 24 is provided with an aligning device which performs positioning of a sheet abutted to the abovementioned tailing end regulating member 41 in a direction perpendicular to the sheet discharging direction (sheet width direction).

The aligning device 45 is structured differently based on whether sheets having different sizes are aligned on the processing tray 24 in center reference or side reference. In the apparatus illustrated in FIG. 5, sheets of different sizes are discharged from the discharging port 23 in the center reference and the sheets are aligned on the processing tray 24 in the center reference. A binding process is performed by the stapling unit 26 on a sheet bundle which is aligned into a bundle shape in center reference, in accordance with the binding process, at binding positions Ma1, Ma2 in an aligned posture for multi-binding and at binding positions Cp1, Cp1 with the sheet bundle offset by a predetermined amount in the width direction for a lateral corner binding.

Figure 6:
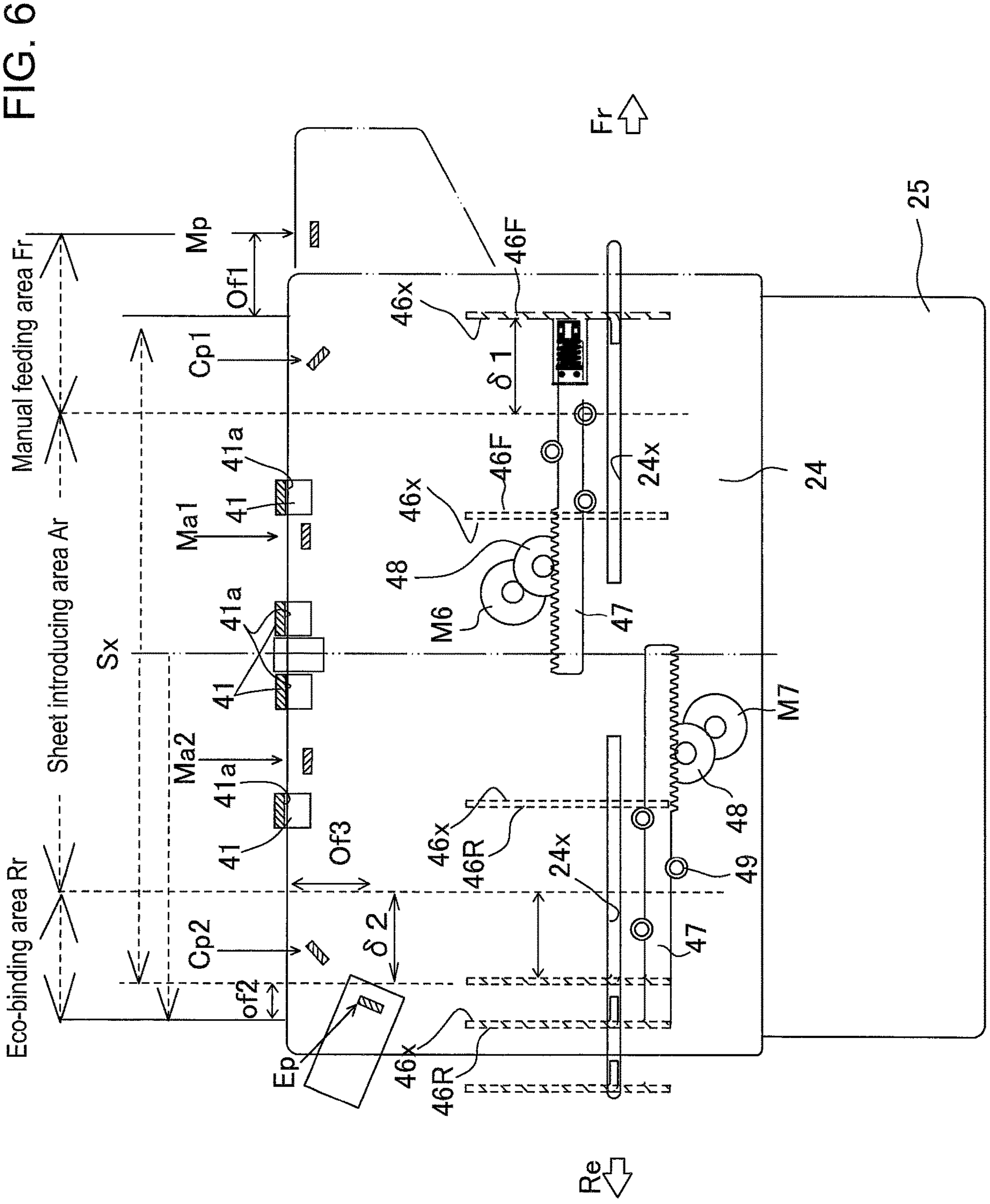
FIG. 6 is a structural explanatory view of a side aligning device in the apparatus of FIG. 2.

As illustrated in FIG. 6, the aligning device 45 includes a right side aligning member 46F (at the apparatus front side) and a left side aligning member 46R (at the apparatus rear side). Slit grooves 24*x* penetrating the sheet placement face 24*a* are formed at the processing tray 24. The right side aligning member 46F and the left side aligning member 46R are fitted to the slit grooves 24*x* and attached to the processing tray 24 as protruding thereabove. Each of the side aligning plates 46F, 46R is integrally formed with a rack 47 and is slidably supported by a plurality of guide rollers 49 (or rail members) at the back face side of the processing tray 24. Aligning motors M6, M7 are connected to the right-left racks 47 respectively via a pinion 48. The right-left aligning motors M6, M7 are structured with stepping motors. Positions of the right-left aligning plates 46F, 46R are detected by position sensors (not illustrated). Based on the detected values, the side aligning plates 46F, 46R can be moved respectively in either right or left direction by specified movement amounts.

The side aligning plates 46F, 46R slidable on the sheet placement face 24*a* have regulating faces 46*x* which abut to side edges of a sheet. Here, the regulating faces 46*x* can reciprocate by a predetermined stroke mutually in a closing direction or a separating direction. The stroke is determined from difference between the maximum sheet size and the minimum sheet size and the offset amount of positional movement (offset conveyance) of an aligned sheet bundle rightward or leftward. That is, the movement stroke of the right-left side aligning plates 46F, 46R is determined from a movement amount for aligning sheets having different sizes and the offset amount of the aligned sheet bundle. Here, not limited to the illustrated rack-pinion mechanism, it is also possible to adopt a structure that the side aligning plates 46F, 46R are fixed to a timing belt and the timing belt is connected to a motor via a pulley to reciprocate laterally.

According to the above structure, a binding process controller 75 causes the right-left side aligning members 46F, 46R at predetermined waiting positions (distanced by a sheet width+.alpha. therebetween) based on sheet size information which is provided from the image forming unit A or the like. In the above state, a sheet is introduced onto the processing tray 24. At the timing when a sheet end is abutted to the sheet end regulating member 41, aligning operation is started. In the aligning operation, the right-left aligning motors M6, M7 are rotated in opposite directions (closing directions) by the same amount. Accordingly, sheets introduced onto the processing tray 24 are stacked in a bundle shape as being positioned in reference to the sheet center. According to repetition of the introducing operation and the aligning operation, sheets are collated and stacked on the processing tray 24 in a bundle shape. Here, sheets of different sizes are positioned in center reference.

It is possible to perform a binding process at a plurality of positions at a predetermined interval (i.e., multi-binding process) on the sheets stacked on the processing tray 24 in center reference as described above in the above posture at a tailing end (or a leading end) of the sheets. In a case of performing a binding process on a sheet corner, one of the right-left side aligning members 46F, 46R is moved to and stopped at a position where a sheet side end is matched with a specified binding position. Then, the side aligning member at the opposite side is moved in the closing direction. A movement amount in the closing direction is calculated in accordance with a sheet size. Accordingly, a sheet introduced onto the processing tray 24 is aligned so that a right side end is matched with a binding position in a case of right corner binding and a left side end is matched with a binding position in a case of left corner binding.

When a sheet bundle aligned at a predetermined position on the processing tray 24 as described above is offset-moved for a later-mentioned eco-binding process, (1) drive control that the aligning member at the rear side in the movement direction is moved in a direction perpendicular to the sheet conveying direction by a previously set amount in a state that the aligning member at the front side in the movement direction is retracted to a position being apart from an offset assumed position, or (2) drive control that the right-left aligning members are moved in a direction perpendicular to the sheet conveying direction by the same amount.

Here, position sensors (not illustrated) such as a position sensor and an encode sensor are arranged at the right-left side aligning members 46F, 46R and the aligning motors M6, M7 therefor to detect positions of the side aligning members 46F, 46R. Owing to that the aligning motors M6, M7 are structured with stepping motors, home positions of the side aligning members 46F, 46R are detected by position sensors (not illustrated), and the motors are PWM-controlled, the right-left side aligning members 46F, 46R can be controlled with a relatively simple control configuration.

[Sheet Bundle Discharging Mechanism]

Next, the sheet bundle discharging mechanism (sheet bundle discharging device 60) illustrated in FIGS. 11A to 11D will be described. The sheet bundle discharging mechanism which discharges a sheet bundle bound by the stapling unit 26 or the press binding unit 27 to the stack tray 25 at the downstream side is arranged at the abovementioned processing tray 24. At the processing tray 24 described based on FIG. 5, the first sheet tailing end regulating member 41A is arranged at the sheet center Sx and the second and third sheet tailing end regulating members 41B, 41C are arranged bilaterally as being mutually distanced. A sheet bundle stopped by the regulating members 41 is to be discharged to the stack tray 25 at the downstream side after a binding process is performed thereon by the stapling unit 26 or the press binding unit 27.

The sheet bundle discharging device 60 is arranged along the sheet placement face 24*a* of the processing tray 24. The illustrated sheet bundle discharging device 60 includes a first conveying member 60A and a second conveying member 60B. Here, conveyance in a first zone L1 on the processing tray 24 is performed by the first conveying member 60A and conveyance in a second zone L2 is performed by the second conveying member 60B, so that relay conveyance is performed. Since a sheet bundle is conveyed serially by the first and second conveying members 60A, 60B, mechanisms of the first and second conveying members 60A, 60B can be differently arranged. Here, it is required that the member which conveys a sheet bundle from a starting point being approximately the same as the sheet tailing end regulating device 40 is formed of a less swaying member (elongated supporting member) and a member which causes the sheet bundle to drop at an end point of conveyance is downsized (for travelling on a loop trajectory).

The first conveying member 60A is structured with a first discharging member 61 formed of a folded piece whose section has a channel shape. The first discharging member 61 includes a stopper face 61*a* which stops a tailing end face of a sheet bundle, and a sheet face pressing member 62 (an elastic film member; Mylar piece) which presses an upper face of the sheet bundle stopped by the stopper face 61*a*. As illustrated in the drawing, the first conveying member 60A is formed of a folded piece whose section has a channel shape. Accordingly, fixed to a later-mentioned carrier member 65*a* (belt), the first conveying member 60A moves (feeds) the tailing end of the sheet bundle in the conveying direction as travelling integrally with the belt with less swaying. The first conveying member 60A reciprocates with a stroke Str1 on an approximately linear trajectory without travelling on a loop trajectory curved as described later.

The second conveying member 60B is structured with a second discharging member 63 which has a pawl shape. The second discharging member 63 includes a stopper face 63*a* which stops a tailing end face of a sheet bundle, and a sheet face pressing member 64 which presses an upper face of the sheet bundle. The sheet face pressing member 64 having a sheet face pressing face 64*a* is swingably axis-supported by the second discharging member 63. An urging spring 64*b* is arranged to cause the sheet face pressing face to press the upper face of the sheet bundle.

Figure 11A:
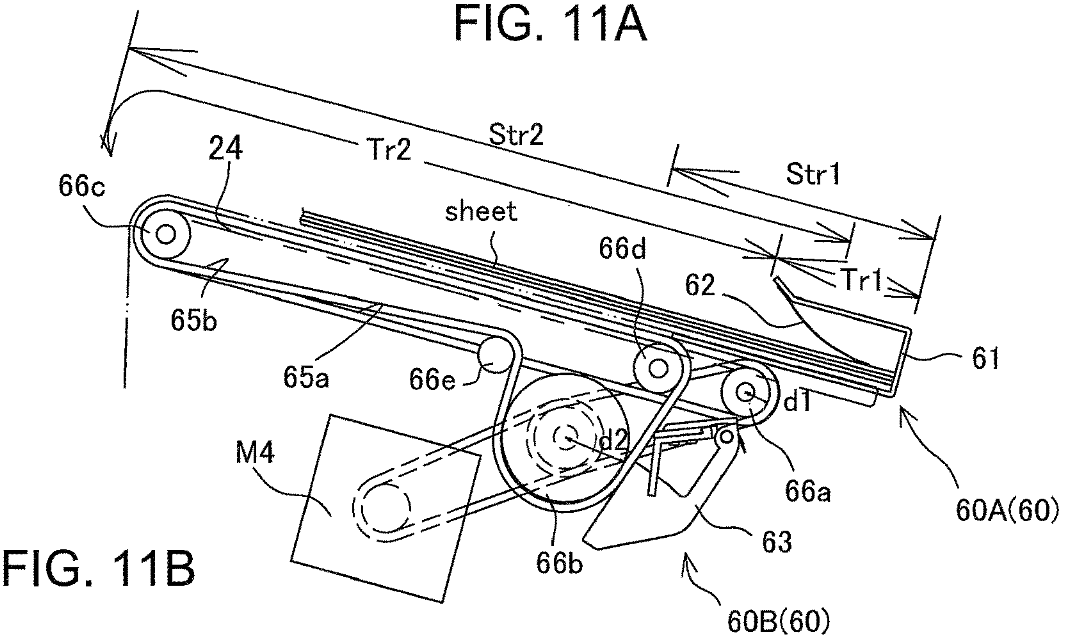
Figure 11B:
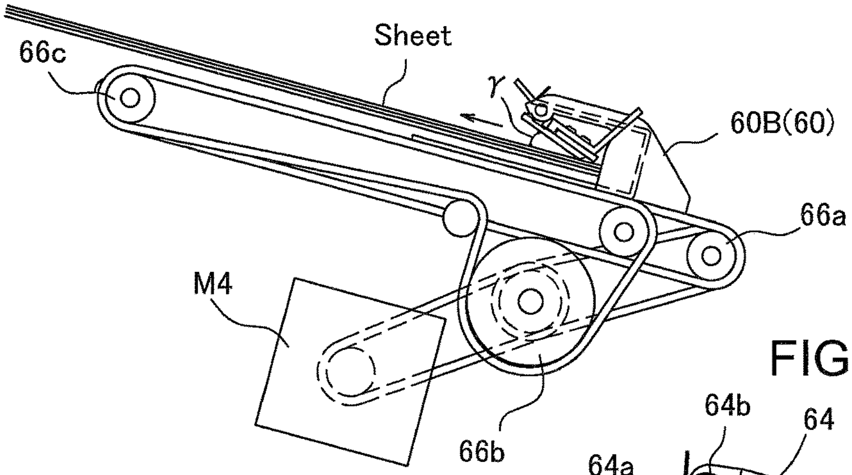
Figure 11C:
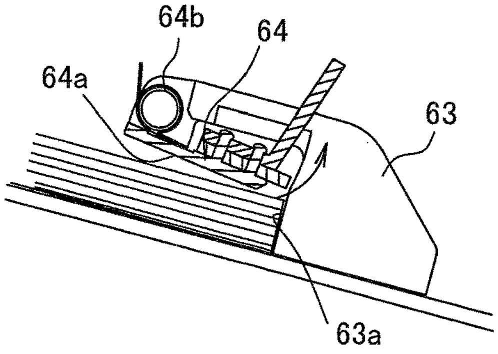
Figure 11D:
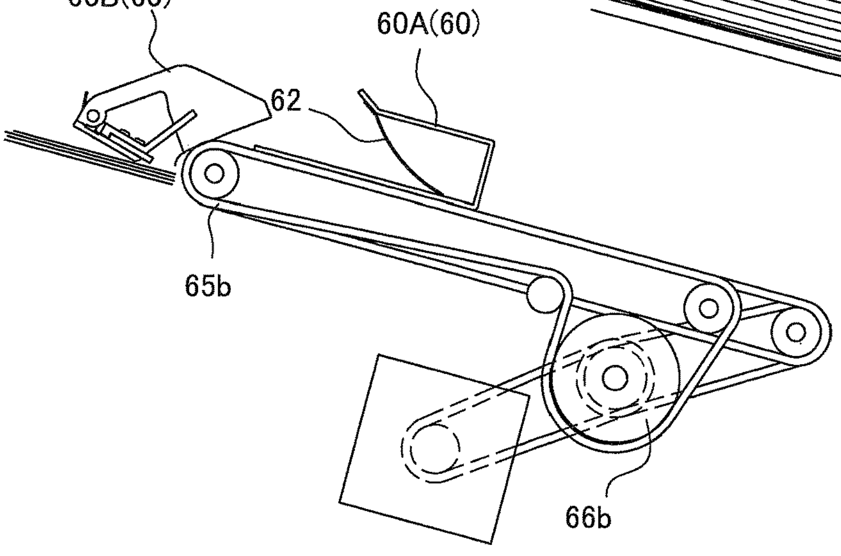

The sheet face pressing face 64*a* is formed as an oblique face oblique to a travelling direction as illustrated and is engaged with the tailing end of the sheet with a setting angle of .gamma. when moved in the arrow direction in FIG. 11B. At that time, the sheet face pressing face 64*a* is deformed upward (counterclockwise in FIG. 11C) in the arrow direction against the urging spring 64*b*. Then, the sheet face pressing face 64*a* presses the upper face of the sheet bundle toward the sheet placement face 24*a* side by the action of the urging spring 64*b*.

Figure 10B:
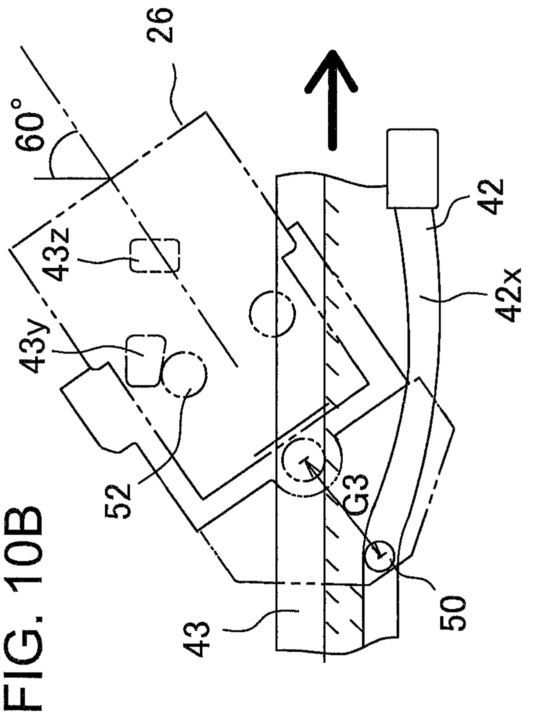
Figure 10C:
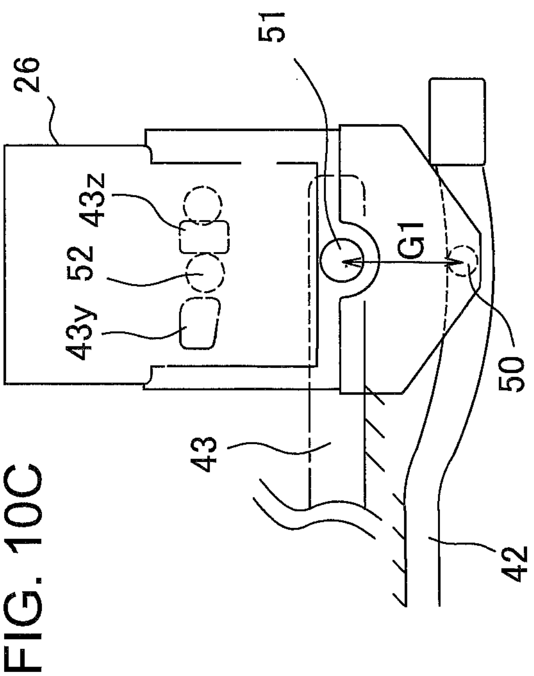
Figure 10A:
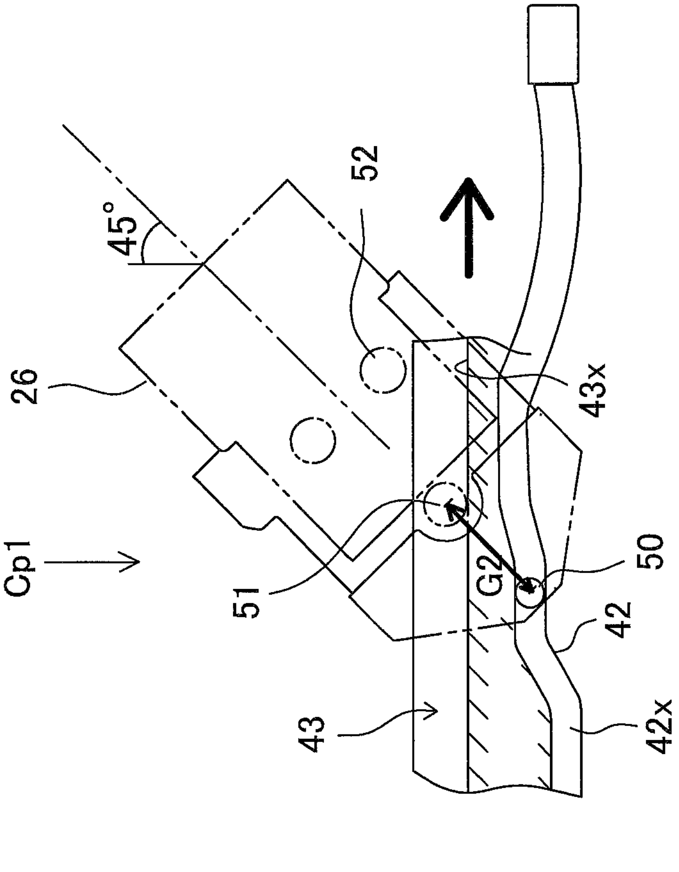

According to the above structure, the first discharging member 61 reciprocate with the first carrier member 65*a* and the second discharging member 63 reciprocate with a second carrier member 65*b* between a base end part and an exit end part of the sheet placement face 24*a*. Driving pulleys 66*a*, 66*b* and a driven pulley 66*c* are arranged at the sheet placement face 24*a* as being mutually distanced by the conveyance stroke. Idling pulleys 66*d*, 66*e* are arranged as illustrated in FIG. 10A.

The first carrier member 65*a* (toothed belt in the drawings) is routed between the driving pulley 66*a* and the driven pulley 66*c*. The second carrier member 65*b* (toothed belt) is routed between the driving pulley 66*b* and the driven pulley 66*c* via the idling pulleys 66*d*, 66*e*. A drive motor M4 is connected to the driving pulleys 66*a*, 66*b*. Here, the first driving pulley 65*a* is formed to have a small diameter and the second driving pulley 65*b* is formed to have a large diameter so that rotating of the drive motor M4 is transmitted to the first carrier member 65*a* at a low speed and to the second carrier member 65*b* at a high speed.

That is, the first conveying member 60A and the second conveying member 60B are connected, to travel respectively at a low speed and a high speed, commonly to the drive motor M4 via a decelerating mechanism (belt pulleys, gear coupling, or the like). In addition, a cam mechanism is incorporated in the second driving pulley 66*b* to delay the drive transmission. This is, as described later, because of difference between the movement stroke Str1 of the first conveying member 60A and the movement stroke Str2 of the second conveying member 60B and positional adjustment of waiting positions of the respective members.

According to the above structure, the first conveying member 60A reciprocates on a linear trajectory with the first stroke Str1 from the tailing end regulation position of the processing tray 24. Here, the first zone Tr1 is set within the first stroke Str1. The second conveying member 60B reciprocates on a semi-loop trajectory with the second stroke Str2 from the first zone Tr1 to the exit end of the processing tray 24. Here, the second zone Tr2 is set within the second stroke Str2.

The first conveying member 60A is moved from the sheet tailing end regulation position to the downstream side (from FIG. 11A to FIG. 11B) at a speed V1 with rotation in one direction of the drive motor M4 to convey the sheet bundle as pushing the tailing end thereof with the stopper face 61*a*. Being delayed by a predetermined time from the first conveying member 60A, the second conveying member 60B projects above the sheet placement face 24*a* from the waiting position (FIG. 11A) at the back face side of the processing tray 24 and is moved at a speed V2 as following the first conveying member 60A in the same direction. Here, since the speed V2 is set to be higher than the speed V1, the sheet bundle on the processing tray 24 is relayed from the first conveying member 60A to the second conveying member 60B.

FIG. 11B illustrates a state of the relay conveyance. The second conveying member 60B travelling at the speed V2 catches up with the sheet bundle travelling at the speed V1. That is, after passing through the first zone Tr1, the second conveying member 60B catches up with the first conveying member 60A and performs conveyance to the downstream side in the second zone Tr2 as being engaged with the tailing end face of the sheet bundle.

When the second conveying member 60B is abutted, at the relay point at a high speed, to the sheet bundle travelling at the speed V1, the sheet bundle is discharged toward the stack tray 25 while the tailing end of the sheet bundle is held as being nipped between the sheet face pressing member 64 and the carrier member (belt) 65*a* (65*b*) with the upper face of the sheet bundle pressed by sheet face pressing face 64*a*.

[Method of Binding Process (Binding Position)]

As described above, sheets conveyed to the introducing port 21 of the sheet discharging path 22 are collated and stacked on the processing tray 24 and positioned (aligned) by the sheet end regulating member 40 and the side aligning members 46F, 46R at the previously-set location and in the previously-set posture. Thereafter, a binding process is performed on the sheet bundle and the sheet bundle is discharged to the stack tray 25 at the downstream side. In the following, a method of the binding process is described.

Multi-binding positions Ma1, Ma2 where sheets are staple-bound at a plurality of positions, corner binding positions Cp1, Cp1 where sheets are bound at a corner, a manual binding position Mp where a binding process is performed on manually-set sheets, and an eco-binding position Ep where sheets are bound at a corner by the press binding unit 27 without using a staple are defined for performing a binding process with the stapling unit 26 or the press binding unit 27 on a sheet bundle aligned into a bundle shape in center reference by the side aligning members 46F, 46R. In the following, positional relation among the respective binding positions will be described.

[Multi-Binding]

As illustrated in FIG. 5, in the multi-binding process, a sheet bundle positioned on the processing tray 24 by the sheet end regulating member 41 and the side aligning members 46F, 46R (hereinafter, called an aligned sheet bundle) is bound at an end edge (a tailing end edge in the drawings). The multi-binding positions Ma1, Ma2 where a binding process is performed on two distanced positions is defined in FIG. 9. The later-mentioned stapling unit 26 is moved from a home position to the binding position Ma1 and the binding position Ma2 in the order thereof and performs a binding process respectively at the binding positions Ma1, Ma2. Here, not limited to two positions, the binding process may be performed at three or more positions as the multi-binding positions Ma. FIG. 12A illustrates a multi-bound state.

[Corner Binding]

The corner binding process defines binding positions as two bilateral positions being a right corner binding position Cp1 where a binding process is performed on a right corner on an aligned sheet bundle stacked on the processing tray 24 and a left corner binding position Cp1 where a binding process is performed on a left corner of an aligned sheet bundle. Here, the binding process is performed with a staple being oblique by a predetermined angle (approximately between 30 to 60 degrees). The later-mentioned stapling unit 26 is mounted on the apparatus frame with the entire unit being oblique by the predetermined angle thereat. FIGS. 12B and 12C illustrate corner-bound states.

FIGS. 12B and 12C illustrate cases that the binding process is performed on either the right or left of a sheet bundle by selection while a staple is set oblique by the predetermined angle. Not limited to the above, even in a case that binding is performed on only one of the right and left corners, it is also possible to adopt a structure that the binding is performed with a staple being parallel to a sheet end edge without being oblique.

[Manual Binding]

In the illustrated apparatus, it is possible to perform a manual stapling process to bind sheets prepared outside the apparatus with the stapling unit 26. Here, the manual setting portion 29 is arranged for setting a sheet bundle to the external casing 20*b* from the outside. A manual setting face 29*a* on which a sheet bundle is set is formed at the casing. The stapling unit 26 is configured to be moved from a sheet introducing area Ar to a manual-feeding area Fr of the processing tray 24. The manual setting face 29*a* is arranged in parallel at a position being adjacent to the sheet placement face 24*a* via the side frame 20*c* at a height to form approximately the same plane with the sheet placement face 24*a* of the processing tray 24. Here, both the sheet placement face 24*a* of the processing tray 24 and the manual setting face 29*a* are arranged approximately at the same height position as supporting sheets approximately at horizontal posture. FIG. 12D illustrates a manual-bound state.

As illustrated in FIG. 5, the manual binding position Mp for the manual stapling process with the stapling unit 26 is arranged on the same straight line as the above-mentioned multi-binding positions Ma1, Ma2. Here, there are arranged, on the processing tray 24, the sheet introducing area Ar, the manual-feeding area Fr at the apparatus front side, and a later-mentioned eco-binding area Rr at the apparatus rear side.

[Eco-Binding Position]

The eco-binding position Ep is defined so that a binding process is performed on a side edge part (corner part) of sheets as illustrated in FIG. 5. The illustrated eco-binding position Ep is defined at a position where the binding process is performed on one position at the side edge part in the sheet discharging direction of a sheet bundle. Then, the binding process is performed as being oblique to sheets by a predetermined angle. The eco-binding position Ep is defined in the eco-binding area Rr which is distanced to the apparatus rear side from the sheet introducing area Ar of the processing tray 24.

[Mutual Relation Among Respective Binding Positions]

The multi-binding positions Ma1, Ma2 are defined in the sheet introducing area Ar (at the inside thereof) where sheets are introduced to the processing tray 24 from the sheet discharging port 23. Each of the corner binding positions Cp1, CP2 is defined outside the sheet introducing area Ar at a reference position which is apart rightward or leftward (side alignment reference) by a predetermined distance from the sheet discharging reference Sx (center reference). As illustrated in FIG. 6, at the outer side from a side edge of a maximum size of sheets to be bound, the right corner binding position Cp1 is defined at a position deviated rightward from a sheet side edge by a predetermined amount (.theta.1) and the left corner binding position Cp2 is defined at a position deviated leftward from a sheet side edge by a predetermined amount (.theta.2). The deviation amounts are set to be the same (.theta.1=.theta.2).

The manual binding position Mp is defined approximately on the same straight line as the multi-binding positions Ma1, Ma2. Further, the corner binding positions Cp1, Cp2 are defined at positions each having an oblique angle (e.g., 45 degrees) to be bilaterally symmetric about the sheet discharging reference Sx.

The manual binding position Mp is defined in the manual-feeding area Fr in the apparatus front side and outside the sheet introducing area Ar. The eco-binding position Ep is defined in the eco-binding area Rr at the apparatus rear side Re and outside the sheet introducing area Ar.

Further, the manual binding position Mp is defined at a position which is offset by a predetermined amount (0*f*1) from the right corner binding position Cp1 of the processing tray 24. The eco-binding position Ep is defined at a position which is offset by a predetermined amount (0*f*2) from the left corner binding position Cp2 of the processing tray 24. Thus, the multi-binding positions Ma1, Ma2 are defined based on the sheet discharging reference (center reference) of the processing tray 24 to which sheets are introduced, and the corner binding positions Cp1, Cp2 are defined based on the maximum sheet size. Further, the manual binding position Mp is defined at the position which is offset by the predetermined amount (OM from the right corner binding position Cp1 to the apparatus front side. Similarly, the eco-binding position Ep is defined at the position which is offset by the predetermined amount (0*f*2) from the left corner binding position Cp2 to the apparatus rear side. According to the above, arrangement can be performed in an orderly manner without causing interference of sheet movement.

Next, the sheet movement for the respective binding processes is described. In the multi-binding process, sheets are introduced to the processing tray 24 in center reference (or side reference) and aligned in the above state, and then, the binding process is performed thereon. After the binding process is performed, the sheets are discharged to the downstream side in the above posture. In the corner binding process, sheets are aligned at the alignment position at a specified side and the binding process is performed thereon. After the binding process is performed, the sheets are discharged to the downstream side in the above posture. In the eco-binding process, sheets introduced onto the processing tray 24 are offset by the predetermined amount Oft to the apparatus rear side after being stacked into a bundle shape. The binding process is performed thereon after the offset movement. After the binding process, the sheets are offset by a predetermined amount (for example, being the same as or smaller than the offset Oft) to the sheet center side and discharged to the downstream side thereafter.

Further, in the manual binding, an operator sets sheets on the manual setting face 29*a* as being offset by the predetermined amount Of1 from the alignment reference which is positioned at the front side from the processing tray 24. According to the above, a plurality of the binding processes are performed while sheet setting positions therefor are defined in the direction perpendicular to the sheet conveying direction. Therefore, sheet jamming can be suppressed while keeping high processing speed.

In the eco-binding process, the later-mentioned binding process controller 75 defines the eco-binding position Ep with sheets offset by a predetermined amount Of3 in the sheet discharging direction from the tailing end reference position. This is to avoid interference between the stapling unit 26 for the left corner binding and an eco-binding unit (press binding unit 27 described later). Here, if the press binding unit 27 is mounted on the apparatus frame 20 movably between the binding position and a retracting position retracting therefrom similarly to the stapling unit 26, sheets are not required to be offset by the amount Of3 in the sheet discharging direction.

Here, the apparatus front side Fr denotes a front side of the external casing 20*b* set by apparatus designing where various kinds of operation are performed by an operator. Normally, a control panel, a mount cover (door) for a sheet cassette, and an open-close cover 28*c* through which staples are replenished for a stapling unit are arranged at the apparatus front side. Further, the apparatus rear side Re denotes a side of the apparatus facing to a wall face of a building, for example, when the apparatus is installed (installation conditions; the back face is designed to face a wall).

Thus, in the illustrated apparatus, the manual binding position Mp is defined at the apparatus front side Fr and the eco-binding position Ep is defined at the apparatus rear side Re outside the sheet introducing area Ar with reference thereto. A distance Ofx between the manual binding position Mp and the reference of the sheet introducing area Ar (sheet introducing reference Sx) is set larger than a distance Ofy between the eco-binding position Ep and the sheet introducing reference Sx (i.e., Ofx>Ofy).

Thus, the manual binding position Mp is defined to be apart from the sheet introducing reference Sx of the processing tray 24 and the eco-binding position Hp is defined to be close to the sheet introducing reference Sx. This is because operation of setting a sheet bundle to the manual binding position Mp from the outside is facilitated to be convenient owing to that the manual binding position Mp is apart from the processing tray 24. Further, the eco-binding position Ep is defined to be close to the sheet introducing reference Sx. This is because the movement amount when sheets (aligned sheet bundle) introduced onto the processing tray 24 are offset-moved to the eco-binding position Ep can be small for speedy performance of the binding process (i.e., improvement of productivity).

[Moving Mechanism for Stapling Unit]

The stapling unit 26 includes a unit frame 26*a* (first unit frame), a staple cartridge 39, a stapling head 26*b*, and an anvil member 26*c*. Structures thereof will be described later. The stapling unit 26 is supported by the apparatus frame 20*a* to reciprocate by a predetermined stroke along a sheet end face of the processing tray 24. The supporting structure will be described in the following.

Figure 8:
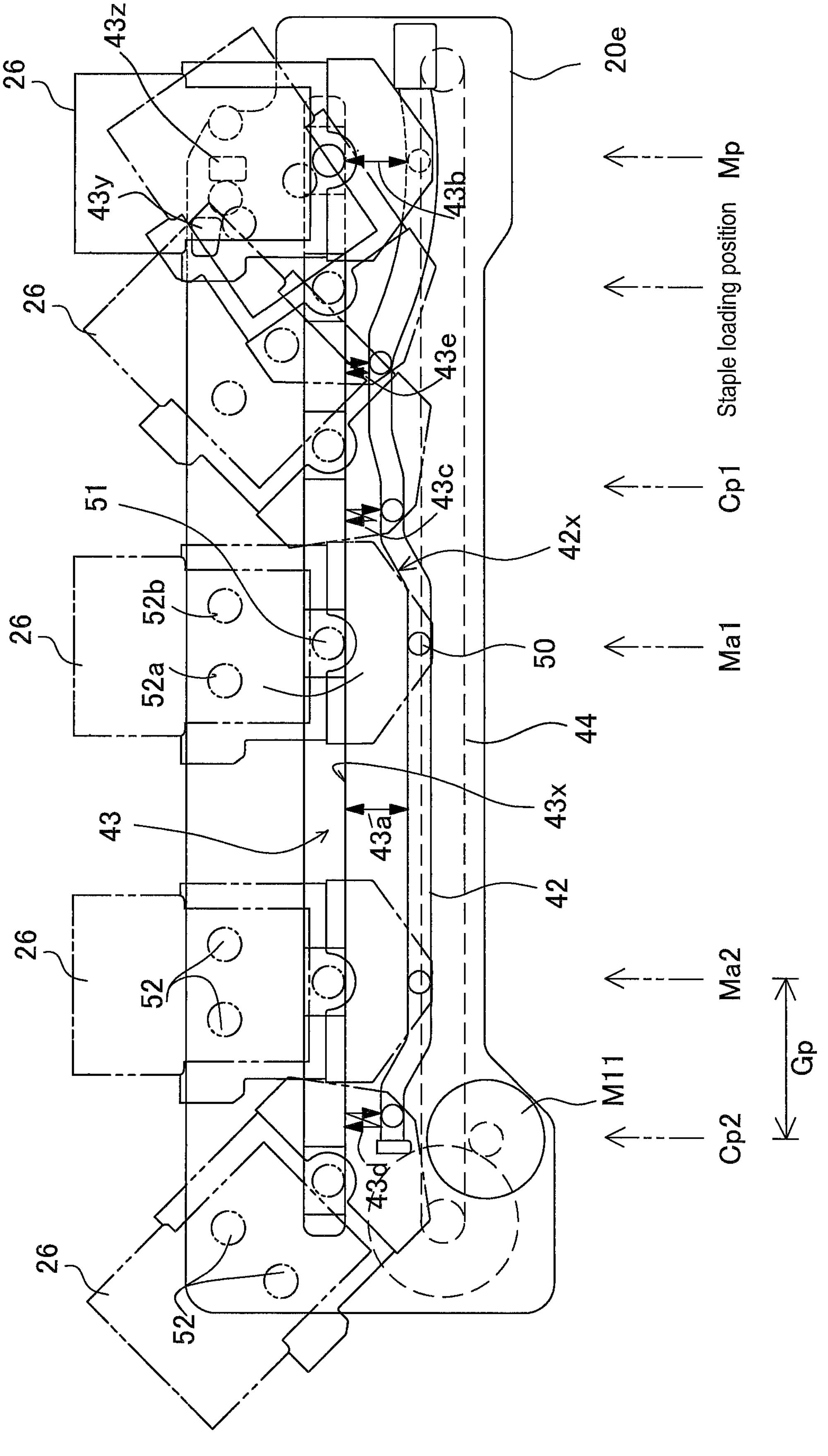
FIG. 8 is an explanatory view illustrating binding positions of the stapling unit.
Figure 9:
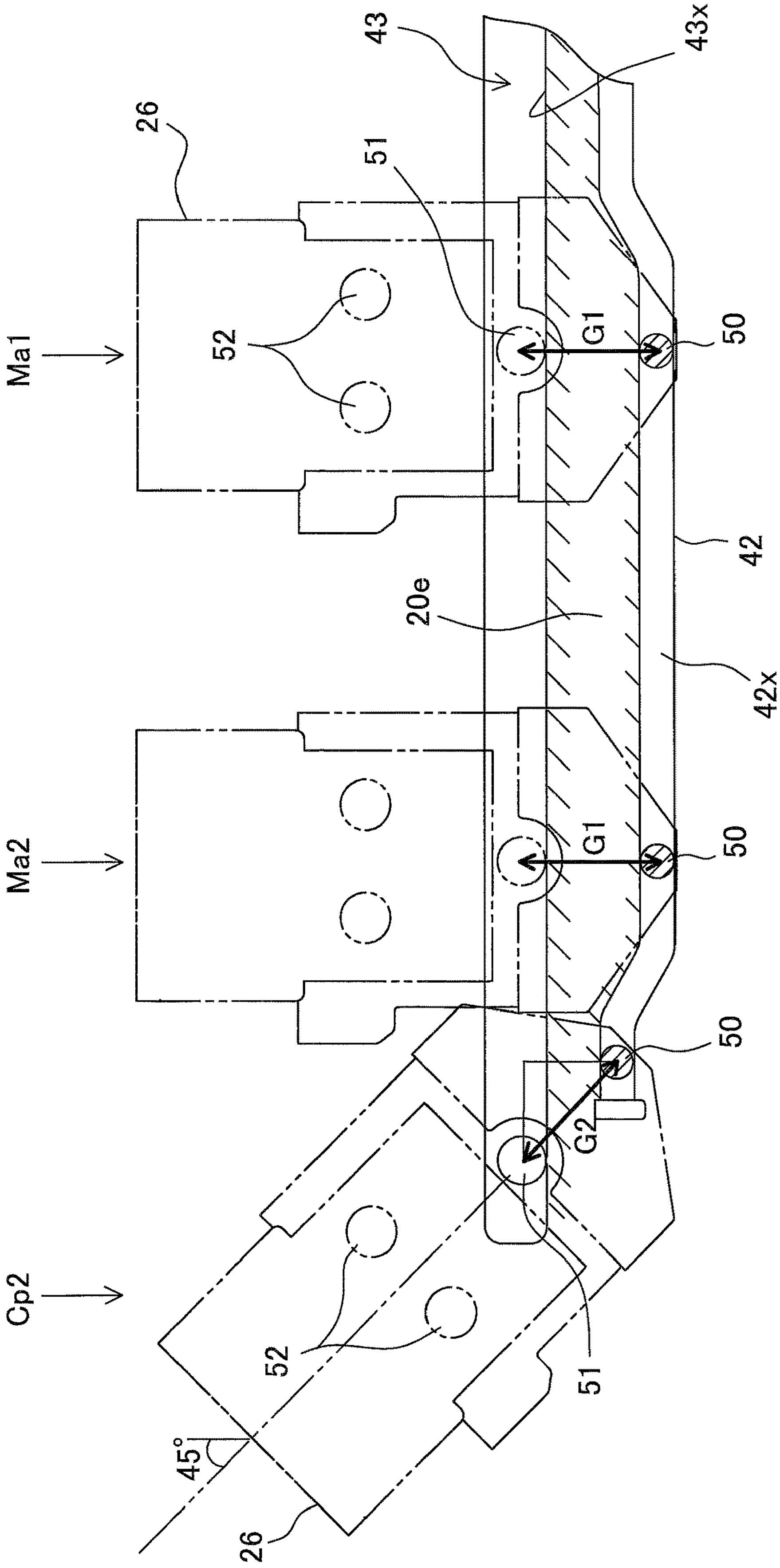
FIG. 9 is an explanatory view of multi-binding and left corner binding of the stapling unit.

FIG. 7 illustrates a front structure that the stapling unit 26 is attached to the apparatus frame 20*a* and FIG. 8 illustrates a plane structure thereof. FIGS. 9 to 10C illustrate partial explanatory views of a guide rail mechanism which guides the stapling unit 26.

As illustrated in FIG. 7, a chassis frame (hereinafter, called a bottom frame) 20*e* is attached to the right-left side frames 20*c*, 20*d* structuring the apparatus frame 20*a*. The stapling unit 26 is mounted on the bottom frame 20*e* to be movable by the predetermined stroke. A travel guide rail (hereinafter, simply called a guide rail) 42 and a slide cam 43 are arranged at the bottom frame 20*e*. A travel rail face 42*x* is formed at the guide rail 42 and a travel cam face 43*x* is formed at the slide cam 43. The travel rail face 42*x* and the travel cam face 43*x* in mutual cooperation support the stapling unit 26 to be capable of reciprocating by the predetermined stroke and control the angular posture thereof.

The travel rail face 42*x* and the travel cam face 43*x* are formed so that the travel guide rail 42 and the slide cam 43 allows the stapling unit 26 to reciprocate within a movement range SL (the sheet introducing area Ar, the manual-feeding area Fr, and the eco-binding area Rr) (see FIG. 8). The travel guide rail 42 is structured with a rail member having the stroke SL along the tailing end regulating member 41 of the processing tray 24. In the drawing, the travel guide rail 42 is structured as an opening groove formed at the bottom frame 20*e*. The travel rail face 42*x* is formed at the edge of the opening and is arranged on the same straight line as the tailing end regulating member 41 of the processing tray 24 as being in parallel thereto. The slide cam 43 is arranged as being distanced from the travel rail face 42*x*. In the drawing, the slide cam 43 is structured with a groove cam which is formed at the bottom frame 20*e*. The travel cam face 43*x* is formed at the groove cam.

A drive belt 44 connected to a drive motor M11 is fixed to the stapling unit 26. The drive belt 44 is wound around a pair of pulleys axially supported by the apparatus frame 20*e*. The drive motor M11 is connected to one of the pulleys. Thus, the stapling unit 26 reciprocates by the stroke SL with forward and reverse rotation of the drive motor M11.

The travel rail face 42*x* and the travel cam face 43*x* are arranged to include a parallel distance sections 43*a*, 43*b* (having a span G1) where the faces are in parallel, a narrow slant distance sections 43*c*, 43*d* (having a span G2), and a narrower slant distance section 43*e* (having a span G3). Here, the spans satisfies the relation of "G1>G2>G3". The span G1 causes the stapling unit 26 to be in a posture as being in parallel to a sheet tailing end edge. The span G2 causes the stapling unit 26 to be in a slant posture rightward or leftward. The span G3 causes the stapling unit 26 to be in a posture slant at a larger angle. Thus, the angle of the stapling unit 26 is varied.

Not limited to the opening groove structure, the travel guide rail 42 may adopt a variety of structures such as a guide rod, a projection rib, and others. Further, not limited to the groove cam, the slide cam 43 may adopt a variety of shapes as long as having a cam face to guide the stapling unit 26 in a predetermined stroke direction, such as a projection stripe rib member.

The stapling unit 26 is engaged with the travel guide rail 42 and the slide cam 43 as follows. As illustrated in FIG. 7, the stapling unit 26 is provided with a first rolling roller (rail fitting member) 50 that is engaged with the travel rail face 42*x* and a second rolling roller (cam follower member) 51 that is engaged with the travel cam face 43*x*. Further, the stapling unit 26 is provided with a sliding roller 52 that is engaged with a support face of the bottom frame 20*e*. The illustrated stapling unit 26 includes two ball-shaped sliding rollers 52*a*, 52*b* at two positions thereof. Further, a guide roller 53 that is engaged with a bottom face of the bottom frame 20*e* is formed at the stapling unit 26 to prevent the stapling unit 26 floating from the bottom frame 20*e*.

According to the above structure, the stapling unit 26 is supported by the bottom frame 20*e* movably via the sliding rollers 52*a*, 52*b* and the guide roller 53. Further, the first rolling roller 50 and the second rolling roller 51 are rotated and moved along the travel rail face 42*x* and the travel cam face 43*x* respectively as following the travel rail face 42*x* and the travel cam face 43*x* respectively.

The travel rail face 42*x* and the travel cam face 43*x* are arranged so that the parallel distance sections (having the span G1) are arranged at the position 43*a* corresponding to the abovementioned multi-binding positions Ma1, Ma2 and the position 43*b* corresponding to the manual binding position Mp. With the span G1, the stapling unit 26 is maintained in a posture as being perpendicular to a sheet end edge without being slant, as illustrated in FIGS. 9 and 10C. Accordingly, at the multi-binding positions Ma1, Ma2 and the manual binding position Mp, a sheet bundle is bound with a staple being in parallel to a sheet end edge.

Further, the travel rail face 42*x* and the travel cam face 43*x* are arranged so that the slant distance sections (having the span G2) are arranged at the position 43*e* corresponding to the right corner binding position Cp1 and the position 43*d* corresponding to the left corner binding position Cp1. The stapling unit 26 is maintained in a rightward-angled posture (for example, rightward-angled by 45 degrees) or in a leftward-angled posture (for example, leftward-angled by 45 degrees), as illustrated in FIGS. 9 and 10A.

Further, the travel rail face 42*x* and the travel cam face 43*x* are arranged so that the slant distance section (having the span G3) is arranged at the position 43*c* corresponding to a position for staple loading. The span G3 is formed to be shorter than the span G2. In this state, the stapling unit 26 is maintained in a rightward-angled posture (for example, rightward-angled by 60 degrees) as illustrated in FIG. 10B. The reason why the angular posture of the stapling unit 26 is varied at the staple loading position is that the posture is matched with an angular direction in which the staple cartridge 39 is mounted thereon. Here, the angle is set in relation with the open-close cover 28*c* arranged at the external casing 20*b*.

For varying the angular posture of the stapling unit 26 using the travel rail face 42*x* and the travel cam face 43*x*, it is preferable from a viewpoint of layout compactification to arrange a second travel cam face or a stopper cam face for angle varying in cooperation with the travel cam face 43*x*.

Next, the stopper cam face will be described with reference to FIG. 8. As illustrated in FIG. 8, stopper faces 43*y*, 43*z* to be engaged with a part of the stapling unit 26 (in the drawing, the sliding roller 52*a*) are arranged at the side frame 20*e* to vary a posture of the stapling unit between the right corner binding position Cp1 and the manual binding position Mp at the apparatus front side. The stapling unit 26 inclined at the staple loading position is required to be corrected in inclination at the manual binding position Mp. When the angle is varied only by the travel rail face 42*x* and the travel cam face 43*x*, the movement distance becomes long.

When the stapling unit 26 is moved toward the manual binding position Mp in a state of being locked by the stopper face 43*y*, the inclination of the stapling unit 26 is corrected. Further, when the stapling unit 26 is returned to the opposite direction from the manual binding position Mp, the stapling unit 26 is (forcedly) inclined to face toward the corner binding position Cp1 by the stopper face 43*z*.

[Stapling Unit]

Figure 13A:
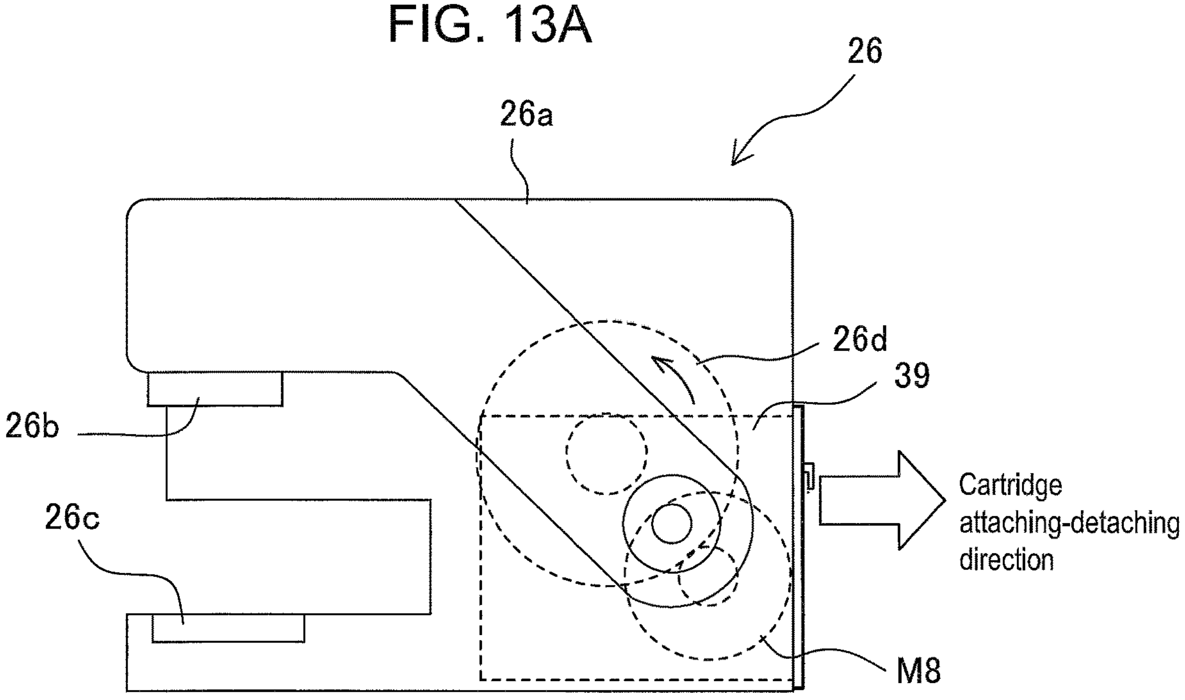
FIG. 13A is a structural explanatory view of the stapling unit and FIG. 13B is a structural explanatory view of a press binding unit.

The stapling unit 26 has been widely known as means to perform a binding process using a staple. An example thereof will be described with reference to FIG. 13A. The stapling unit 26 is structured as a unit separated from the sheet bundle binding processing apparatus (post-processing apparatus B). The stapling unit 26 includes a box-shaped unit frame 26*a*, a drive cam 26*d* swingably axis-supported by the unit frame 26*a*, and a drive motor M8 mounted on the unit frame 26*a* to rotate the drive cam 26*d*.

The stapling head 26*b* and the anvil member 26*c* are arranged at a binding position as being mutually opposed. The stapling head 26*b* is vertically moved between a waiting position at the upper side and a stapling position at the lower side (the anvil member 26*c*) with the drive cam 26*d* and an urging spring (not illustrated). Further, the staple cartridge 39 is mounted on the unit frame 26*a* in a detachably attachable manner.

Linear blank staples are stored in the staple cartridge 39 and fed to the head portion 26*b* by a staple feeding mechanism. A former member to fold a linear staple into a U-shape and a driver to cause the folded staple to bite into a sheet bundle are built in the head portion 26*b*. With such a structure, the drive cam 26*d* is rotated by the drive motor M8 and energy is stored in the urging spring. When the rotational angle reaches a predetermined angle, the head portion 26*b* is vigorously lowered toward the anvil member 26*c*. Owing to this action, a staple is caused to bite into a sheet bundle with the driver after being folded into a U-shape. Then, leading ends of the staple are folded by the anvil member 26*c*, so that staple-binding is completed.

The staple feeding mechanism is built in between the staple cartridge 39 and the stapling head 26*b*. A sensor (empty sensor) to detect staple absence is arranged at the staple feeding mechanism. Further, a cartridge sensor (not illustrated) to detect whether or not the staple cartridge 39 is inserted is arranged at the unit frame 26*a*.

The staple cartridge 39 adopts a structure that belt-shaped connected staples are stacked as being layered or are stored in a roll-shape in a box-shaped cartridge.

Further, a circuit to control the abovementioned sensors and a circuit board to control the drive motor M8 are arranged at the unit frame 26*a* and transmit an alarm signal when the staple cartridge 39 is not mounted or the staple cartridge 39 is empty. Further, the stapling control circuit controls the drive motor M8 to perform the stapling operation with a staple signal and transmits an operation completion signal when the stapling head 26*b* is moved to an anvil position from the waiting position and returned to the waiting position.

[Press Binding Unit]

A structure of the press binding unit 27 will be described based on FIG. 13B. As a press binding mechanism, there have been known a fold-binding mechanism (see Japanese Patent Application Laid-open No. 2011-256008) to perform binding by forming cutout openings at a binding portion of a plurality of sheets and mating as folding a side of each sheet and a press binding mechanism to perform binding by pressure-bonding a sheet bundle with corrugated faces formed on pressurizing faces 27*b*, 27*c* which are capable of being mutually pressure-contacted and separated.

Figure 13B:
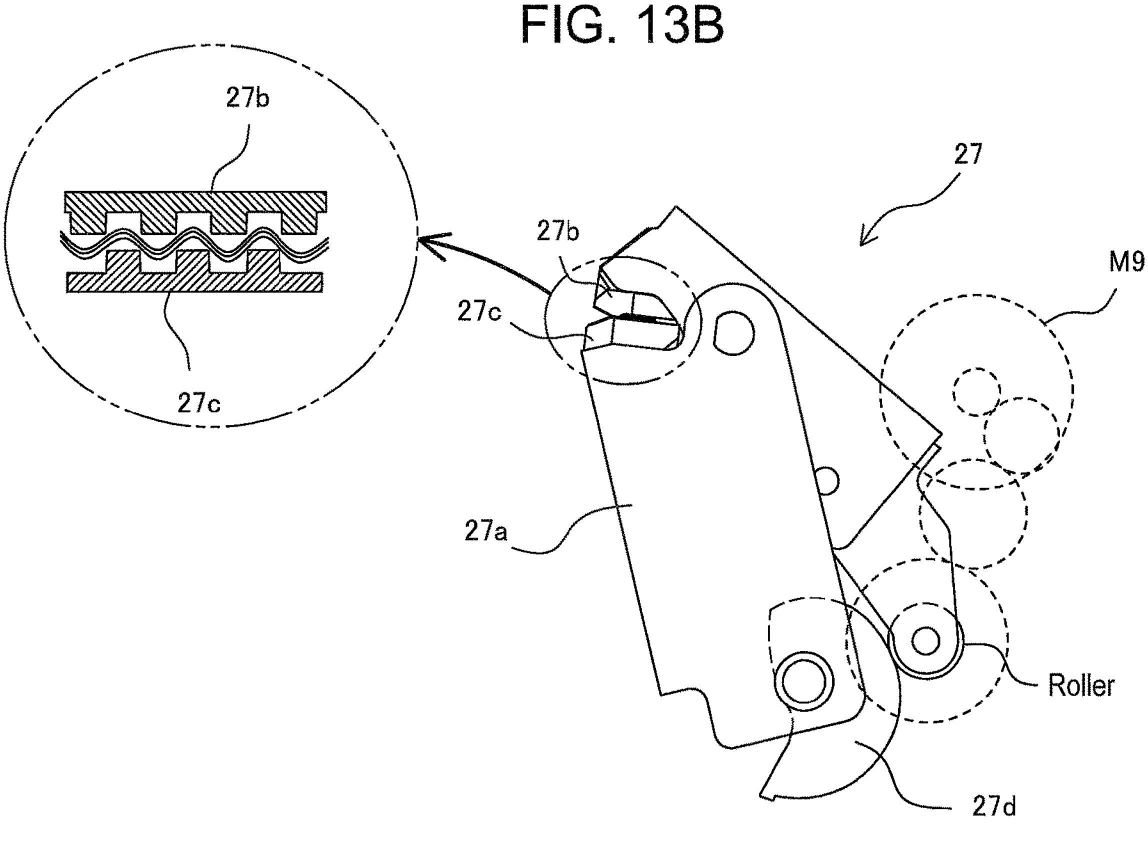

FIG. 13B illustrates the press binding unit 27. A movable frame member 27*d* is axis-supported by a base frame member 27*a* and both the frames are swung about a support shaft 27*x* as being capable of being mutually pressure-contacted and separated. A follower roller 27*f* is arranged at the movable frame member 27*b* and is engaged with a drive cam 27*e* arranged at the base frame 27*a*.

A drive motor M9 arranged at the base frame member 27*a* is connected to the drive cam 27*e* via a deceleration mechanism. Rotation of the drive motor M9 causes the drive cam 27*e* to be rotated and the movable frame member 27*d* is swung by a cam face (eccentric cam in FIG. 13B) thereof.

The lower pressurizing face 27*c* and the upper pressurizing face 27*b* are arranged respectively at the based frame member 27*a* and the movable frame member 27*d* as being mutually opposed. An urging spring (not illustrated) is arranged between the base frame member 27*a* and the movable frame member 27*d* to urge both the pressurizing faces 27*a*, 27*d* in a direction to be separated.

As illustrated in an enlarged view of FIG. 13B, convex stripes are formed on one of the upper pressurizing face 27*b* and the lower pressurizing face 27*c* and concave grooves to be matched therewith are formed on the other thereof. The convex stripes and the concave grooves are formed respectively into rib-shapes as having predetermined length. A sheet bundle nipped between the upper pressuring face 27*b* and the lower pressurizing face 27*c* is intimately contacted as being deformed into a corrugation shape. A position sensor (not illustrated) is arranged at the base frame member (unit frame) 27*a* and detects whether or not the upper and lower pressurizing faces 27*b*, 27*c* are at the pressurization positions or separated positions.

[Stack Tray]

A structure of the stack tray 25 will be described based on FIG. 14. The stack tray 25 is arranged at the downstream side of the processing tray 24. A sheet bundle stacked on the processing tray 24 is stacked and stored onto the stack tray 25. A tray lifting-lowering mechanism is arranged so that the stack tray 25 is sequentially lowered in accordance with a stacked amount thereon. Height of a stack face 25*a* of the stack tray 25 is controlled so that the upmost sheet thereon is to be approximately flush with the sheet placement face 24*a* of the processing tray 24. Further, stacked sheets are inclined by an angle with a tailing end edge in the sheet discharging direction abutted to a tray aligning face 20*f* by gravity.

Specifically, a lifting-lowering rail 54 is vertically anchored in the stacking direction to the apparatus frame 20*a*. A tray base body 25*x* is fitted to the lifting-lowering rail 54 as being capable of being lifted and lowered using a slide roller 55 or the like in a slidable manner. A rack 25*r* is formed in the lifting-lowering direction integrally with the tray base body 25*x*. A drive pinion 56 axis-supported by the apparatus frame 20*a* is engaged with the rack 25*r*. Then, a lifting-lowering motor M10 is connected to the drive pinion 56 via a worm gear 56 and a worm wheel 58.

Accordingly, when the lifting-lowering motor M10 is rotated forwardly and reversely, the rack 25*r* connected to the drive pinion 56 is moved to the upper side and lower side of the apparatus frame 20*a*. With the above structure, the tray base body 25*x* is lifted and lowered in a cantilevered state. Besides such a rack-pinion mechanism, the tray lifting-lowering mechanism may adopt a pulley-mounted belt mechanism or the like.

The stack tray 25 is integrally attached to the tray base body 25*x*. Sheets are stacked and stored on the stack face 25*a* thereof. The tray alignment face 20*f* to support sheet tailing end edges is vertically formed in the sheet stacking direction. In FIG. 14, the tray alignment face 20*f* is formed with the apparatus casing.

Figure 14:
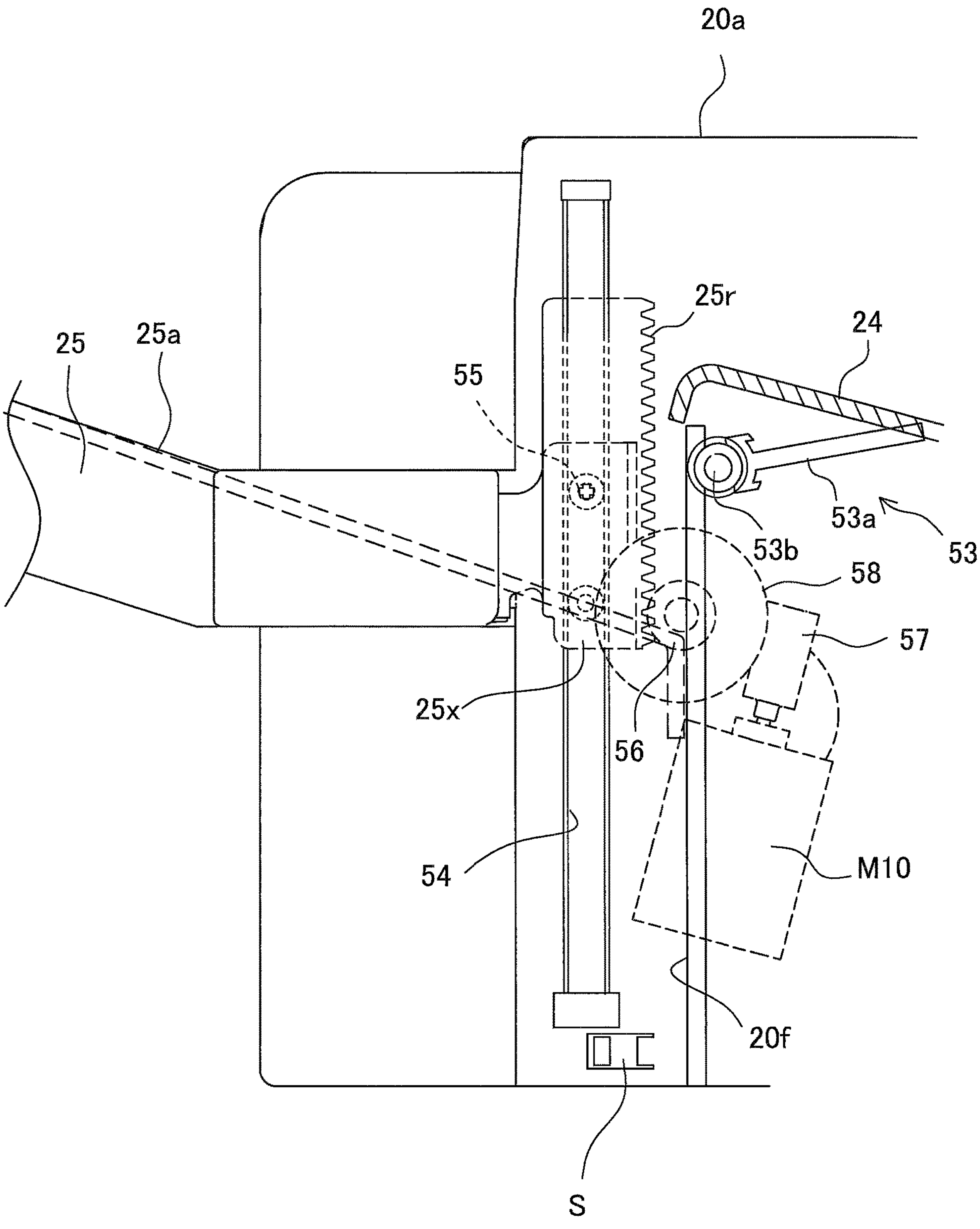
FIG. 14 is a structural explanatory view of the stack tray in the apparatus of FIG. 2.

Further, the stack tray 25 integrally attached to the tray base body 25*x* is arranged as being inclined in an angled direction as illustrated in FIG. 14. The angle (for example, 20 to 60 degrees) is set so that sheet tailing ends are abutted to the tray alignment face 20*f* by gravity.

[Sheet Holding Mechanism]

A sheet holding mechanism 53 to press the upmost stacked sheet is arranged at the stack tray 25. The illustrated sheet holding mechanism includes an elastic pressing member 53*a* to press the upmost sheet, an axis-supporting member 53*b* to cause the elastic pressing member 53*a* to be rotatably axis-supported by the apparatus frame 20*a*, a drive motor M2 to rotate the axis-supporting member 53*b* by a predetermined angle, and a transmitting mechanism thereof. The drive motor M2 is drive-connected to the drive motor of the sheet bundle discharging mechanism 60 as a drive source. When a sheet bundle is introduced (discharged) to the stack tray 25, the elastic pressing member 53*a* is retracted to the outside of the stack tray 25. After a tailing end of the sheet bundle is stored on the upmost sheet on the stack tray 25, the elastic pressing member 53*a* is rotated counterclockwise from the waiting position and presses the upmost sheet as being engaged therewith.

Then, owing to an initial rotational operation of the drive motor M2 to discharge a sheet bundle on the processing tray 24 toward the stack tray 25, the elastic pressing member 53*a* is retracted from a sheet face of the upmost sheet on the stack tray 25 to the retracting position.

[Level Sensor]

A level sensor to detect a sheet height of the upmost sheet is arranged at the stack tray 25. The lifting motor is rotated based on a detection signal of the level sensor, so that the tray sheet placement face 25*a* is lifted. A variety of mechanisms are known as the level sensor mechanism. In the drawing, the level sensor mechanism adopts a detection method to detect whether or not a sheet exists at the height position by emitting detection light from the tray alignment face 20*f* of the apparatus frame 20*a* to the tray upper side and detecting reflection light thereof.

[Stack Sheet Amount Sensor]

Similarly to the level sensor, a sensor to detect detaching of sheets from the stack tray 25 is arranged at the stack tray 25. It is possible to detect whether or not sheets exists on the stack face, for example, by arranging a sensor lever which is rotated integrally with the elastic pressing member 53*a* of the sheet holding mechanism 53 and detecting the sensor lever with a sensor element. Here, detailed description on the structure thereof is skipped. When the height position of the sensor lever becomes different (varied) between before and after discharging of a sheet bundle, the later-mentioned binding process controller 75 stops the sheet discharging operation or lifts the stack tray 25 to a predetermined position, for example. Such an operation is performed in an abnormal case, for example, in a case that a user carelessly removes sheets from the stack tray 25 during apparatus operation. Further, a lower limit position is defined for the stack tray 25 not to be lowered abnormally. A limit sensor Se3 to detect the stack tray 25 is arranged at the lower limit position.

[Manual Setting Portion Mechanism]

A mechanism of the abovementioned manual setting portion 29 will be described with reference to FIGS. 5 and 15 to 17. The manual setting portion 29 to insert and set a sheet bundle from the outside is arranged at the apparatus front side Fr of the external casing 20*b* of the apparatus housing 20 (see FIG. 2). The manual setting face 29*a* formed into a tray shape for supporting a sheet bundle is arranged at the manual setting portion 29. The illustrated manual setting face 29*a* (hereinafter, simply called setting face) is resin-molded as being integrally formed with the external casing 29*b*.

As illustrated in FIG. 5, the setting face 29*a* is arranged to support a sheet (bundle) on a plane being approximately flush with the sheet placement face 24*a* of the processing tray 24. Not limited to the horizontal plane, the sheet placement face 24*a* and the setting face 29*a* may form a face inclined by a predetermined angle or a curved face. Further, a slight step may be formed therebetween. That is, as described above, the sheet placement face 24*a* and the setting face 29*a* are simply required to be arranged so that the stapling unit 26 that are moved between the sheet introducing area Ar and the manual feeding area Fr can perform a stapling process on a sheet bundle on the sheet placement face 24*a* and a sheet bundle on the setting face 29*a*.

The sheet placement face 24*a* and the setting face 29*a* are bilaterally arranged via the side frame 20*c* of the apparatus frame 20. As illustrated in FIG. 5, the multi-binding positions Ma are defined at the sheet placement face 24*a* side and the manual binding position Mp is defined at the setting face 29*a* side.

Figure 15:
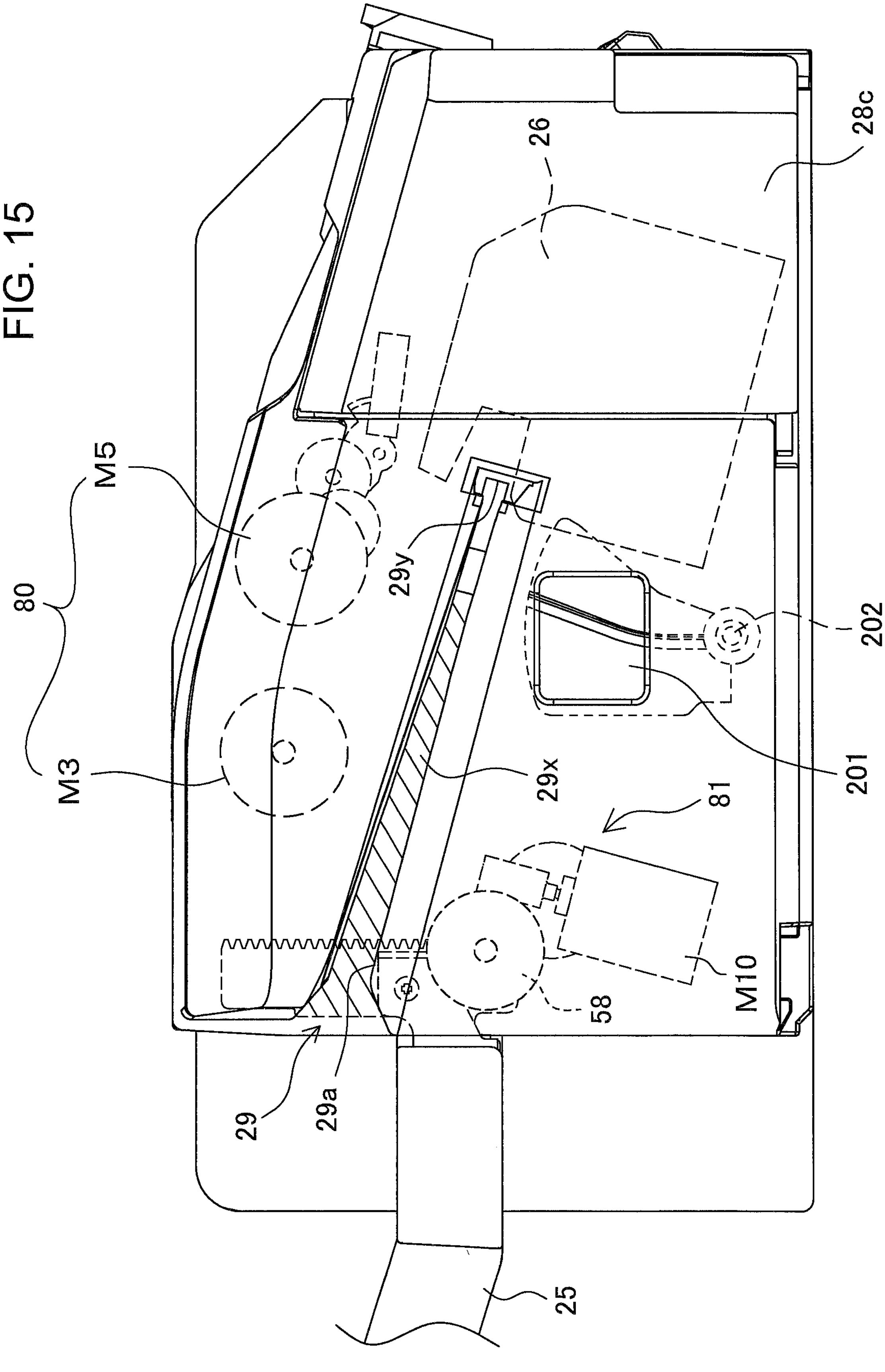
FIG. 15 is an explanatory view of an arrangement relation of driving portions in the apparatus of FIG. 2.

The manual setting portion 29 is integrally formed with the external casing 20*b*. As illustrated in FIG. 15, a recess portion (slit portion, as the case may be) with a first driving portion 80 arranged at the upper side and a second driving portion 81 at the lower side is integrally formed by molding. The setting face 29*a* is formed at the recess portion. The paddle lifting-lowering motor M3, the roulette lifting-lowering motor M5, and a transmission mechanism therefor are arranged at the first driving portion 80. Further, the stack-tray lifting-lowering motor M10 and a transmission mechanism (rack-and-pinion, or the like) therefor are arranged at the second driving portion 81. Here, not limited to the driving mechanism disclosed in the present embodiment, driving mechanisms arranged in the first driving portion 80 and the second driving portion 81 may adopt a structure such as a moving mechanism of the stapling unit, respectively.

Thus, the first driving portion 80 is arranged at the upper side and the second driving portion 81 is arranged at the lower side of the manual setting portion 29 that is formed as the slit-shaped recess portion. Accordingly, the post-processing apparatus is compactly formed and prevents foreign matters from falling and enters to the setting face 29*a*.

Further, an open-close cover 28*c* is formed at the external casing 20*b* at a position being different from the setting face 29*a*. The setting face 29*a* and the open-close cover 28*c* are arranged so as to be mutually opposed via the stapling unit 26. In FIG. 15, the setting face 29*a* is arranged at the front side (downstream side) in the sheet discharging direction and the open-close cover 28*c* is arranged at the rear side (upstream side) therein. Owing to that the setting face 29*a* and the open-close cover 28*c* are arranged at different positions of the external casing 20*b*, the setting face 29*a* is prevented from rattling and shifting.

Figure 16:
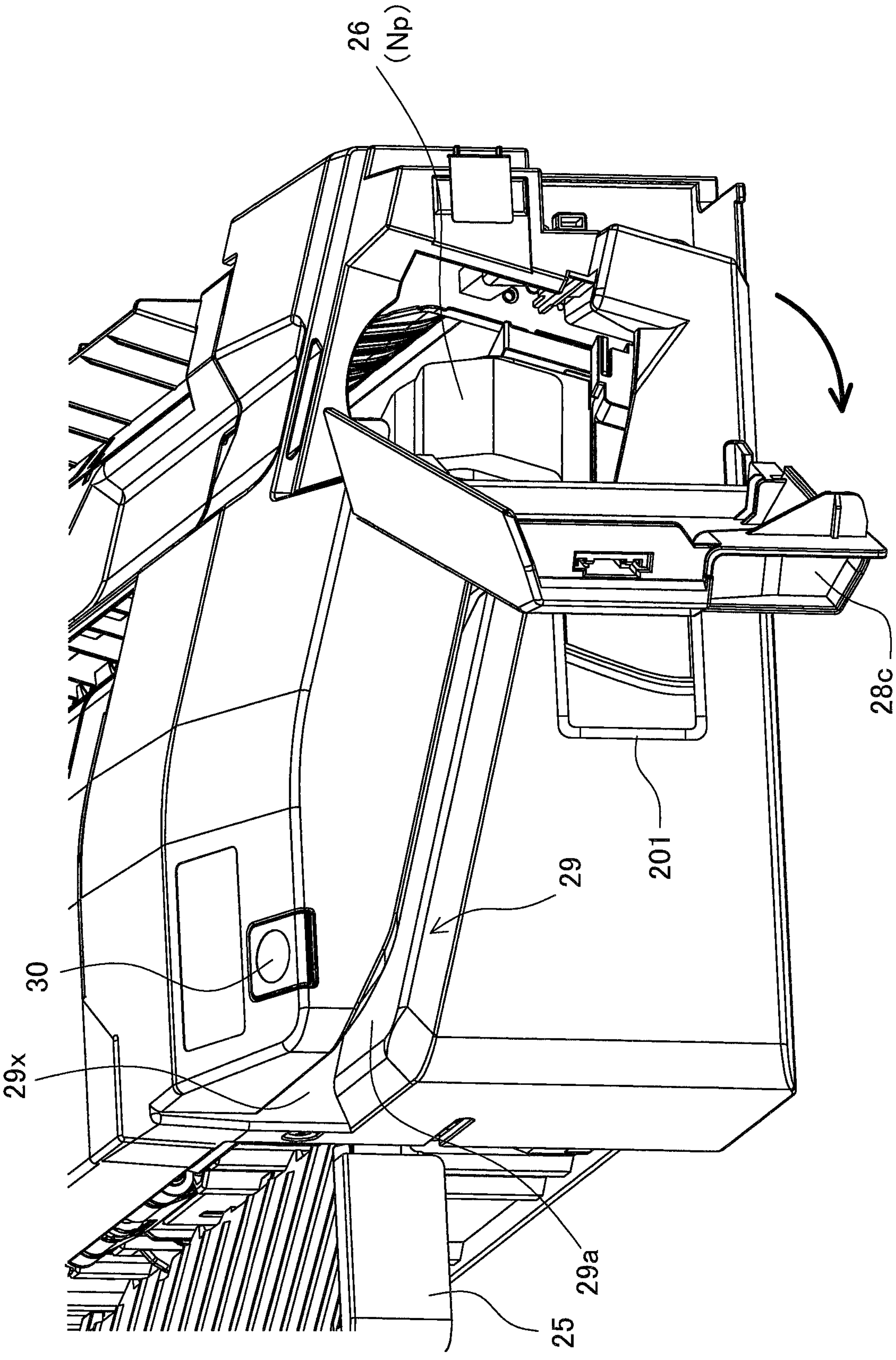
FIG. 16 is an explanatory view of a state of replenishing staples in a staple unit with an open-close cover opened.

Next, relation between the open-close cover 28*c* and the stapling unit 26 will be described with reference to FIG. 16. As described based on FIG. 5, the stapling unit 26 is supported by the guide rail (the travel rail face 42*x* formed at the opening groove of the bottom frame 20*e*) and the travel cam face 43*x* (the slide cam, a cam member). In the manual feeding area Fr, the stapling unit 26 moves between the staple loading position Np and the manual binding position Mp (See FIG. 8). At the staple loading position Np, the stapling unit 26 is inclined by a predetermined angle (60 degrees) by the action of a stopper face 43*y*. The angle is set so that the staple cartridge 39 is matched in posture with a loading direction (see FIG. 16).

First and second regulating faces 29*x*, 29*y* to which a set sheet bundle is abutted are arranged at the above-mentioned setting face 29*a*. The first regulating face 29*x* that stops a side end face of a sheet bundle and the second regulating face 29*y* that stops a tailing end face of a sheet bundle are arranged in the apparatus at the setting portion 29. Accordingly, when a sheet bundle is inserted onto the slit-shaped setting face 29*a* from the outside of the apparatus, the sheet bundle is positioned with a side edge thereof stopped by the first regulating face 29*x* and a tailing end edge stopped by the second regulating face 29*y*.

Figure 17:
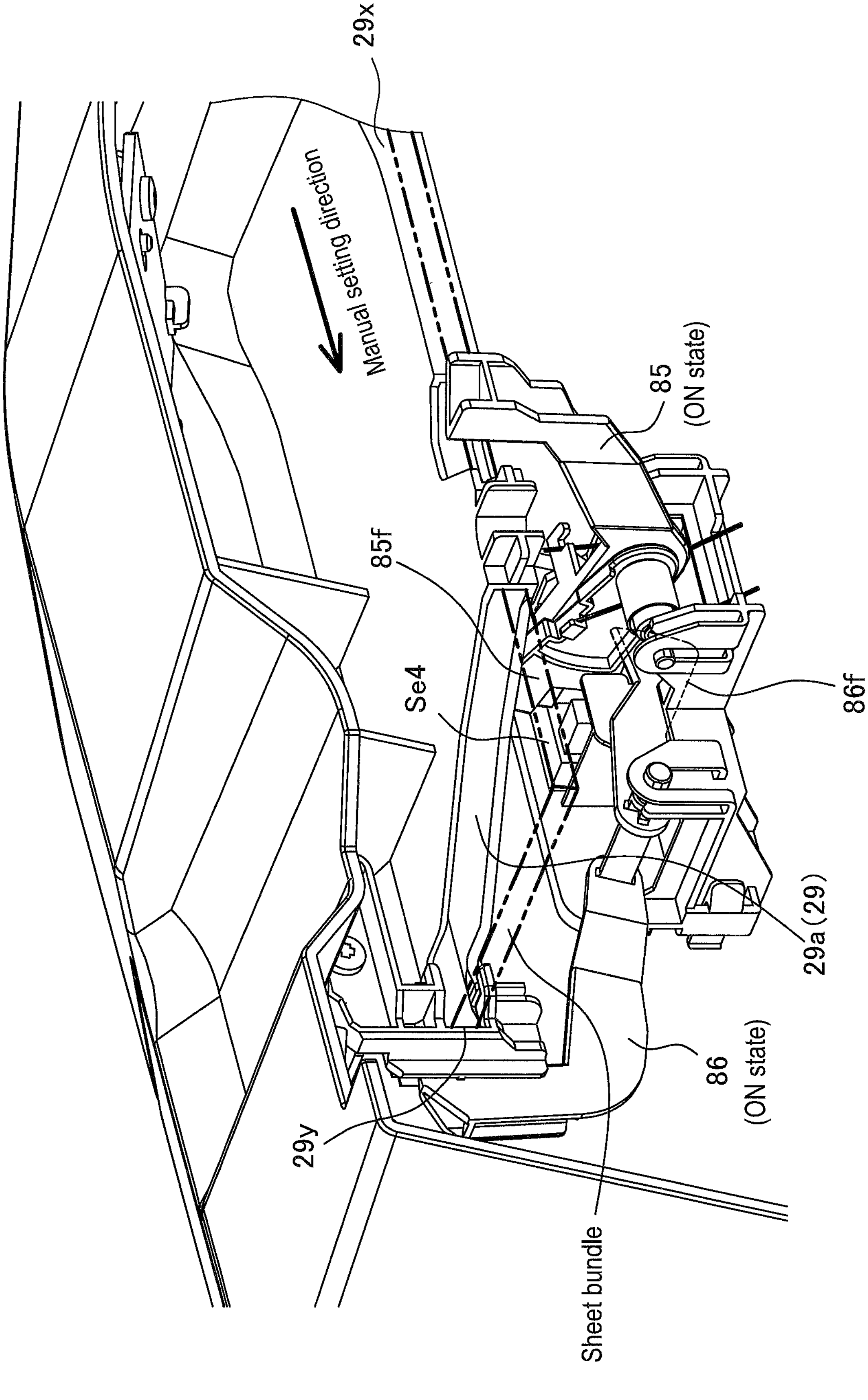
FIG. 17 is an explanatory view of a sheet detecting sensor arranged at a manual setting face in the post-processing apparatus of FIG. 2.

As illustrated in FIG. 17, a sensor Se4 to detect a state that a sheet bundle is engaged with the first regulating face 29*x* and the second regulating face 29*y* is arranged at the setting face 29*a*. A first sheet contacting lever 85 to be engaged with a subsequent sheet bundle and a second sheet contacting lever 86 to be engaged with a tailing end edge of a sheet bundle are swingably axis-supported respectively at the first regulating face 29*x* and the second regulating face 29*y*.

There are arranged a sensor flag 85*f* that follows swing motion of the first sheet contacting lever 85 and a sensor flag 86*f* that follows swing motion of the second sheet contacting lever 86. The photosensor Se4 is arranged to detect the sensor flag 85*f* (86*f*). Here, the first sheet contacting lever 85 maintains the sensor flag 85*f* at an OFF position with an urging spring (not illustrated). Similarly, the second sheet contacting lever 86 maintains the sensor flag 86*f* at an OFF position with an urging spring (not illustrated). Insertion of a sheet bundle causes both of the first and second sheet contacting levers 85, 86 to move the sensor flags 85*f*, 86*f* to ON positions and the photosensor Se4 detects the movement.

[Image Forming System]

As illustrated in FIG. 1, the image forming unit A includes a sheet feeding portion 1, an image forming portion 2, a sheet discharging portion 3, and a signal processing portion (not illustrated) as being built in an apparatus housing 4. The sheet feeding portion 1 includes a cassette 5 in which sheets are stored. In FIG. 1, the sheet feeding portion 1 includes a plurality of the cassettes 5*a*, 5*b*, 5*c* to be capable of storing sheets having different sizes. Each of the cassettes 5*a*, 5*b*, 5*c* incorporates a sheet feeding roller 6 to feed a sheet and a separating device (a separating pawl, a separating roller, or the like) to separates sheets one by one.

Further, a sheet feeding path 7 is arranged at the sheet feeding portion 1 for feeding a sheet from each cassette 5 to the image forming portion 2. A pair of resist rollers 8 are arranged at an end of the sheet feeding path 7, so that a sheet fed from each cassette 5 is aligned at a leading end thereof and caused to wait to be fed in accordance with image forming timing of the image forming portion 2.

Thus, the sheet feeding portion 1 includes a plurality of cassettes in accordance with apparatus specifications and feeds a sheet of a size selected by a controller to the image forming portion 2 at the downstream side. Each cassette 5 is mounted on the apparatus housing 4 in a detachably attachable manner to be capable of replenishing sheets.

The image forming portion 2 may adopt one of various image forming mechanisms to form an image on a sheet. FIG. 1 illustrates an electrostatic image forming mechanism. As illustrated in FIG. 1, a plurality of drums 9*a* to 9*d* each including a photo conductor in accordance with color elements are arranged at the apparatus housing 4. A light emitter (laser head or the like) 10 and a developer 11 are arranged at each of the drums 9*a* to 9*d*. A latent image (electrostatic image) is formed by the light emitter 10 at each of the drums 9*a* to 9*d* and toner ink is caused to adhere thereto by the developer 11. The ink images adhering on the respective drums 9*a* to 9*d* are superimposed to be an image as being transferred on a transfer belt 12 with respect to the respective color elements. The transferred image formed on the transfer belt 12 is transferred by a charger 13 onto a sheet fed from the sheet feeding portion 1 and fixed by a fixing device (heating roller) 14, and then, is fed to the sheet discharging portion 3.

The sheet discharging portion 3 includes the sheet discharging port 16 to discharge a sheet to the sheet discharging space 15 formed in the apparatus housing 4 and a sheet discharging path 17 to guide the sheet from the image forming portion 2 to the sheet discharging port 16. A later-mentioned duplex path 18 is continuously arranged at the sheet discharging portion 3, so that a sheet having an image formed on the front face thereof is re-fed to the image forming portion 2 after being face-reversed.

The sheet having an image formed on the front face thereof by the image forming portion 2 is face-reversed and re-fed to the image forming portion 2 through the duplex path 18. The sheet is discharged from the sheet discharging port 16 after an image is formed on the back face by the image forming portion 2. The duplex path 18 includes a switchback path to re-feed a sheet fed from the image forming portion 2 in the apparatus as inverting the conveying direction thereof and a U-turn path 18*a* to face-reverse the sheet re-fed into the apparatus. In the illustrated apparatus, the switchback path is formed on the sheet discharging path of the later-mentioned post-processing unit B.

[Image Reading Unit]

The image reading unit C includes a platen 19*a* and a reading carriage 19*b* which reciprocates along the platen 19*a*. The platen 19*a* is formed of transparent glass and includes a still image reading face to scan a still image with movement of the reading carriage 19*b* and a travel image reading face to read a document image travelling at a predetermined speed.

The reading carriage 19*b* includes a light source lamp, a reflection mirror to polarize reflection light from a document, and a photoelectric conversion element (not illustrated). The photoelectric conversion element includes line sensors arranged in the document width direction (main scanning direction) on the platen 19*a*. The reading carriage 19*b* reciprocates in a sub scanning direction being perpendicular thereto, so that a document image is to be read in line order. Further, an automatic document feeding unit D to cause a document to travel at a predetermined speed is arranged above the travel image reading face of the platen 19*a*. The automatic document feeding unit D includes a feeding mechanism to feed document sheets set on a sheet feeding tray to the platen 19*a* one by one and to store each document sheet in a sheet discharging tray after each image is read.

[Description of Control Configuration]

Figure 19:
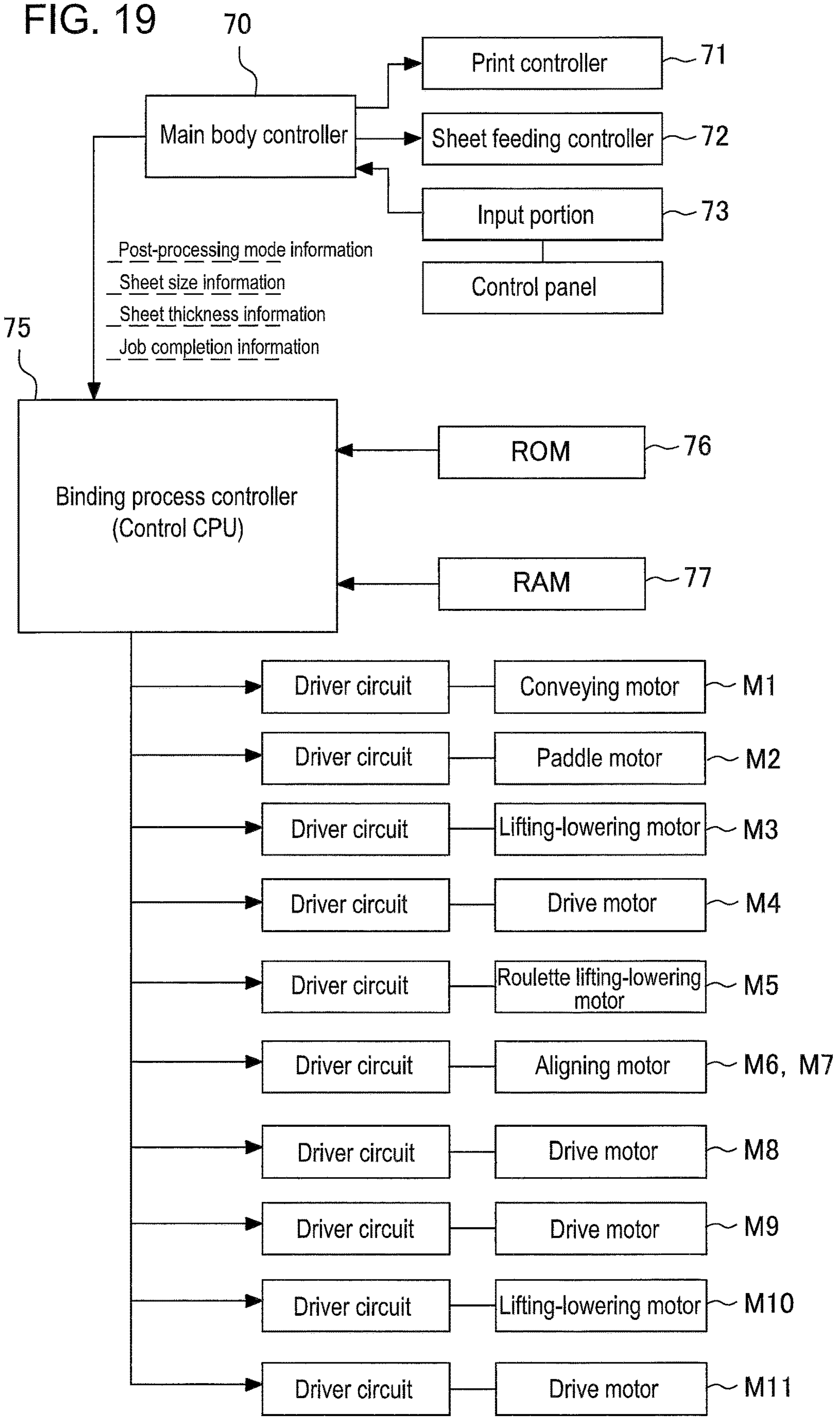
FIG. 19 is an explanatory view of a control configuration of the apparatus of FIG. 1.

A control configuration of the abovementioned image forming system will be described with reference to a block diagram in FIG. 19. The image forming system illustrated in FIG. 19 includes a controller (hereinafter, called a main body controller) 70 for the image forming unit A and a binding process controller 75 being a controller for the post-processing unit B (sheet bundle binding processing apparatus, as the case may be). The main body controller 70 includes a print controller 71, sheet feeding controller 72, and an input portion (control panel) 73.

Setting of an image forming mode and a post-processing mode is performed with the input portion (control panel) 73. The image forming mode requires setting of mode setting such as color/monochrome printing and double-face/single face printing, and image forming conditions such as a sheet size, sheet quality, the number of copies, and enlarged/reduced printing. The post-processing mode is required to be set, for example, into a printout mode, a staple-binding processing mode, an eco-binding processing mode, or a jog sorting mode. Further, the illustrated apparatus includes a manual binding mode. In this mode, operation of a sheet bundle binding process is performed offline as being separate from the main body controller 70 for the image forming unit A.

The main body controller 70 transfers, to the binding process controller 75, selection of the post-processing mode and data such as the number of sheets, the number of copies, and thickness of sheets on which images are formed. Further, the main body controller 70 transfers a job completion signal to the binding process controller 75 each time when image forming is completed.

The post-processing mode will be described in the following. In the printout mode, a sheet from the sheet discharging port 23 is stored at the stack tray 25 via the processing tray 24 without a binding process performed. In this case, sheets are overlapped and stacked on the processing tray 24 and a stacked sheet bundle is discharged to the stack tray 25 with a jog completion signal from the main body controller 70.

In the staple-binding processing mode (second sheet discharging mode), sheets from the sheet discharging port 23 are stacked and collated on the processing tray 24 and the sheet bundle is stored on the stack tray 25 after the binding process is performed thereon. In this case, sheets on which images are to be formed are specified by an operator basically to have the same thickness and size. In the staple-binding processing mode, any of the multi-binding, right corner binding, and left corner binding is selected and specified. The binding positions thereof are as described above.

In the jog sorting mode, sheets are divided into a group whose sheets having images formed at the image forming unit A are offset and stacked on the processing tray 24 and a group whose sheets are stacked thereon without being offset. An offset sheet bundle and a non-offset sheet bundle are alternately stacked on the stack tray 25. In the illustrated apparatus, an offset area (see FIG. 5) is arranged. Then, sheets discharged from the sheet discharging port 23 onto the processing tray 24 in center reference Sx are divided into a group whose sheets are stacked as maintaining the above posture and a group whose sheets are stacked as being offset to the apparatus front side Fr by a predetermined amount.

The reason why the offset area is arranged at the apparatus front side Fr is to maintain an operational area at the apparatus front side Fr for the manual binding process, a replacing process of a staple cartridge, and the like. The offset area is set to have dimensions (in the order of several centimeters) to divide sheet bundles.

[Manual Binding Mode]

The manual setting portion 29 where an operator sets a sheet bundle on which the binding process is to be performed is arranged at the apparatus front side Fr of the external casing 20*b*. A sensor to detect a set sheet bundle is arranged at the manual setting face 29*a* of the manual setting portion 29. With a signal from the sensor, the later-mentioned binding process controller 75 moves the stapling unit 26 to the manual binding position. Subsequently, when an operation switch 30 is depressed by an operator, the binding process is performed.

Thus, in the manual binding mode, the binding process controller 75 and the main body controller 70 perform controlling offline. Here, in a case that the manual binding mode and the staple-binding mode are to be performed concurrently, either mode is set to have priority.

[Binding Process Controller]

The binding process controller 75 causes the post-processing unit B to operate in accordance with the post-processing mode set by the image forming controller 70. The illustrated binding process controller 75 is structured with a control CPU as including a ROM 76 and a RAM 77. The later-mentioned post-processing operation is performed with control programs stored in the ROM 76 and control data stored in the RAM 77. Here, drive circuits for all the above-mentioned drive motors are connected to the control CPU 75, so that start, stop, and forward-reverse rotation of the motors are controlled thereby.

[Description of Post-Processing Operation]

In the following, operational states of the respective binding processes will be described with reference to FIGS. 20 to 25. For convenience of description, "a paddle" denotes a sheet introducing device (paddle rotor 36 or the like), "a roulette" denotes a raking rotor 33, "an aligning plate" denotes a side aligning member 45, "assists" denote the first and second conveying members 60A, 60B, "a button" denotes an operation switch of a stapling device, and "an LED" denotes an indication lamp indicating that a stapling operation is running.

[Stapling Mode]

Figure 20:
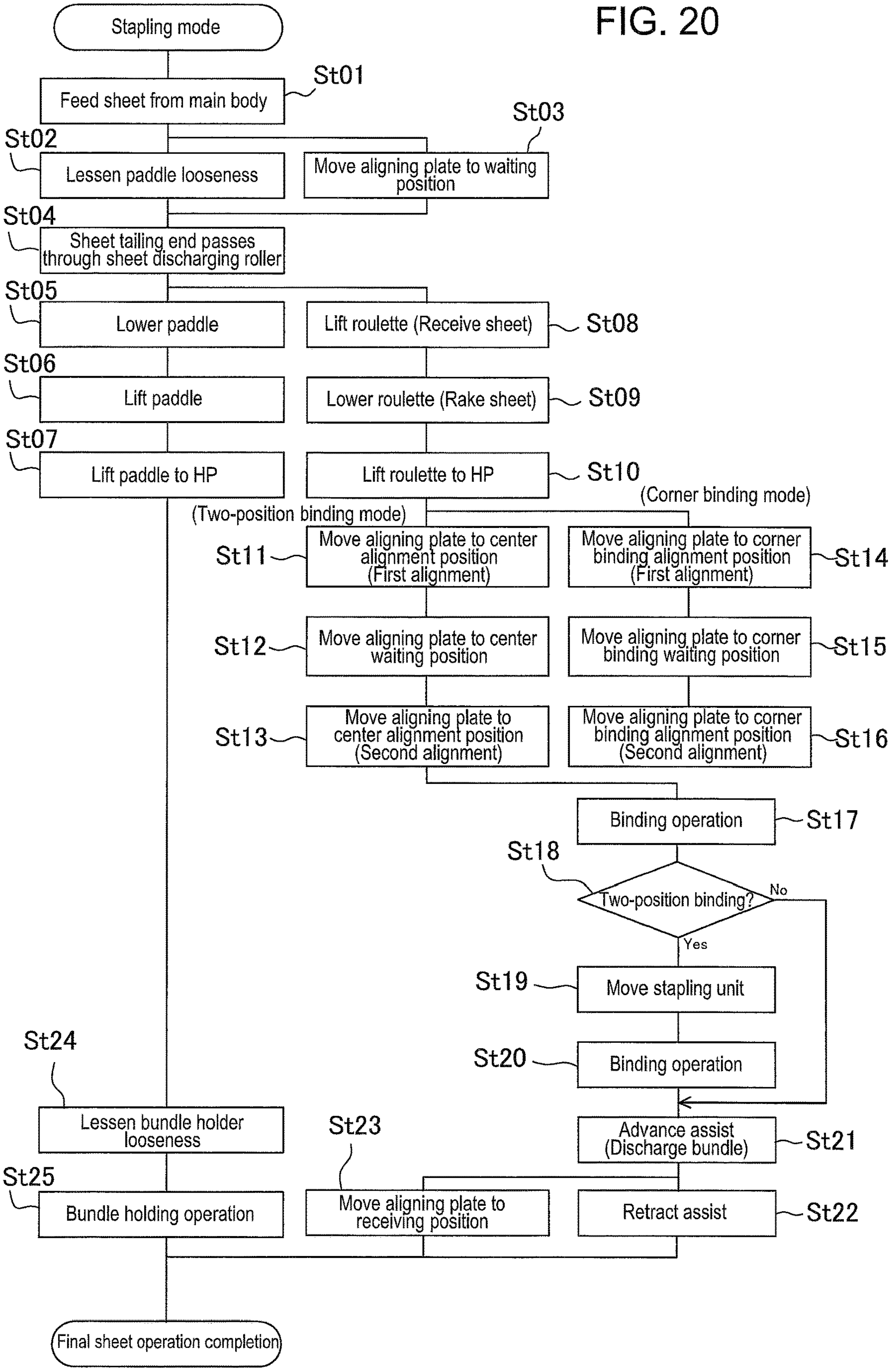
FIG. 20 illustrates operational flows of a staple-binding processing mode.
Figure 21:
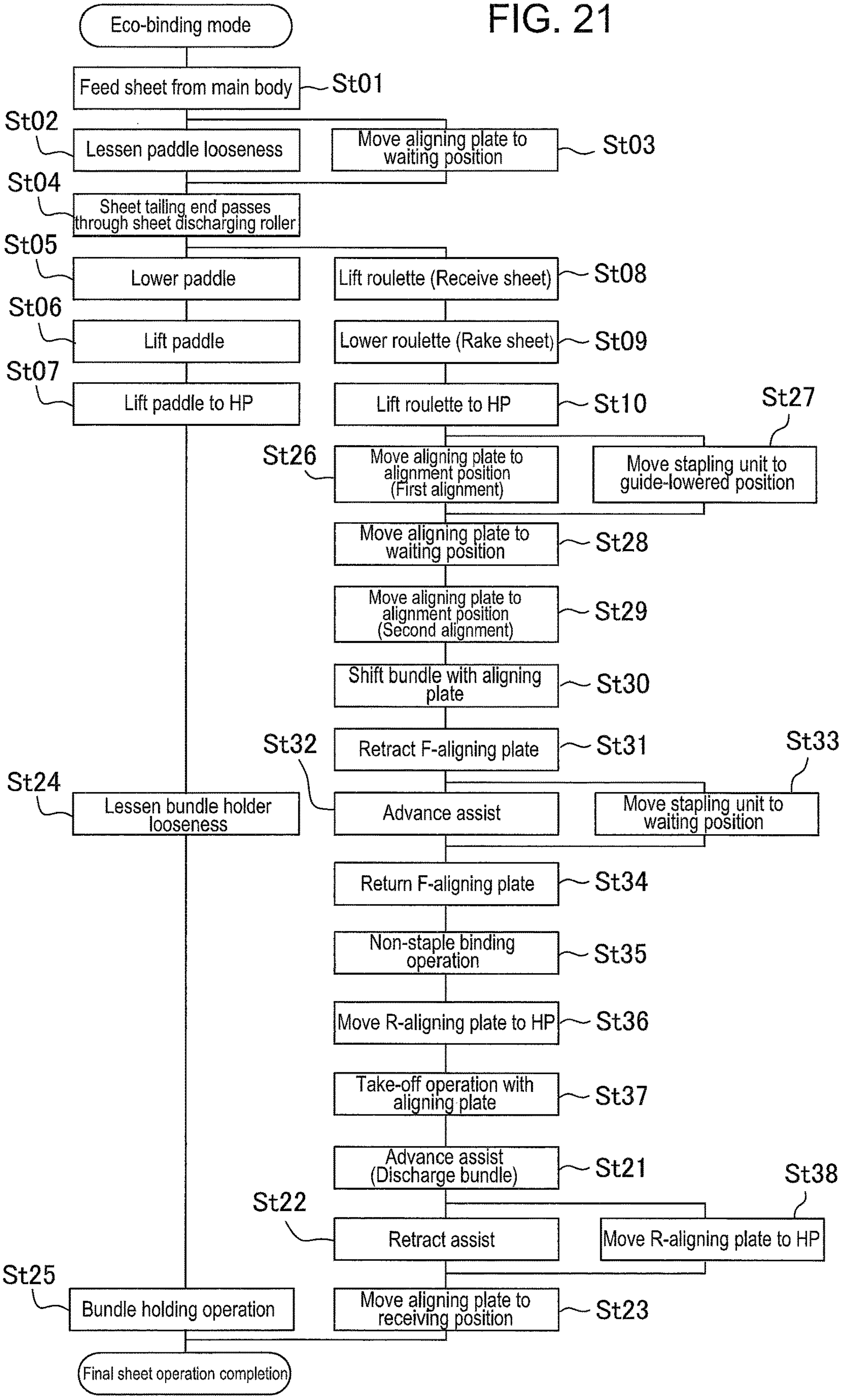
FIG. 21 illustrates operational flows of an eco-binding mode.

In FIG. 20, an image is formed on a final sheet for image forming and the final sheet is discharged from an image forming unit main body at the upper side (St01). At that time, a job end signal is transmitted from the image forming unit and the binding process controller 75 causes the paddle 36 to position and wait at a predetermined position (waiting of paddle vanes) (St02). At the same time, the right-left aligning plates 46R, 46F are moved to waiting positions (St03). A sheet fed from the sheet discharging port 16 of the image forming unit A is introduced from the introducing port 21 of the sheet introducing path (sheet discharging path) 22. Then, discharging of the sheet tailing end by the sheet discharging roller 32 is detected by the sheet sensor Se1 (St04).

The binding process controller 75 lowers the paddle 36 waiting on the processing tray 24 at the time when the sheet tailing end is separated from the sheet discharging roller 32 (St05). This operation is performed by activating the lifting-lowering motor M5. Concurrently with the paddle lowering operation, the binding process controller 75 lifts the roulette 33 to be retracted above the upmost sheet on the processing tray 24 (St08).

With the above operation, the sheet fed from the image forming unit A is fed to the sheet introducing path 22, and after the sheet tailing end passes through the sheet discharging roller 32, the sheet is reversely conveyed by rotating the paddle 36 in the direction opposite to the sheet discharging direction in a state that the roulette 33 is retracted above the processing tray 24. Thus, the sheet fed to the sheet introducing path 22 is stored on the processing tray 24 below the sheet discharging port 23 with the conveying direction thereof reversed at the sheet discharging port 23.

Next, the binding process controller 75 lifts the paddle 36 to be retracted from the sheet when a predetermined time passes after the sheet is reversely conveyed from the sheet discharging port 23 in the direction opposite to the sheet discharging direction (St06). Concurrently with the above, the roulette 33 rotating in the direction opposite to the sheet discharging direction is lowered from the waiting position and engaged with the sheet introduced onto the processing tray 24 (St09).

According to the above operation, the sheet is fed from the sheet discharging port 23 by the sheet discharging roller 32 and introduced onto the processing tray 24 as being reversely conveyed from the sheet discharging port 23 by the paddle 36 in the direction opposite to the sheet discharging direction. Then, the sheet is fed toward a predetermined position (toward the tailing end regulating member 41) of the processing tray 24 by the roulette 33.

In the above sheet discharging operation, sheets having different sizes are discharged from the sheet discharging port 23 in center reference Sx. It is also possible to perform discharging from the sheet discharging port 23 in side reference. Here, for convenience, description is performed on a case of discharging in center reference Sx.

Next, the binding process controller 75 moves the paddle 36 to a home position (HP) at the time when the railing end of the sheet introduced onto the processing tray 24 is assumed to be abutted to the tailing end regulating stopper (tailing end regulating member) 41 with reference to a detection signal of the sheet discharging sensor Set (St07). Similarly, the roulette 33 is moved to a home position HP (St10).

Next, the binding process controller 75 causes the aligning device 45 to bias and align the sheet in a state that the tailing end thereof is abutted to the tailing end regulating member 41. The aligning operation differentiates sheet alignment positions between a case that the multi-binding mode is specified and a case that the corner binding mode is specified. When the multi-binding mode is specified, the binding process controller 75 causes the right-left side aligning members 46F, 46R to reciprocate (center alignment) between alignment positions where the sheet introduced onto the processing tray 24 is matched with a size width in discharging sheet reference (center reference Sx in the drawing) and waiting positions separated outward therefrom. That is, the binding process controller 75 biases and aligns the sheet by causing the side aligning members 46F, 46R to move from the waiting positions being wider than the size width to the alignment positions being matched with the size width based on size information sent from the image forming unit A (St11 to St13).

When the corner binding mode is specified, the binding process controller 75 causes one of the right-left aligning members 46F, 46R at a binding position side to move to and stop at the binding position based on size information and to move the other thereof to move to an alignment position from a waiting position retracting therefrom based on the size width of the sheet introduced to the processing tray 24. The alignment position (of the aligning member at the movable side) is set to have a distance against the alignment position (of the aligning member at the binding position side) to be matched with the size width (corner binding position alignment). That is, in the corner binding process, one of the side aligning members 46F, 46R is moved and kept stopped at the specified binding position being right or left, and then, the other thereof is moved by an amount being matched to the size width after the sheet is introduced to the processing tray 24 to perform aligning (in side reference) (St14 to St16).

Next, the binding process controller 75 performs the binding operation (St17). In the multi-binding, the stapling unit 26 previously staying at the binding position is activated to perform the binding process thereat, and then, the binding process is performed at the second binding position after the stapling unit 26 is moved by a predetermined distance along the sheet tailing end edge (St18 to St20). In the corner binding, the stapling unit 26 previously staying at the binding position is activated and the binding process is performed thereat.

Next, when an operation completion signal is received from the stapling unit 26, the binding process controller 75 causes the sheet bundle discharging device 60 to operate to discharge the sheet bundle from the processing tray 24 toward the stack tray 25 at the downstream side (St21). When the sheet bundle discharging operation is completed, the binding process controller 75 moves the sheet bundle discharging device 60 to return to the initial position (St22). Concurrently with the above, the aligning device 46 is moved to return to the initial position (the waiting position to introduce a sheet to the processing tray 24) (St23).

Further, the binding process controller 75 causes the drive motor (in the drawing, the drive motor M2 commonly used for the paddle rotor 36) to rotate the bundle holding device (elastic holding member) 53 arranged on the stack tray 25 (St24), so that the upmost sheet of the sheet bundle introduced to the stack tray 25 is pressed and held (St25).

[Eco-Binding Mode]

In the eco-binding operation, the binding process controller 75 performs the operation from step St1 to step St10 in which the sheet introduced onto the processing tray 24 is positioned as being abutted to the tailing end regulating member 41 as being similar to the abovementioned operation. Here, description of the above is skipped with the same reference provided.

When the eco-binding process is specified, the binding process controller 75 causes the left side aligning member 46R located at the binding unit side to move to an alignment position (eco-alignment position Apt) being close to the eco-binding position Ep and to wait in a state of staying thereat (St26). Concurrently with this operation, the binding process controller 75 causes a sheet bundle guide to move from a retracting position above the processing tray 24 to an operating position on the processing tray 24 (St27). In the drawing, the shifting of the sheet bundle guide is performed so that the height position of a guide face is moved from the retracting position being a high position to the operating position being a low position as being synchronized with movement of the stapling unit 26. That is, the binding process controller 75 causes the stapling unit 26 to move from a predetermined position (home position) to a position to be engaged with the sheet bundle guide. In this application, the stapling unit 26 is arranged to be engaged with the sheet bundle guide when located at a position Gp in FIG. 5 between Ma2 (the left multi-binding position) and Cp1 (the left corner binding position).

Subsequently, the binding process controller 75 causes the right side aligning member 46F at the opposite side to move to a waiting position distanced from a side edge of the sheet introduced onto the processing tray 24 (St28). Then, the right side aligning member 46F is moved to an alignment position as driving the aligning motor (St29). The alignment position is set to a position so that a distance against the left side aligning member 46R staying at the eco-alignment position is matched with the sheet width size.

Thus, the present invention has a feature that a sheet introduced onto the processing tray 24 is aligned for eco-binding to the eco-alignment position Ap2 being apart from the binding position without being aligned at the binding position. When the sheet from the sheet discharging port 23 is set in sheet discharging reference (for example, center reference), the eco-alignment position Ap2 becomes the same as the alignment position in the multi-binding process. When the eco-alignment position Ap2 is set at a position being close to the eco-binding position Ep, the sheet is prevented from being interfered with the press binding unit 27 as preventing sheet jamming when being aligned. Further, after the alignment, it is possible to shorten a distance of moving the sheet bundle to the eco-binding position Ep. Accordingly, it is preferable that the eco-alignment position Ap2 is set to a close position to the extent possible within a range in which the sheet is not interfered with the press binding unit 27.

Next, the binding process controller 75 causes the side aligning member 46 to offset-move the sheet bundle aligned at the eco-alignment position Ap2 to the eco-binding position Ep (St30). Then, the side aligning member 46F at the apparatus front side is retracted to be apart from the sheet by a predetermined amount (St31). Then, the aligning device 45 drives the sheet bundle conveying device 60 so that the sheet bundle is moved downward in the sheet discharging direction by a predetermined amount (St32). Concurrently with the above, the stapling unit 26 is moved to the initial position and the sheet bundle guide (not illustrated) is kept waiting at the retracting position above the processing tray 24 (St33). Next, the binding process controller 75 causes the right side aligning member 46F to move to the home position (St34).

The binding process controller 75 transmits a command signal to the press binding unit 27 to cause the binding process operation to be performed (St35). Then, the binding process controller 75 operates a kicker device structured with the side aligning member 46R (at the apparatus rear side) at the eco-binding position side. As the operation of the kicker device, first, the side aligning member 46R is moved to a back-swing position (by an overrun amount in FIG. 15) being separated from a position for engaging with the sheet side edge. The back-swing amount is determined in consideration of a rising time (self-exciting time) of the aligning motor M6. That is, the overrun amount is determined in consideration of a rising time in which the motor provides a predetermined output torque as providing running time to the aligning member 46R (kicker device).

When a process end signal is received from the press binding unit 27, the binding process controller 75 causes the left side aligning member 46R to move toward the sheet center by a predetermined amount by driving the aligning motor for the left side alignment member. According to this operation, the sheet bundle pressure-nipped by the press binding unit 27 is taken off and offset to the sheet center side by being kicked to the sheet center side from a state of being intimately contacted to the corrugation-shaped pressurizing faces (St37).

The kicker mechanism will be described in the following.

Figures 18A, 18B, 18C, 18D, 18E, 18F:
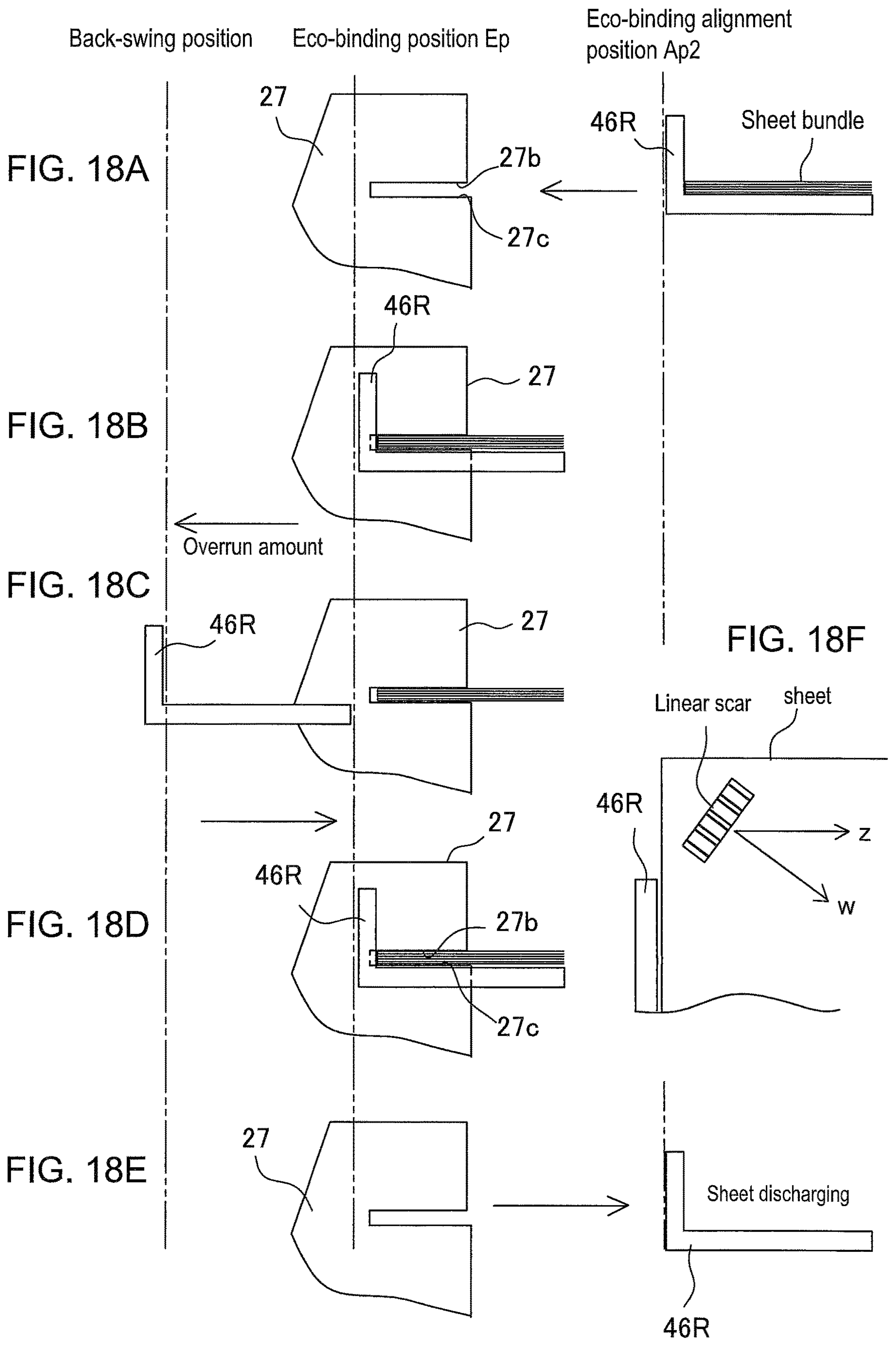
FIGS. 18A to 18F are explanatory views of a kicker device in the apparatus of FIG. 2.

(1) The kick direction (the direction in which a conveyance force is applied to sheets, hereinafter being the same) of the left side aligning member 46R (kicker device) is preferably the same as the strip direction (rib direction) of the pressurizing faces or a direction being slightly inclined (for example, approximately by 0 to 30 degrees) to either side with reference thereto. When a conveyance force is applied in a direction of arrow z in FIG. 18F (a direction perpendicular to the rib), the sheet bundle is likely to be unbound with the binding released. When a conveyance force is applied in a direction of arrow w in FIG. 18F, the sheet bundle is likely to be taken off from the pressurizing faces while the sheet bundle is kept bound. The angular direction is determined by experiment. In experiments of the inventors, it is preferable that the direction is set in a range between −30 degrees to 30 degrees with the reference of the rib direction.

(2) The kicker device adopts a mechanism to push (feed) an end edge of a binding-processed sheet bundle toward the sheet center side. For example, as illustrated, the kicker device is structured with the left side aligning member 46R (the right side aligning member 46F in a case of right corner binding) to bias and align sheets on the processing tray 24 (in a direction perpendicular to the sheet discharging direction). Thus, it is preferable to adopt a conveying mechanism to apply a force to the entire sheet bundle in a direction for taking-off when the bound sheet bundle is to be taken off from the pressurizing faces. For example, when a sheet bundle is discharged by a nipping roller in the kick direction from the upper face of the sheet bundle, there occurs a problem that only a sheet contacting the nipping roller is taken off and the binding is released.

(3) It is possible for the kicker device to adopt a floating mechanism to float a bottom face of a sheet bundle from the pressurizing faces of the binder mechanism concurrently with applying a kick force in a direction to separate the bound sheet bundle (in a direction intersecting the sheet discharging direction). A structure thereof is not illustrated here. For example, there are arranged a curved bottom piece to be engaged with the sheet bundle bottom face and an inclined cam face to protrude the curved bottom piece above the sheet placement face at the binding position (arranged at a back face of the processing tray or the like). In addition, a regulating face to be engaged with an end face of the sheet bundle on the sheet placement face is arranged at the side aligning member.

When the side aligning member 46R (kicker device) is located outside the sheet placement face (back-swing area), the curved bottom piece supports sheets at the same plane with the sheet placement face without receiving action of the inclined cam face. Subsequently, when the side aligning member is kick-moved toward the binding position, the curved bottom piece pushes up the sheet bundle. At the same time, the regulating face provides action to push out an end face of the sheet bundle toward the sheet leading end. That is, an operational member (bottom face supporting member) to push up the bound sheet bundle from the pressurizing face and an operational member (side face regulating member) to push out the sheet bundle end edge toward the sheet center are arranged as operating when the side aligning member 46R is caused to perform kick operation toward the binding position. As a result, the sheet bundle can be taken off from the pressurizing faces more reliably.

[Printout Sheet Discharging]

Figure 22:
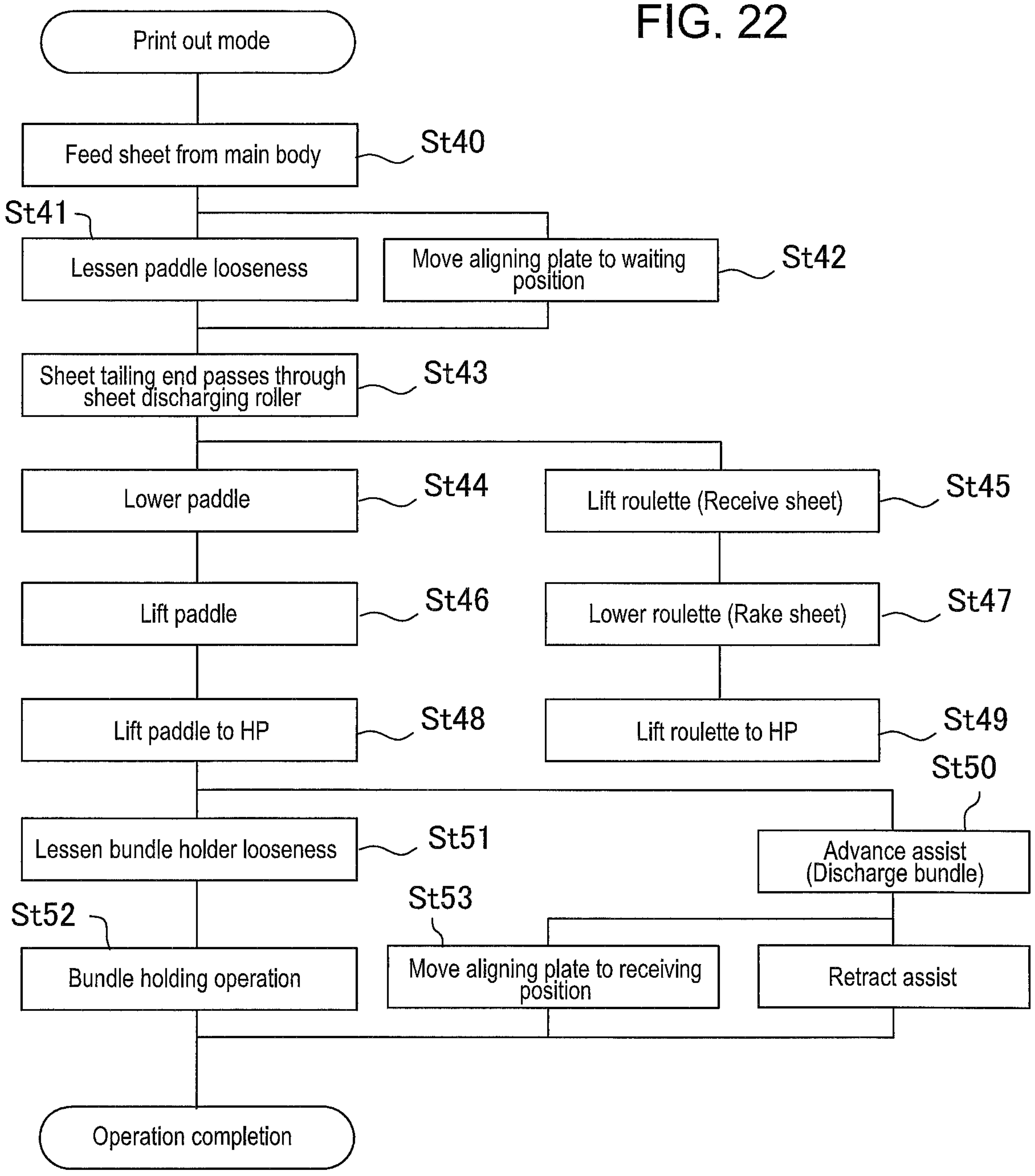
FIG. 22 illustrates operational flows of a printout mode.
Figure 23:
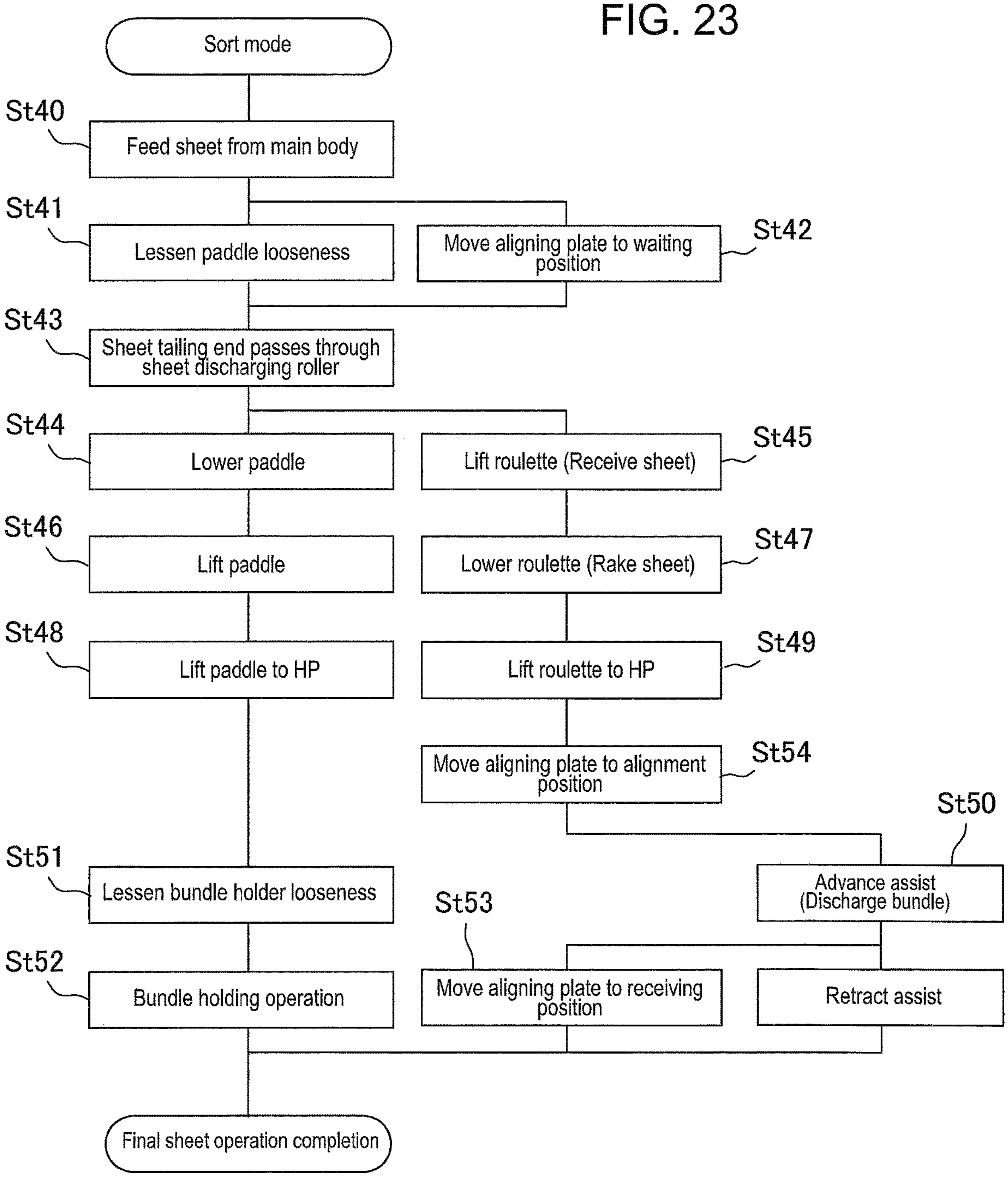
FIG. 23 illustrates operational flows of a sorting mode.

Description will be performed based on FIG. 22. When a sheet is discharged from the image forming unit A (St40), the sheet sensor detects a leading end thereof and the paddle rotor 36 is moved to the waiting position (St41). Concurrently with the above, the side aligning members 46F, 46R are moved to the waiting positions (St42). Next, when the sheet tailing end passes through the sheet discharging roller 32 (St43), the binding process controller 75 lowers the paddle rotor 36 to the operating position (St44). Along with the above, the roulette rotor 33 is lifted to be retracted (St45).

When a predetermined time passes after the sheet tailing end passes through the sheet discharging roller 32, the binding process controller 75 lifts and moves the paddle rotor 36 to the retracting position (St46). Along with the above, the roulette rotor 33 is lowered to the operating position and feeds the sheet toward the tailing end regulating member 41 (St47). The binding process controller 75 moves the paddle rotor 36 to the home position at the time when the sheet tailing end is assumed to reach the tailing end regulating member 41 (St48). Further, the roulette rotor 33 is lifted to the home position (St49).

Then, the binding process controller 75 causes the side aligning member 45 to move to the alignment position and perform the aligning operation. In the aligning operation, sheets having different sizes are stacked in center reference and fed to the stack tray 25 with the subsequent sheet discharging operation. In the printout sheet discharging operation, a later-mentioned non-standard size sheet discharging operation is performed when a large size sheet is introduced onto the tray.

According to the binding process controller 75, sheets are aligned and stacked on the processing tray 24 and the sheet bundle is discharged to the stack tray 25 at the downstream side. In the operation, the first conveying member 60A of the sheet bundle discharging mechanism 60 is moved in the sheet discharging direction (St50). Next, the tray sheet holding member 53 is moved to the waiting position (St51). Then, the upmost sheet is pressed by rotating the tray sheet holding member 53 by a predetermined angle at the timing when the sheet bundle is introduced onto the stack tray 25 (St52). Subsequently, the binding process controller 75 causes the side aligning member 45 to return to the sheet introducing position (St53).

[Sort (Jog) Mode]

In a jog mode, approximately the same steps are performed as in the printout mode. Here, description thereof is skipped with the same reference provided to the same step. In the following, different steps will be described. Sheets introduced onto the processing tray 24 are stacked at different positions as being divided into a group whose sheets are aligned in center reference Sx and a group whose sheets are aligned in right side reference (St54). Then, the sheets are conveyed to the stack tray 25 at the downstream side as maintaining posture thereof. Here, the processing tray 24 is arranged at a position deviated to the apparatus front side and some sheets are aligned in right side reference. Then, sheets in center reference and sheets in right side reference biased toward an operator are stacked on the sheet placement face 24*a*. Accordingly, sheet bundles are easy to be removed from the stack tray 25.

[Common Operation in Respective Modes]

Figure 24:
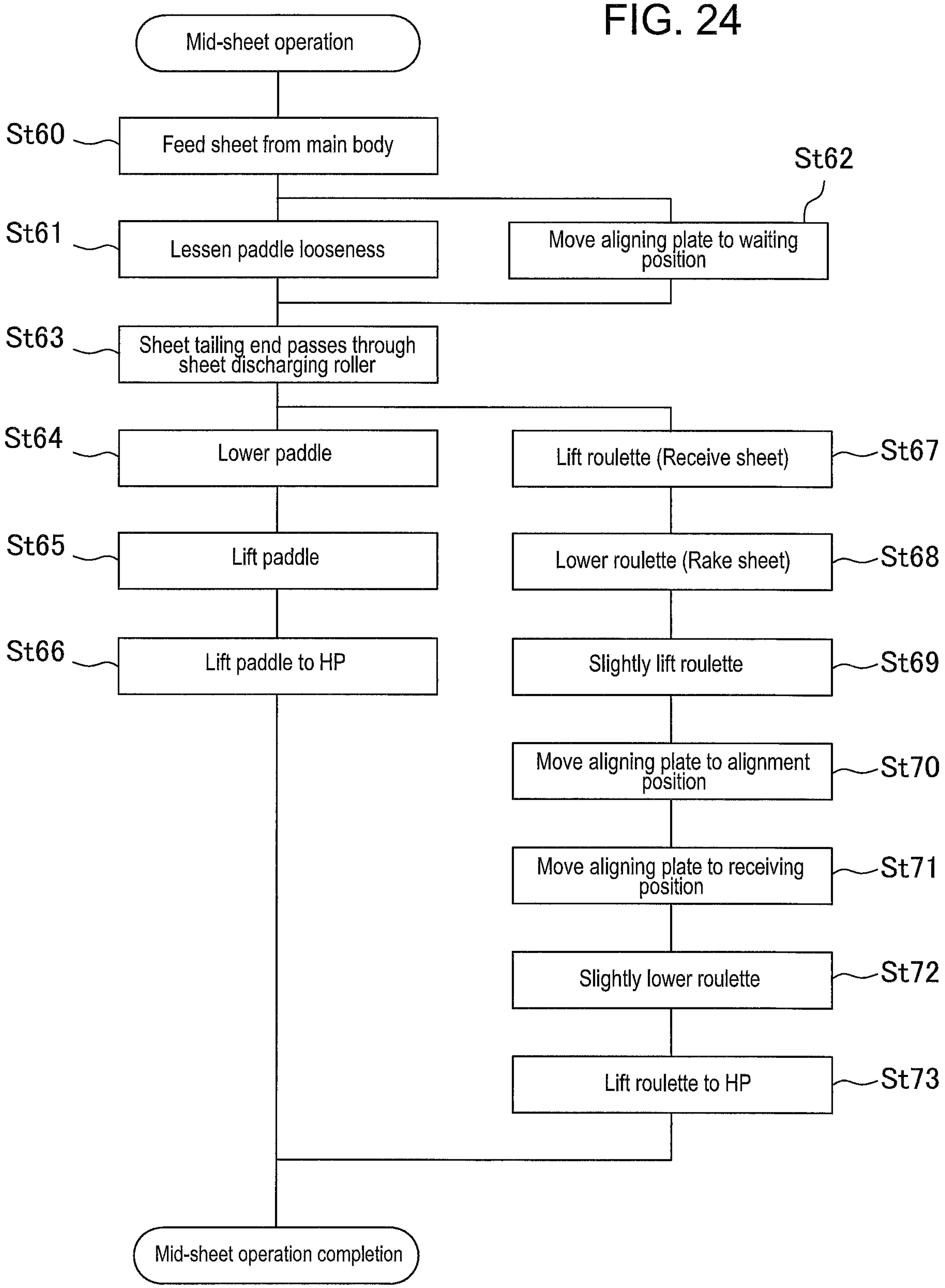
FIG. 24 illustrates common operational flows of introducing sheets onto a processing tray.

In the following, operation for introducing a sheet onto the processing tray 24 commonly performed in the above-mentioned respective post-processing modes will be described with reference to FIG. 24. When a sheet is discharged from the image forming unit A (St60), the binding process controller 75 causes, with a leading end detection signal from the sheet sensor Se1, the paddle rotor 36 to be positioned at the waiting position (St61) and the predetermined aligning member 45 to be moved to the waiting position (St62). In this operation, the aligning member 45 is positioned at the waiting position to have a width size being slightly larger than the sheet size based on the sheet size signal sent from the image forming unit A.

Next, at the timing when the sheet tailing end passes through the sheet discharging roller 32 (St63), the binding process controller 75 causes the paddle rotor 36 to be lowered from the waiting position at the upper side to the operating position at the lower side (St64). Along with the above, the roulette rotor 34 is lowered from the waiting position above the sheet placement face 24*a* to the operating position on the sheet placement face 24*a* (St68). At that time, both of the paddle rotor 36 and the roulette rotor 34 are rotated in the direction opposite to the sheet discharging direction.

When a predetermined time (assumed time for the sheet tailing end to reach the position of the roulette rotor 34) passes, the binding process controller 75 causes the paddle rotor 36 to be lifted from the operating position to the waiting position (St65). When a predetermined time (assumed time for the sheet leading end to reach the tailing end regulating member) the binding process controller 75 causes the roulette rotor 36 to be lifted by a small amount (St69). The lifting amount of the paddle rotor is previously set by experiment to reduce a pressing force against a sheet.

Next, the binding process controller 75 causes the side aligning member 45 to move to the alignment position (St70). The alignment position is set to a different position in each binding processing mode, so that sheets are stacked at the abovementioned reference position in each mode, as described above.

(1) For multi-binding in the staple-binding processing mode, sheets introduced onto the processing tray 24 are aligned in center reference. For right corner binding, sheets introduced onto the processing tray 24 are aligned in right side reference Apt. For left corner binding, sheets introduced onto the processing tray 24 are aligned in left side reference Apt. In any case of the above, the stapling unit 26 is prepared for the subsequent binding process operation as waiting at the binding position.

(2) In the eco-binding processing mode, the binding process controller 75 causes sheets to be aligned at the eco-binding alignment position Ap3 defined at a position biased toward the sheet center from the eco-binding position or to be aligned in center reference.

(3) In the printout mode, the binding process controller 75 causes sheets to be aligned in center reference.

(4) In the jog processing mode, the binding process controller 75 causes the group being aligned in center reference and the group being aligned in right side reference to be alternately aligned in a repeated manner and to be discharged to the stack tray 25 as maintaining posture thereof.

Next, after the abovementioned aligning operation is completed, the binding process controller 75 causes the side aligning member 45 to move to the initial position (St71), and then, the roulette rotor 34 to be lowered in a direction to press sheets (St72). Along with the above, the binding process controller 75 causes the paddle rotor 36 to be lifted to the waiting position as the home position and to stay thereat (St73).

[Manual Binding Operation]

Figure 25:
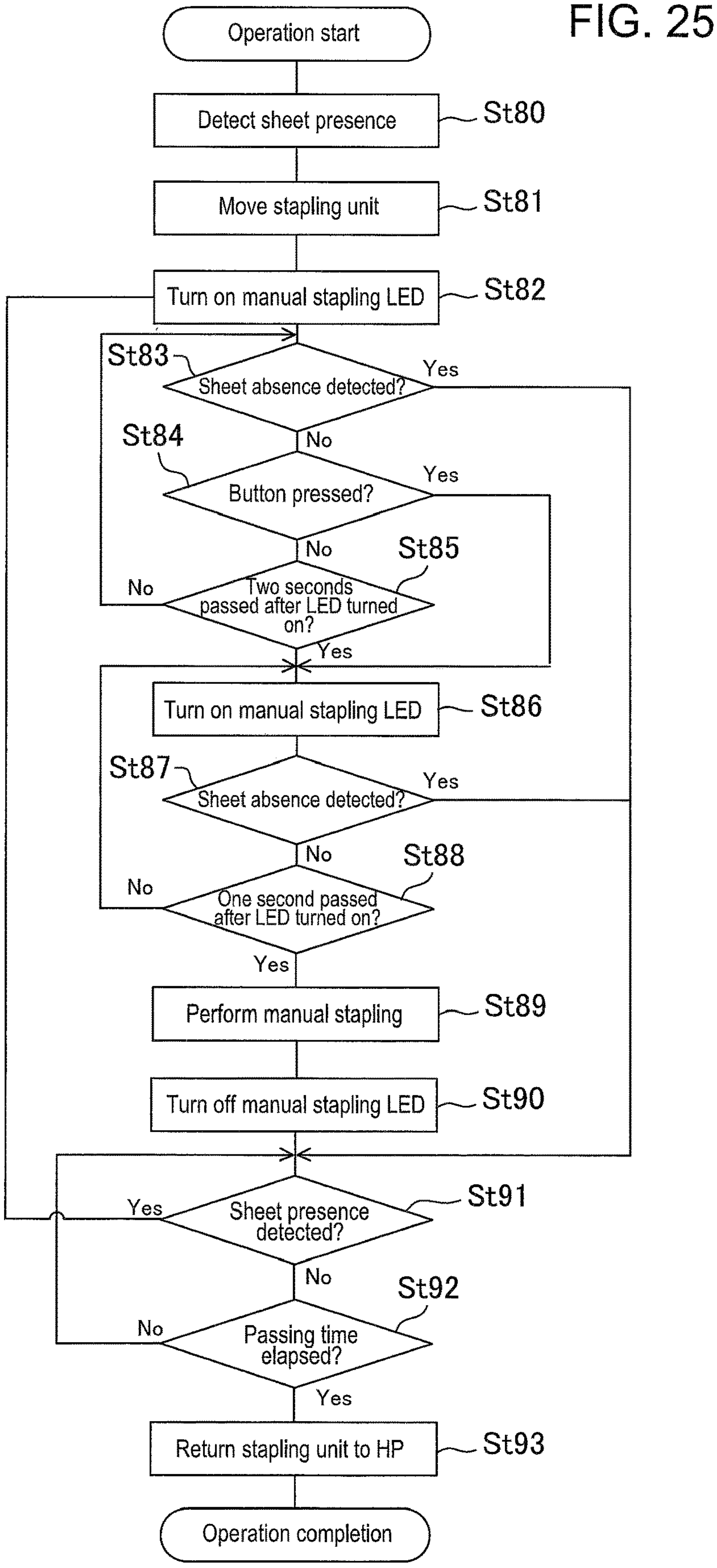
FIG. 25 illustrates operational flows of a manual staple-binding process.

The manual binding operation will be described with reference to a flowchart in FIG. 25. A sheet presence-absence sensor Se4 is arranged at the manual feeding portion. When the sheet presence-absence sensor Se4 detects sheets, the binding process controller 75 causes the staple binding operation to be performed.

The binding process controller 75 determines whether or not the stapling unit 26 is performing the binding process operation while the sensor Se4 indicates an ON signal (St80). In a case of determining that the binding process operation can be interrupted, the stapling unit 26 is moved to the manual binding position Mp (is kept staying when the staling unit 26 is at the binding position) (St81). Then, an LED lamp is turned on to indicate that manual operation is running (St82).

Next, after confirming that the sensor Se4 is ON (St83), the binding process controller 75 determines whether or not the operation button 30 is operated (St84). When the sensor Se4 is ON or when a predetermined time passes (St85) after the LED lamp is turn on (in the drawing, the time is set to two seconds) even if the sensor Se4 is OFF, the LED lamp is turned on again (St86). Then, after confirming that the sensor Se4 is ON (St87), the binding process controller 75 further determines whether or not a predetermined time passes after the LED lamp is turned on. Then, the stapling operation is performed (St88).

Subsequently, when the sensor Se4 is in an ON state after the stapling operation is performed, the binding process controller 75 performs the stapling operation again as returning to a predetermined step. According to the above, the binding process can be performed on a plurality of positions of a sheet bundle. When the sensor Se4 detects a sheet-absence state and the sheet absence state continues even after a predetermined time, the stapling unit 26 is returned to the home position as assuming that the sheets are removed for the setting face. Here, if the home position of the stapling unit 26 is set at the manual binding position, the stapling unit 26 stays thereat (St93).

In the present invention, during preparation or operation of the printout process, the jog sorting process, or the non-staple binding process on the processing tray, the manual stapling operation is performed based on ON/OFF signals of the abovementioned sensor Se4. Further, during operation of the multi-binding operation or the corner binding operation on the processing tray, the manual operation can be performed when sheet stacking is in operation and a jog completion signal is not transmitted from the image forming unit A. Even if a jog completion signal is transmitted, the manual stapling operation is performed when an interruption process is instructed.

Thus, it is preferable for apparatus designing to adopt means that determines which has a priority between the manual stapling operation and stapling operation on the processing tray or that has an operator perform selection with a priority selection key.

[Jam Release Operation]

In the following, jam release operation performed when conveyance failure occurs in the post-processing unit B and a pull-put mechanism for the jam releasing will be described.

When a sheet on which an image has been formed is fed to the post-processing unit B, there are rare cases in which an apparatus jam occurs due to feeding failure in the conveying path, such as a case in which the sheet is strongly curled due to the influence of temperature and humidity or a case in which the sheet has a damaged portion.

Figure 26:
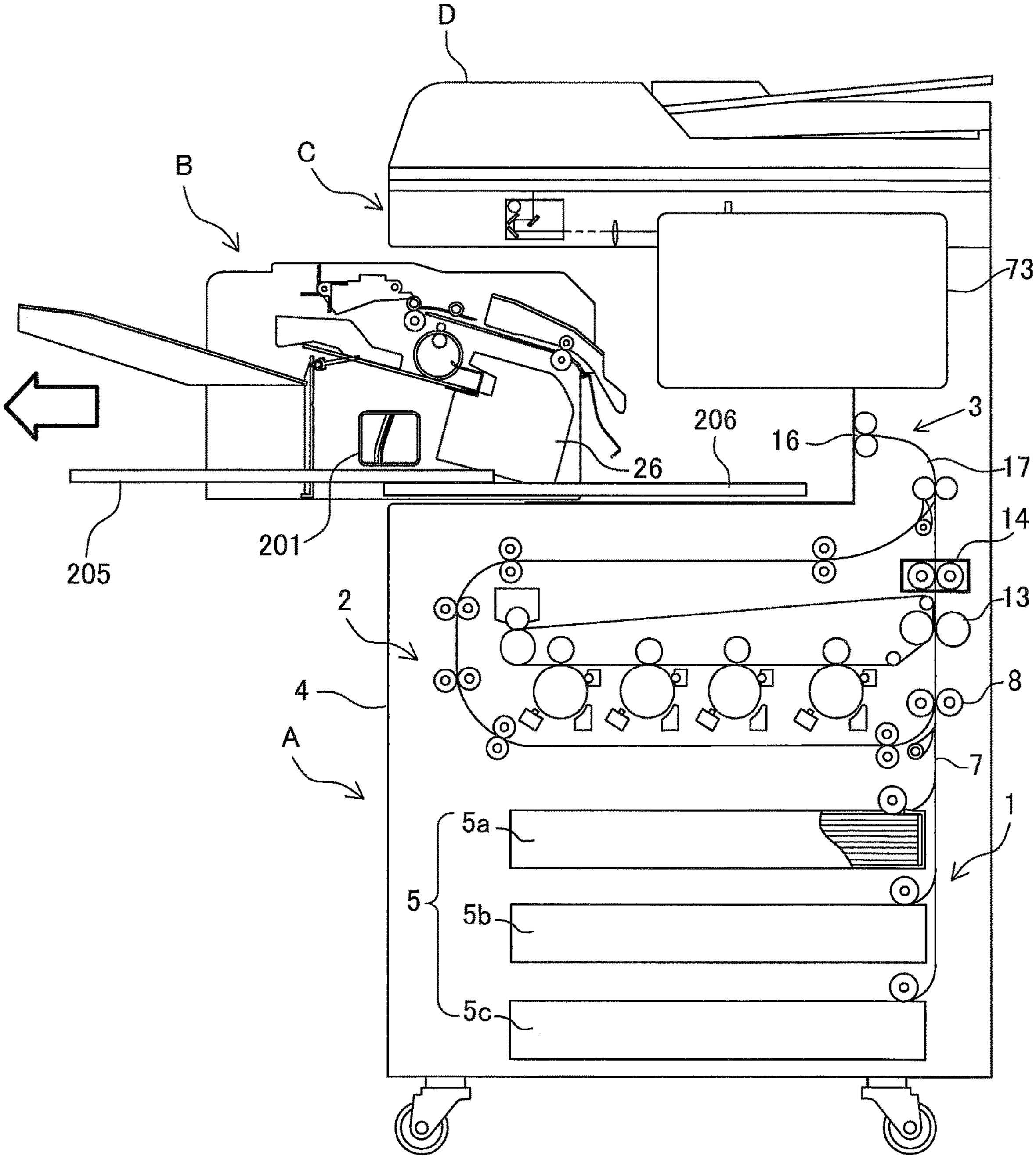
FIG. 26 illustrates a state in which the post-processing apparatus is pulled out from an image forming apparatus.

In an in-body finisher described in the present embodiment, since the post-processing unit B is arranged in the space surrounded by the image forming apparatus main body, it is necessary to pull out the post-processing unit B from the image forming apparatus main body for the jam release operation as illustrated in FIG. 26.

As disclosed in Patent Document 1 (Japanese Patent Application Laid-Open No. 2006-240760), there is known a configuration in which slide rails are provided so that the post-processing apparatus B can be pulled out in the sheet discharging direction to perform the jam release operation.

In recent years, a touch panel type has increased as the operation panel 73 of the image forming apparatus, and an area of the operation panel 73 has been increased along with multi-functionality such as mounting a function of reproducing a moving image on the operation panel and adopting a detachable tablet type.

Due to these circumstances, since the introducing port side of the inner finisher, that is, the range in which the sheet is delivered from the image forming apparatus to the post-processing apparatus overlaps with the position of the operation panel 73, it is necessary to arrange the position of the jam release lever for separating the post-processing apparatus to be shifted from operation portions such as the manual inserting portion 29 of the post-processing apparatus and the like.

In the present embodiment, the lever 201 and the manual inserting portion 29 (setting range of manual inserted sheets) are overlapped with each other, so that the lateral width of the apparatus is made compact and the operation portions are integrated, thereby improving user convenience. Hereinafter, description will be performed on the present embodiment.

In the present embodiment as well, slide rails are adopted for movement and separation, and a hook is engaged and fixed so that the conveying path on the image forming apparatus side and the conveying path on the post-processing unit B side can be mounted without a gap, and the hook is released to realize a movable state.

As illustrated in FIG. 26, a slide rail base portion 206 is provided on the image forming apparatus A side, and a slide portion 205 is provided so as to be capable of being pulled out.

A hook mechanism 203 on the post-processing unit B side is hooked to an engaging portion 204 provided on the image forming apparatus A side to fix the post-processing unit B.

The lever 201 for operating the hook mechanism 203 is arranged below the range where sheets are set when sheets are set on the manual inserting portion 29 (see FIG. 2).

Figure 27:
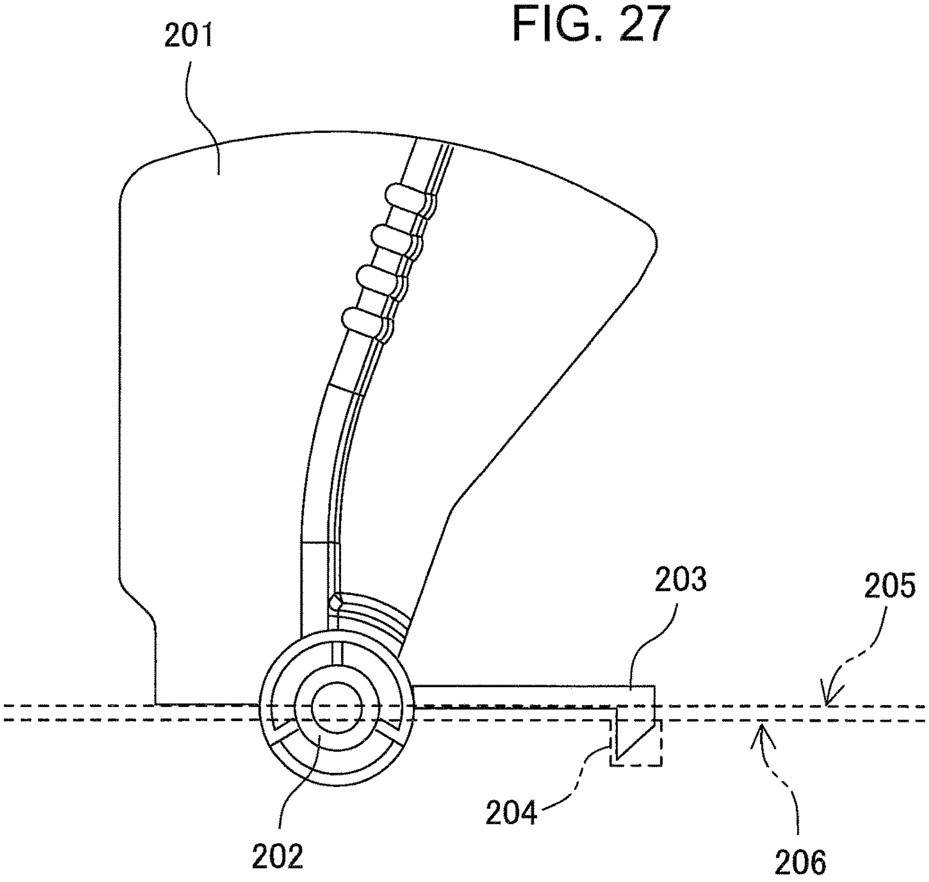
FIG. 27 is an explanatory view of a jam release lever in the apparatus of FIG. 2.
Figure 28:
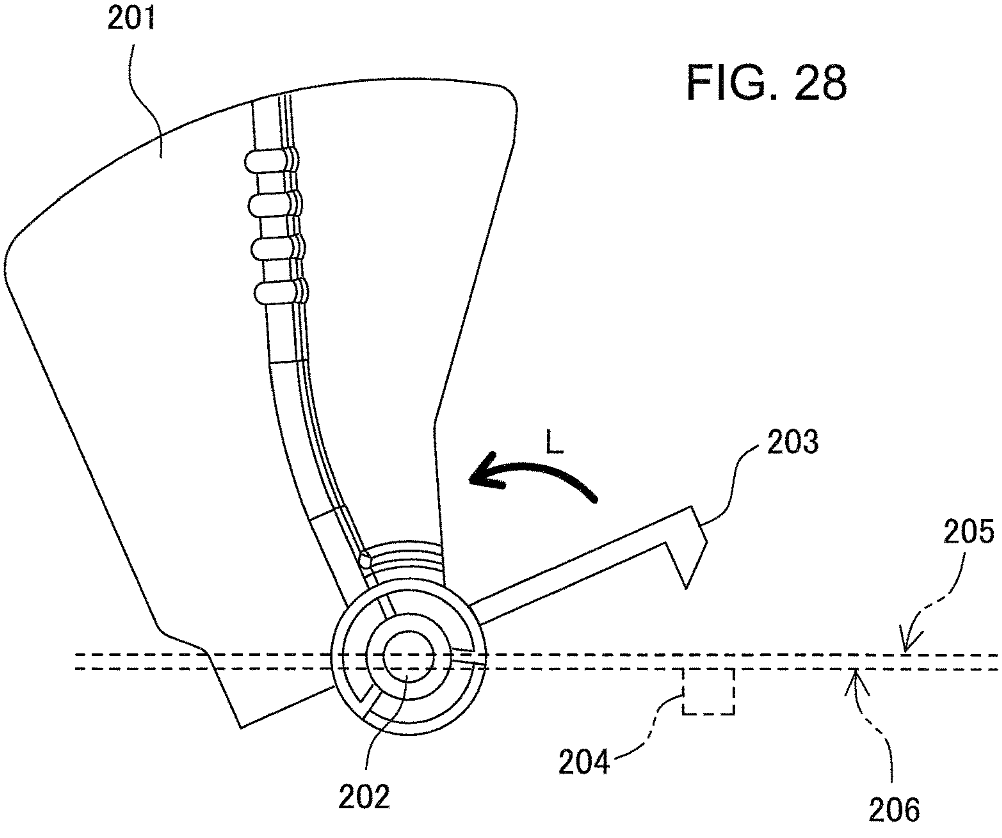
FIG. 28 is an explanatory view of the jam release lever in the apparatus of FIG. 2.

The lever 201 will be described in detail. The lever 201 according to the present embodiment is configured to be manually operated by a user, and the lever 201 and the hook mechanism 203 are coupled to each other by some drive transmission mechanism such as a wire or a shaft. As illustrated in FIGS. 27 and 28, the lever 201 is configured to be rotatable in a rotation direction L about a rotation fulcrum 202, and the hook 203 is disengaged from the hook engaging portion 204 by the lever operation of the user, so that the slide portion 205 can be pulled out (transits from the state illustrated in FIG. 27 to the state illustrated in FIG. 28). Here, the lever 201 is operated through an operation window provided in an outer cover of the post-processing unit B.

Although the lever 201 in the present embodiment adopts a configuration in which the hook 203 is directly moved, a configuration in which a wire, a gear, or the like is coupled can also be adopted, and operability is improved by attaching a spring or the like so that the hook 203 engages with the hook engaging portion 204 (in a direction opposite to the rotation direction L).

As illustrated in FIGS. 5 and 15, the lever 201 can be arranged in the range overlapping with the manual inserting portion 29 to achieve compact arrangement. In this case, although the lifting-lowering motor M10 is also accommodated below the manual inserting portion 29, it is preferable that the lifting-lowering motor M10 is arranged at a position as close to the stack tray 25 as possible (on the downstream side in the sheet conveying direction) to reduce a driving loss.

The lever 201 is preferably arranged on the downstream side of the open/close cover 28 in the sheet conveying direction from the viewpoint of operability of the user, and is preferably arranged on the downstream side of the operation panel 73 of the image forming apparatus A in the sheet conveying direction.

Figure 29:
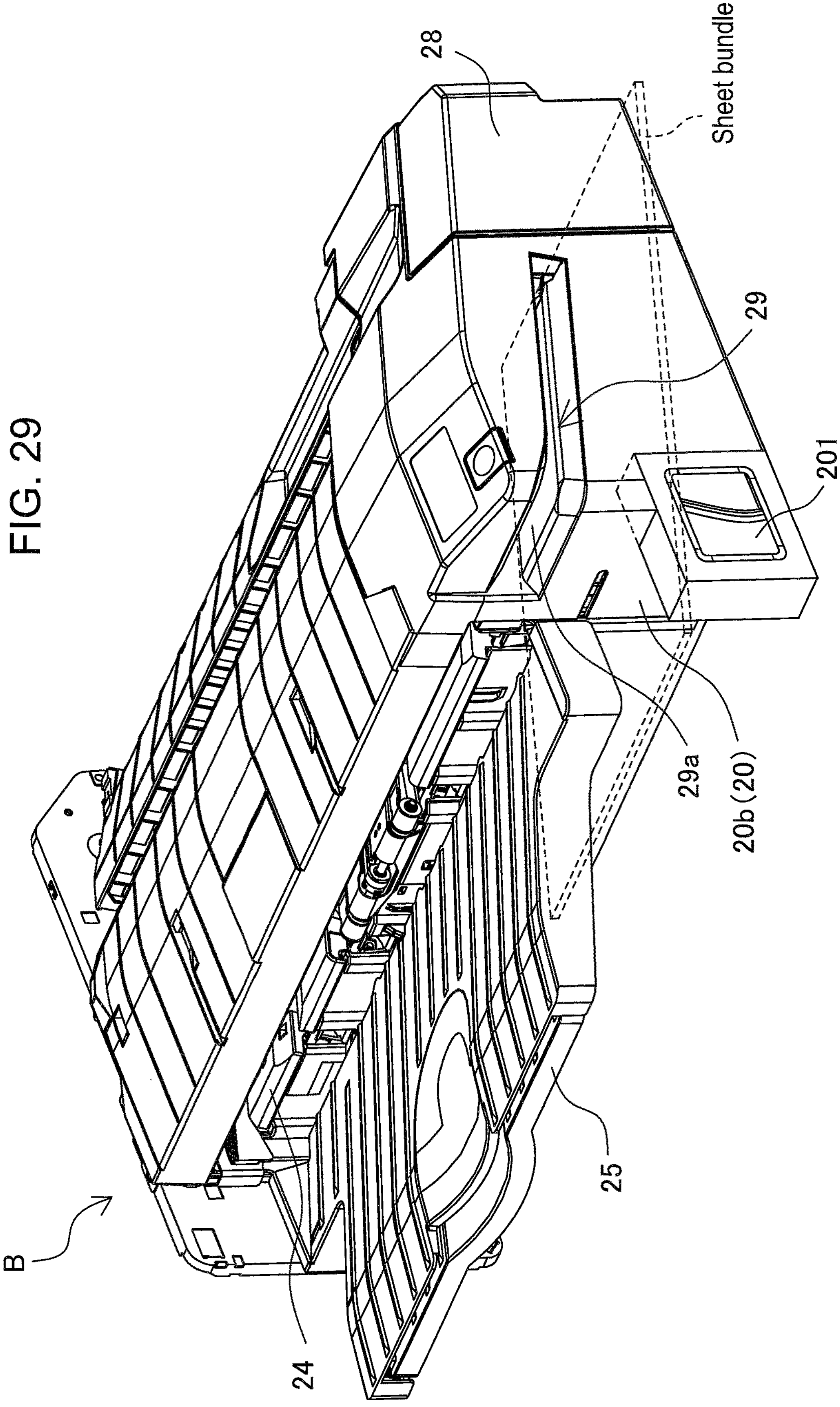
FIG. 29 is a view illustrating another embodiment of the present invention.

Here, as in FIG. 29 showing another embodiment, a compact configuration can be achieved even when the lever 201 is arranged on the downstream side of the lifting-lowering motor M10 in the sheet conveying direction as long as the lever 201 is arranged not directly below the manual inserting unit 29 but below the sheet bundle set on the manual inserting unit 29 and to overlap with the range, viewing from the apparatus front side, where the stack tray 25 is lifted and lowered.

The invention claimed is:

1. A sheet post-processing apparatus provided in an in-body space between a reading unit that reads an image of a document and an image forming unit configured to form the image read by the reading unit on a sheet, the sheet post-processing apparatus comprising:

an introducing port which introduces the sheet on which the image is formed;

a conveying device configured to convey, in a conveying direction, the sheet introduced from the introducing port;

a processing tray on which the sheet conveyed by the conveying device is placed;

a manual inserting unit provided at a position different from the processing tray and capable of manually inserting a sheet from the outside of the sheet post-processing apparatus;

a binding processing device configured to perform a binding process on the sheet placed on the processing tray or the sheet inserted into the manual inserting unit;

a slide mechanism capable of pulling out, in the conveying direction, the sheet post-processing apparatus from a fixing position where the sheet post-processing apparatus is fixed in the in-body space;

a fixing unit configured to fix the slide mechanism into the in-body space and to fix the slide mechanism to a conveying position where the sheet is conveyed to the conveying device; and a release lever provided at a position overlapping with a placing range of the sheet set on the manual inserting unit and configured to release the fixing unit.

2. The sheet post-processing apparatus according to claim 1, wherein the release lever is provided below the placing range of the sheet set on the manual inserting unit.

3. The sheet post-processing apparatus according to claim 1, further comprising a discharging device configured to discharge the sheet on the processing tray;

a stack tray on which the sheet discharged from the discharging device is stacked;

a lifting-lowering device configured to lift and lower the stack tray; and a lifting-lowering drive unit configured to drive the lifting-lowering device, wherein the release lever is provided on a downstream side of the lifting-lowering drive unit in the conveying direction.

4. The sheet post-processing apparatus according to claim 1, further comprising a discharging device configured to discharge the sheet on the processing tray;

a stack tray on which the sheet discharged from the discharging device is stacked;

a lifting-lowering device configured to lift and lower the stack tray; and a lifting-lowering drive unit configured to drive the lifting-lowering device, wherein the release lever is provided on an upstream side of the lifting-lowering drive unit in the conveying direction.

5. The sheet post-processing apparatus according to claim 4, further comprising an open-close cover configured to replenish the binding processing device with staples, wherein the release lever is provided on a downstream side of the open-close cover in the conveying direction.

6. An image forming system, comprising:

the sheet post-processing apparatus according to claim 5;

an image forming unit configured to form an image on a sheet; and an operation panel configured to operate the image forming unit, the release lever being provided on a downstream side of the operation panel in the conveying direction.

* * * * *